(12) United States Patent
Laubach

(10) Patent No.: US 9,817,542 B2
(45) Date of Patent: Nov. 14, 2017

(54) RELATIVE TOUCH USER INTERFACE ENHANCEMENTS

(71) Applicant: Intellitact LLC, Beverly Hills, CA (US)

(72) Inventor: Kevin Laubach, Beverly Hills, CA (US)

(73) Assignee: Intellitact LLC, Beverly Hills, CA (US)

(*) Notice: Subject to any disclaimer, the term of this patent is extended or adjusted under 35 U.S.C. 154(b) by 263 days.

(21) Appl. No.: 14/595,023

(22) Filed: Jan. 12, 2015

(65) Prior Publication Data

US 2015/0128091 A1    May 7, 2015

Related U.S. Application Data

(63) Continuation of application No. 13/490,113, filed on Jun. 6, 2012, now Pat. No. 8,933,888, and a
(Continued)

(51) Int. Cl.
*G06F 3/0481* (2013.01)
*G06F 3/0488* (2013.01)
(Continued)

(52) U.S. Cl.
CPC ........ *G06F 3/04812* (2013.01); *G06F 3/0482* (2013.01); *G06F 3/04842* (2013.01);
(Continued)

(58) Field of Classification Search
CPC ............... G06F 3/04812; G06F 3/0482; G06F 3/04842; G06F 3/04883; G06F 3/04886; G06F 3/04895
(Continued)

(56) References Cited

U.S. PATENT DOCUMENTS 7,170,496 B2   1/2007   Middleton
7,268,772 B2   9/2007   Kawal et al.
(Continued)

OTHER PUBLICATIONS

International Search Report and Written Opinion for PCT/US12/41117, dated Sep. 18, 2012, 12 pages.

*Primary Examiner* — Fred Tzeng
(74) *Attorney, Agent, or Firm* — Los Angeles Patent Group; Arman Katiraei

(57) ABSTRACT

Some embodiments provide a meta touch interface (MTI) with multiple position indicators with each position indicator operating as a separate pointing tool that can be activated (i) using taps on a touchpad or other touch sensitive surface or (ii) by pressing certain keyboard keys. The MT pointer allows for adjacent UI elements to be selected without having to reposition the MT pointer for each selection or activation. Some embodiments provide a multi-device UI that comprises at least two UIs, wherein the first UI is presented on an essentially horizontal plane that is aligned with operational focus and the second UI that is presented on an essentially vertical plane that is aligned with visual focus of the user. Some embodiments provide a precision pointer that includes an adjustable magnified region to better present underlying on-screen content, thereby allowing the user to more precisely position the pointer.

20 Claims, 40 Drawing Sheets

Related U.S. Application Data continuation-in-part of application No. 13/423,270, filed on Mar. 18, 2012, now Pat. No. 9,195,321, said application No. 13/490,113 is a continuation-in-part of application No. 13/423,212, filed on Mar. 17, 2012, now Pat. No. 8,760,424.

(60) Provisional application No. 61/493,523, filed on Jun. 6, 2011, provisional application No. 61/465,345, filed on Mar. 17, 2011, provisional application No. 61/465,309, filed on Mar. 17, 2011.

(51) Int. Cl.
*G06F 3/0489* (2013.01)
*G06F 3/0482* (2013.01)
*G06F 3/0484* (2013.01)

(52) U.S. Cl.
CPC ...... *G06F 3/04883* (2013.01); *G06F 3/04886* (2013.01); *G06F 3/04895* (2013.01); *G06F 2203/04104* (2013.01)

(58) Field of Classification Search
USPC .......................................................... 715/810
See application file for complete search history.

(56) References Cited

U.S. PATENT DOCUMENTS

| | | |
|---|---|---|
| 2003/0201971 A1 | 10/2003 | Iesaka |
| 2005/0162402 A1 | 7/2005 | Watanachote |
| 2006/0125803 A1* | 6/2006 | Westerman ......... G06F 3/04883 345/173 |
| 2007/0030256 A1 | 2/2007 | Akaike et al. |
| 2007/0033544 A1 | 2/2007 | Fleisher et al. |
| 2007/0198942 A1 | 8/2007 | Morris |
| 2009/0160778 A1 | 6/2009 | Nurmi et al. |
| 2009/0237359 A1 | 9/2009 | Kim et al. |
| 2010/0079498 A1 | 4/2010 | Zaman et al. |
| 2010/0295780 A1 | 11/2010 | Vaisanen et al. |
| 2011/0055703 A1* | 3/2011 | Lundback .............. H04R 27/00 715/727 |
| 2011/0055729 A1* | 3/2011 | Mason .................. G06F 3/0425 715/753 |
| 2011/0164060 A1 | 7/2011 | Miyazawa et al. |
| 2011/0219340 A1* | 9/2011 | Pathangay ................ G06F 3/01 715/863 |
| 2012/0242586 A1* | 9/2012 | Krishnaswamy ... G06F 3/04886 345/173 |
| 2013/0127733 A1* | 5/2013 | Krishnaswamy ... G06F 3/04883 345/173 |
| 2013/0132903 A1* | 5/2013 | Krishnaswamy ... G06F 3/04883 715/825 |
| 2014/0160035 A1* | 6/2014 | Sauer ...................... G06F 3/041 345/173 |
| 2014/0331158 A1* | 11/2014 | Hicks .................. G06F 3/04883 715/769 |
| 2015/0220182 A1* | 8/2015 | Avrahami ........... G06F 3/03543 345/163 |

* cited by examiner

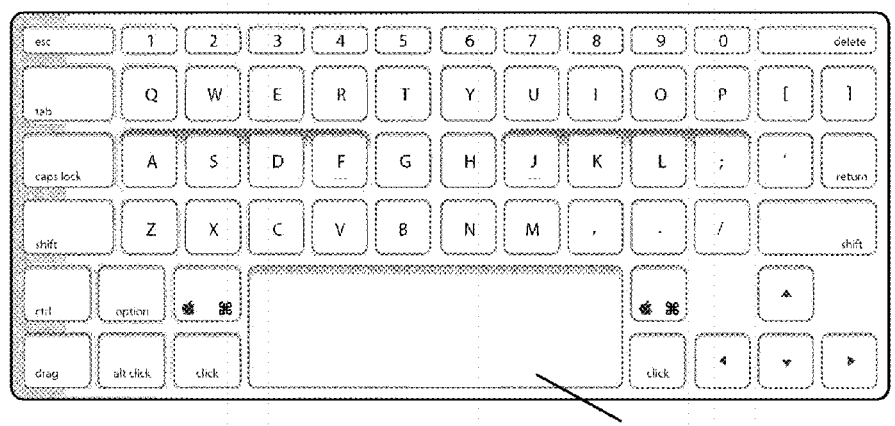
Figure 12
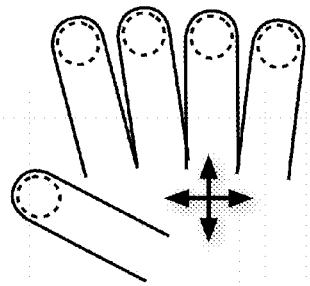
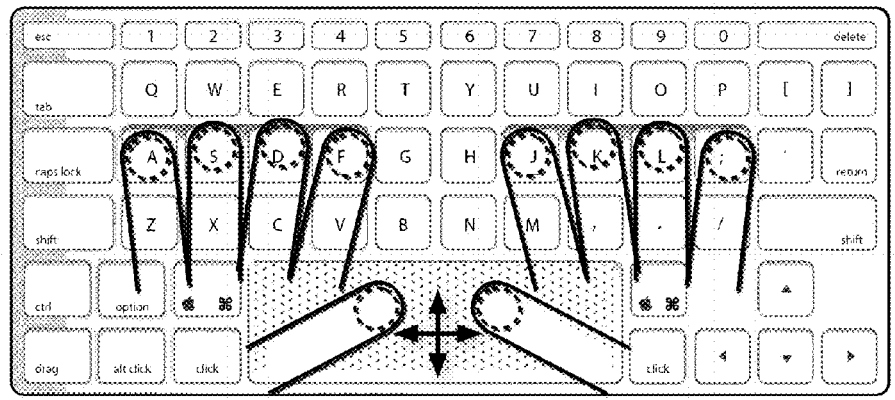
Figure 13

RELATIVE TOUCH USER INTERFACE ENHANCEMENTS

CLAIM OF BENEFIT TO RELATED APPLICATIONS

This application is a continuation of U.S. nonprovisional application Ser. No. 13/490,113, entitled "Relative Touch User Interface Enhancements", filed Jun. 6, 2012 which claims the benefit of U.S. provisional application 61/493,523, entitled "Enhanced Pointer Tools for Graphical User Interfaces", filed Jun. 6, 2011, is a continuation-in-part of U.S. non-provisional patent application Ser. No. 13/423,270 entitled "Input Device User Interface Enhancements" filed on Mar. 18, 2012 which claims the benefit of U.S. provisional application 61/465,345, entitled "Input Device User Interface Enhancements" filed Mar. 17, 2011, and is a continuation-in-part of U.S. non-provisional patent application Ser. No. 13/423,212 entitled "Touch Enhanced Interface" filed Mar. 17, 2012 which claims the benefit of U.S. provisional application 61/465,309, entitled "Touch Enhanced Interface", filed Mar. 17, 2011. The contents of provisional applications 61/493,523, 61/465,345, and 61/465,309 and non-provisional application Ser. Nos. 13/490,113, 13/423,270 and 13/423,212 are hereby incorporated by reference.

TECHNICAL FIELD

The present invention generally relates to software and hardware user interface enhancements for input devices on computer systems and electronic devices.

BACKGROUND ART

The modern operating system (OS) provides a graphical user interface (GUI) for interacting with the user interface (UI) elements present therein. The GUI makes use of a spatial selection paradigm in which navigating the GUI involves mapping movements that are detected using some input device (e.g., a mouse) to the virtual interface of the GUI in order to interact with the user interface (UI) elements of the GUI. As computers and input devices have evolved from keyboards and mice to modern day multi-touch trackpads and multi-touch touchscreen surfaces, the GUI has been adapted to maintain compatibility with legacy input devices (i.e., keyboard and mouse) while also incorporating benefits that are provided by the newer input devices. In so doing however, the OS and/or GUI has mutated in a way such that no single input device or input paradigm is singularly suited to fully interact with the OS and/or GUI because each input device has its own set of advantages and disadvantages.

The keyboard is a discrete input device wherein each key of the keyboard can be used to provide a discrete input. The keyboard is efficient for use in performing text entry, but inefficient for use in navigating the spatial selection paradigm of the GUI. While keyboard "shortcuts" which utilize "flag keys (e.g., option, control, command, alt, etc.) provide access to certain elements of a GUI, such keyboard shortcuts are often difficult to remember, inconsistent across different applications, and to invoke a keyboard shortcut, the user must often perform awkward hand movements and finger extensions in order to reach flag keys that are used in combination with other keys. As a result, the keyboard remains the preferred input device when performing operations that require discrete input (e.g., text entry), but is deficient when navigating and utilizing other aspects of the GUI.

In direct contrast to the keyboard, pointer based input devices, such as a mouse or trackpad, are useful for navigating a GUI and selecting and invoking user interface (UI) elements therein, but are inefficient for use in performing text entry. Consequently, to operate a modern day computer system or device, many users rely on the functionality of a keyboard used in conjunction with a pointer based input device.

Touchscreen based input devices have attempted to bridge the gap between discrete input devices and spatially dependent input devices. Specifically, touchscreen based input devices allow users to directly touch and thereby manipulate UI elements that are perceived on the device, which provides much of the traditional pointer based functionality. To then function as a keyboard, devices that utilize touchscreen based interaction provide virtual keyboards that are displayed on-screen in conjunction with various touch based gestures that assume the role of text entry. However, for intensive text composition, coding, game playing, or other common computer activities where discrete and/or precise input is required, a secondary input device such as the keyboard is often used to overcome the deficiencies and lack of tactical feedback of the touchscreen based input device. Furthermore, precise manipulation is challenging on touch based devices, because the user's fingers necessarily obstruct the exact area where the manipulation is desired. Also, there are ergonomic limitations to prolonged usage when either the arm is held up to the screen, or the neck is strained by looking down at the screen.

Accordingly, there is a need to better adapt existing input functionality of one or more of these input devices to bridge the divide in navigating a GUI and performing text entry and other input that requires precision or discrete interaction. Stated differently, there is a need to integrate functionality from pointer based UIs, direct touch UIs, and discrete input UIs to update the capabilities of the GUI and modern day OS software to better adapt to various input device hardware advancements.

SUMMARY

It is an objective of the present invention to define an apparatus, method, system, and computer software product that integrates functionality from pointer based user interfaces (UIs), direct touch UIs, and discrete input UIs to enhance traditional graphical user interface (GUI) pointing tool interactions. It is further an objective to permit and encourages the device user to retain visual focus on the display device(s) on a vertical plane and manual touch on the input device(s) on a horizontal plane. To achieve these and other objectives, some embodiments provide a meta touch interface (MTI) for facilitating a relative touch UI which approximates and expands upon a screen-mapped direct-touch UI. The MTI includes a graphical representation with multiple position indicators with each position indicator operating as a separate pointing tool that can be activated (i) using taps on a touchpad or other touch sensitive surface or (ii) by tapping certain keyboard keys. Activating a position indicator includes performing a mouse left-click, right-click, hold, drag, or double-click as some examples. The position indicators move as a group in conjunction with movements of the MT pointer. The MT pointer allows for related sets of UI elements that are often located adjacent to each other on-screen to be manipulated without having to reposition the MT pointer prior to each selection, activation or manipulation.

The configuration of the position indicators can be adjusted to reposition each indicator relative to the other indicators and to adjust the size of the indicators. In some embodiments, the configuration of the position indicators is automatically adjusted so that the position indicators are better positioned in orientation and distance with the position of the UI elements on-screen. In some embodiments, an auto snapping feature is provided whereby the position indicators are automatically placed over UI elements that are adjacent or nearby and that can be selected. Accordingly, some embodiments provide a UI element disambiguation function to automatically identify the adjacent or neighboring UI elements before snapping the position indicators of the MT pointer to those UI elements.

It is a further objective to provide the user differing sets of functionality that can be enabled using different finger combination touch articulation by the user. Accordingly, some embodiments enable a first set of functionality to manipulate a pointed to UI element based on a touch action of the index finger, a second set of functionality to manipulate the pointed to UI element based on a touch action of the middle finger, a third set of functionality to manipulate the pointed to UI element based on a touch action of the ring finger, and a fourth set of functionality to manipulate the pointed to UI element based on a touch action of the little finger. Further sets of functionality are based on touch actions of combinations of two or more digits, including the thumb. The touch action involves issuing a touch and hold on a trackpad or touchscreen surface with the corresponding digit or digits. Once a specific set of functionality is enabled, the other digit or digits not used to enable the set of functionality can be used to invoke or otherwise activate the enabled functions.

It is a further objective to provide the user with visual aids and other tools which enable the brain to make a strong correspondence between hand/finger motions and resulting computer operations, in order to minimize or eliminate the need for the user to constantly shift manual and visual focus. To achieve these and other objectives, some embodiments provide a multi-device UI that comprises at least two UIs, wherein a first UI is touch enabled and the first UI displays at least a subset of the second UI. The first UI may be presented using a touchscreen tablet, touchscreen smartphone, or other touch sensitive display on an essentially horizontal plane that is synchronously coupled with the second UI that may be presented using a monitor or display device that may be placed farther from the user on an essentially vertical plane. Synchronously coupling the first UI to the second UI allows touch inputs issued using the first UI to produce change on the second UI.

It is further an objective of the present invention to define an apparatus, method, system, and computer software product that overcomes limitations and enhances the use of the human finger as a UI pointing device on touchscreen and trackpad devices. Specifically, some embodiments provide a precision pointing function that seamlessly operates with traditional trackpad and/or touchscreen functionality. The precision pointer includes a configurable magnified region to better present underlying on-screen content. The level of magnification adjusts the speed of movement over the underlying content and with the magnified view of the underlying content, the user is able to more precisely position the pointer. For a touchscreen, the magnified region is presented at the edge of the user's touch such that the user's touch does not obscure the underlying content.

BRIEF DESCRIPTION OF THE DRAWINGS

In order to achieve a better understanding of the nature of the present invention and the objectives previously enumerated, preferred embodiments of the Meta Touch Interface (MTI) and operation of the Meta Touch pointer will now be described, by way of example only, with reference to the accompanying drawings in which:

FIGS. 12-14 illustrate a single touch sensitive key embodiment for operating MT pointer.

DETAILED DESCRIPTION

I. Meta Touch Interface

To address the previously discussed limitations associated with various computer input devices, it is an objective of the present invention to define an apparatus, method, system, and computer software product that integrates functionality from pointer based UIs, direct touch UIs, and discrete input UIs to enhance traditional GUI pointing tool interactions. It is further an objective of the present invention to define an apparatus, method, system, and computer software product that permits and encourages the device user to retain visual focus on the display device(s) on a vertical plane at eye level and manual touch on the input device(s) on a horizontal plane at hand level. To do so, some embodiments provide a meta touch interface (MTI) which simulates a screen-mapped direct-touch UI by allowing physical control to be performed on one or more separate, more conveniently situated surfaces, with analogous movements represented in context on-screen by way of a heads-up interactive meta touch pointer display. It should be noted that the Meta Touch Interface (MTI) and the MT pointer were referred to as the Hand Pointer Interface (HPI) and the HPI pointer in the provisional patent application 61/493,523 to which the present application claims benefit.

Figure 1:
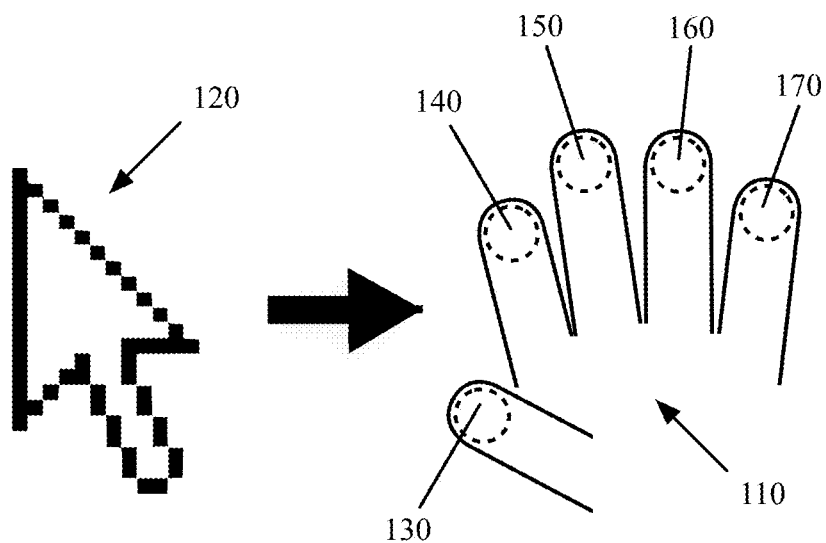
FIG. 1 illustrates the Meta Touch Interface (MTI) in accordance with some embodiments.

FIG. 1 illustrates the Meta Touch Interface (MTI) in relation to a traditional pointer-based interface. The MTI includes an interactive graphical pointer with multiple digit and position indicators. Specifically, the graphical representation is superimposed as a partially transparent graphical hand overlay, also referred to as the meta touch (MT) pointer 110, with five digit indicators 130, 140, 150, 160, and 170 that correspond to the thumb, index finger, middle finger, ring finger, and little finger of either the left hand, the right hand, or both. For the sake of clarity and brevity, most figures and descriptions will refer to a single right hand representation, though this is not meant to limit the present disclosure in any way. The representations and operation of the MTI, MT pointer, and enhancements are applicable to right-handed, left-handed, or dual-handed operation and such operation is interchangeable depending on the preferences of the user.

Figure 2:
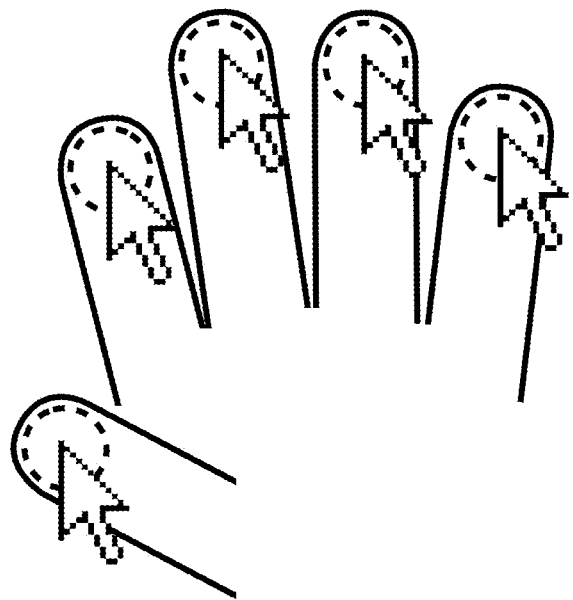
FIG. 2 conceptually illustrates how each digit indicator of the MT pointer essentially represents a different pointing tool that can be used to independently access different UI elements.

In some embodiments, each digit indicator 130-170 operates as a separate pointing tool that can be activated (i) using taps on a touchpad or other touch sensitive surface or (ii) by tapping certain keyboard keys such as the "home" keys. Specifically, the index finger digit indicator 140 can be activated using a tap of the index finger on a trackpad or other touch sensitive surface or by tapping the "J" keyboard key; the middle finger digit indicator 150 can be activated using a tap of the middle finger on a trackpad or other touch sensitive surface or by tapping the "K" keyboard key; the ring finger digit indicator 160 can be activated using a tap of the ring finger on a trackpad or other touch sensitive surface or by tapping the "L" keyboard key; and the little finger digit indicator 170 can be activated using a tap of the little finger on a trackpad or other touch sensitive surface or by tapping the "Semicolon" keyboard key. Detecting which finger corresponds with which detected tap is described below. Activating or manipulating a digit indicator includes performing a mouse left-click, right-click, hold, drag, or double-click as some examples. The digit indicators 130-170 move as a group in conjunction with movements of the MT pointer 110. However, MTI functionality allows a user to adjust the size of the digit indicators 130-170 or independently position each digit indicator relative to the MT pointer 110 as a whole. FIG. 2 conceptually illustrates how each digit indicator of the MT pointer 110 essentially represents a different pointing tool that can be used to independently access different UI elements wherein accessing a UI element includes selecting the UI element, invoking an output action associated with the UI element, or invoking alternate functionality (i.e., right-clicking, moving, or otherwise manipulating the UI element).

The MT pointer 110 replaces or otherwise compliments traditional GUI pointing tools, such as the traditional GUI pointing tool 120. As is well known in the art, a traditional GUI pointing tool 120 may be used to manipulate a single UI element at a time, before repositioning the pointing tool. For each UI element access, the pointing tool 120 is moved to the corresponding on-screen location of that UI element prior to access. The MT pointer 110 overcomes the traditional pointing tool's 120 inability to access multiple UI elements from a single on-screen position. More specifically, the MT pointer 110 allows, among other things, related sets of UI elements that are often located adjacent to each other on-screen to be activated without having to reposition the MT pointer 110 for each such activation. For example, a media player application will often have previous track, play/pause, and next track UI elements placed adjacent to each other. Using the MTI, the MT pointer need only be positioned once in order to easily and reliably access each of the three UI elements. Specifically, the MT pointer is positioned such that three of the digit indicators are positioned over the three UI elements. Then, by activating each of those three digit indicators, the user can access all three UI elements without having to reposition the MT pointer. This is particularly helpful when the user must often vacillate between related controls. The user thus spends less time precisely positioning a single pointer tool to navigate the GUI in order to access the desired functionality. Importantly, the MTI also allows simultaneous operation of UI elements by pressing various combinations of fingers. This multiplies the usefulness of many control groupings, as will be detailed below. In some embodiments, the MT pointer and the corresponding digit indicators are semi-transparent so as to not obscure UI elements and other content when the MT pointer is positioned over one or more UI elements and other content. In some embodiments, the digit indicators include a fully transparent circular area at the tip of each digit indicator that represents the area of the digit indicator at which a UI element can be accessed. This fully transparent area allows better viewing of the accessible UI element or other content. Other visual effects may be provided to distinguish the MT pointer and digit indicators from underlying content, such as shadows or specific compositing techniques, as well as increasing the opacity as the MT pointer moves, so that the user can more readily track the MT pointer while in motion.

A. Usage

Various examples illustrating the use cases of the MT pointer and its advantages over a traditional GUI pointing tool are presented below. The scope of the present invention is not intended to be limited to the specific examples given. In light of present description, it should be apparent that other use cases and advantages are applicable, though not explicitly described herein.

Figure 3A:
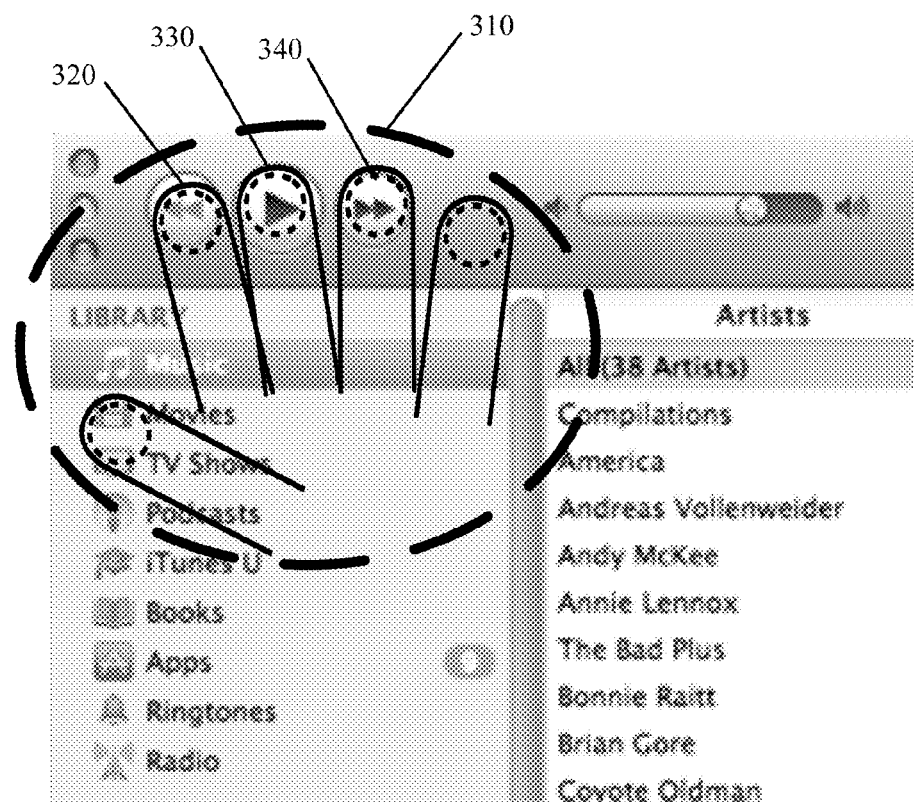
FIG. 3A illustrates using the MT pointer to operate a set of media playing controls.

One advantage of the MT pointer over traditional single pointing tools is exemplified with adjacent UI elements that are frequently accessed or that provide access to related functionality. FIG. 3 illustrates using the MT pointer 310 to operate a set of media playing controls. In this figure, the MT pointer 310 is positioned over media playing controls. Specifically, the MT pointer 310 is positioned with the index finger digit indicator 320 over the fast reverse or previous track UI element, the middle finger digit indicator 330 over the play/pause UI element, and the ring finger digit indicator 340 over the fast forward or next track UI element. These UI elements provide access to commonly used functions of a media playing application. Accordingly, the user will often access these UI elements collectively to select media to play, to adjust a position in the selected media, pause the playback, and change the media selection. By placing the MT pointer 310 over these UI elements, the user can reliably access corresponding functionality of each of the three UI elements at any time without repositioning of the MT pointer 310. In other words, the user can skip tracks, pause or play a track, and forward or reverse in a track without having to reposition the MT pointer 310. As an example, the user may tap the middle finger to pause playback, and then quickly tap the ring finger several times to move through the next selections. Due to system lag time or other factors, the selection may proceed beyond the desired track, and the user must then use the previous track button, which can be done easily by tapping the index finger. When the correct track is identified, the user taps the middle finger to start playback. At this point the user may press and hold the ring finger to fast forward to a particular musical passage. Once again, any overshoot in the playback position may be corrected by pressing the opposing rewind control on the index finger. The process of iteratively adjusting values which was illustrated twice in the preceding example is an extremely common task in many applications. The MTI of the present invention makes such tasks far more efficient and ergonomically palatable by obviating the need to reposition a pointer between each such adjustment.

Furthermore, the MT pointer allows for simultaneous control of UI elements within a grouping. For example, if the user activates the forward scan button by pressing and holding the ring finger 340, the user may also press the opposing control 320 to double the scan speed. Likewise, while holding down the ring finger 340, the user may intermittently press the middle finger 330 to reduce the speed of the audio scanning operation for easier identification. This type of simultaneous operation provided by the MT pointer is beneficial in countless scenarios where continuous control is desired, from UI elements as a simple as a volume control to 3d game play.

Figure 4A:
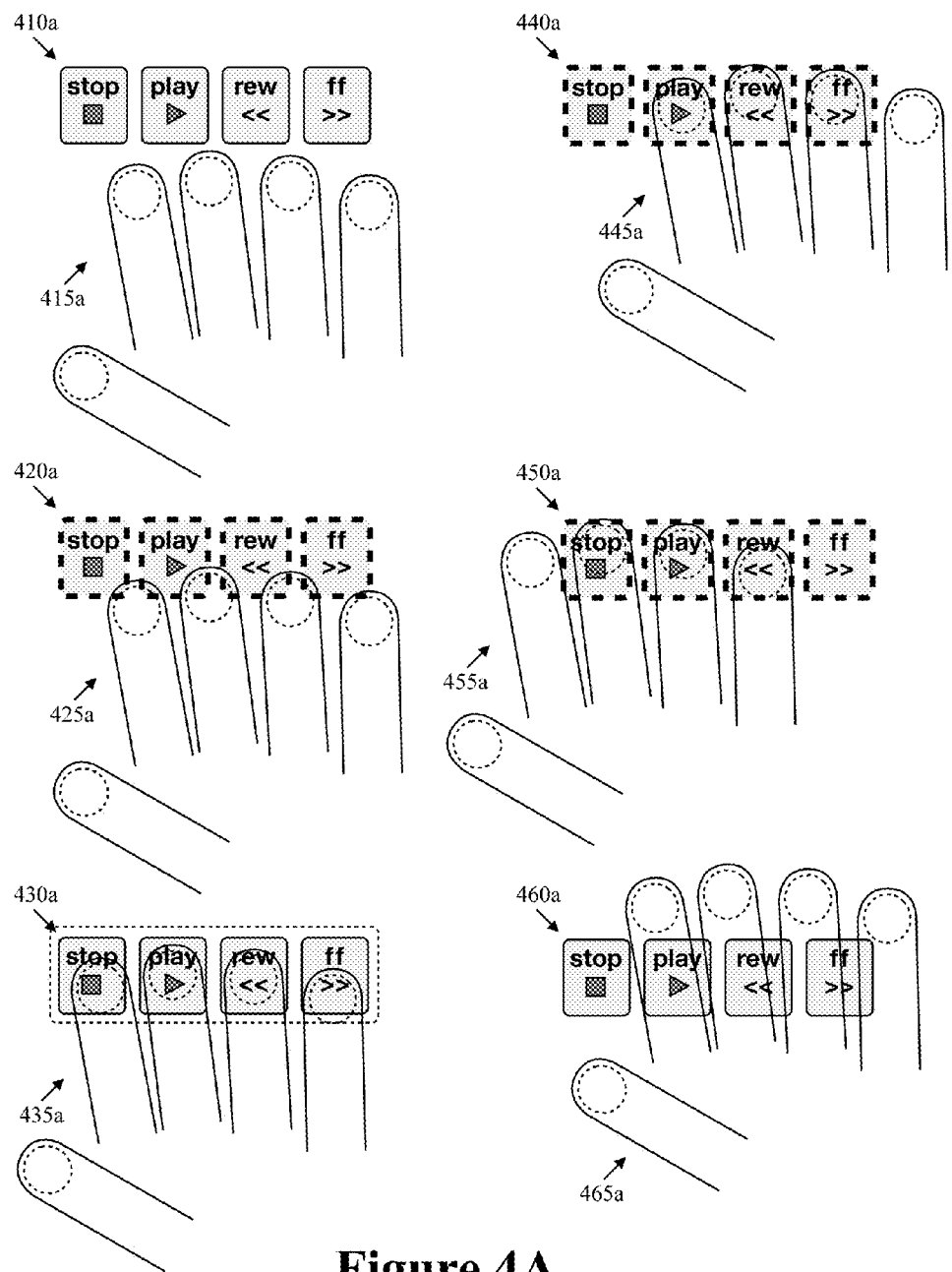
FIG. 4A provides examples of the MT pointer snap functionality of some embodiments with the MT pointer represented in six positions proximate to a set of grouped controls.

As the user moves the MT pointer in the vicinity of specifically grouped sets of controls, the MT pointer snaps to the preferred configuration of digit spacing and assignment. This allows for fast and consistent placement of the MT pointer, and ensures that control of specific functions is always mapped to specific fingers. This allows muscle memory to be built automatically with each use. FIG. 4A provides examples of the MT pointer snap functionality of some embodiments with the MT pointer represented in six positions proximate to a set of grouped controls. The grouping of four related controls 410*a*, 420*a*, 430*a*, 440*a*, 450*a* and 460*a* includes (from left to right) a stop button, a play button, a rewind button and a fast forward button. Because MT pointer 415*a* is not close enough to the grouped controls 410*a*, the grouped controls 410*a* are not highlighted. When the user moves the MT pointer 425*a* closer to the grouped controls 420*a*, they are highlighted in some way to inform or remind the user that the controls are operable as a group. In some embodiments, the highlighting utilizes one or more graphical techniques (e.g., color coding, link lines) to depict the one-to-one correspondence of each digit with the specific control within the grouping. When the user releases the mouse button (or touch, etc.) to stop moving the MT pointer, the MT pointer automatically moves to an ideal position 435*a* in which the digits are approximately centered on the corresponding controls 430*a*, and the highlighting either fades away or changes to some other form of highlighting that indicates to the user that the pointer is properly snapped in place. When the MT pointer 445*a* and 455*a* is positioned by the user such that the digit correspondence is improper, the MT pointer will automatically move to the ideal position 435*a* if the user concludes the move operation at this position. In some embodiments, the user may also flick the MT pointer toward the direction of the grouped controls to snap the MT pointer to the grouped controls in the ideal position 435*a*. If the user concludes the drag operation with the MT pointer 465*a* not in immediate proximity to the grouped controls 460*a*, any highlighting is removed.

Figure 4B:
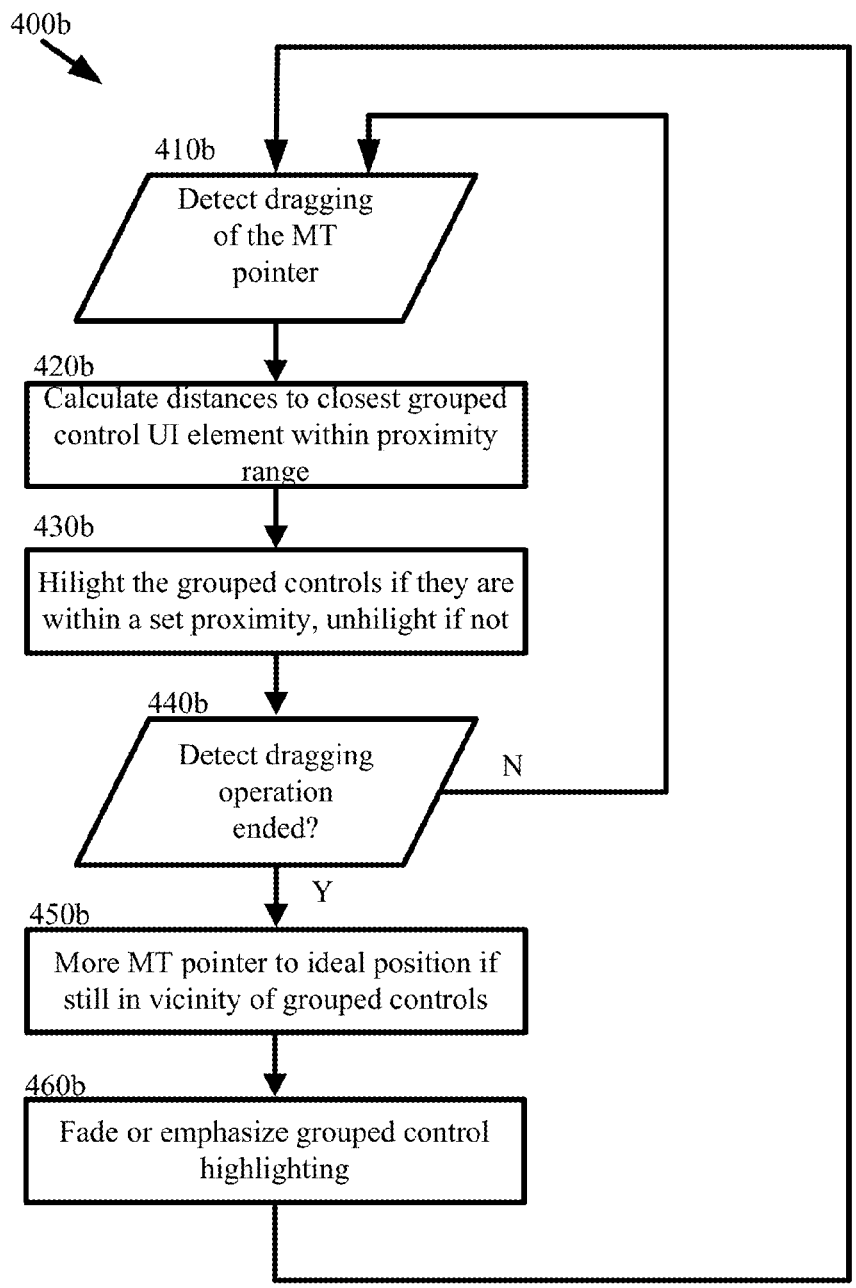
FIG. 4B details the process used by some embodiments to determine how the MT pointer snaps to grouped controls.

FIG. 4B details the process used by some embodiments to determine how the MT pointer snaps to grouped controls. When the MT pointer is being dragged to a new position 410*b*, the process determines if there are any grouped control UI elements close to any digits of the MT pointer, and if so, calculates the distance to the closest such UI element 420*b*. In some embodiments, group controllable UI elements are determined in advance by system API calls, and the leftmost and rightmost positions of each grouped control set is stored for subsequent operations. Then, as the MT pointer is moved, proximities to the new MT pointer position is calculated from the leftmost MT pointer digit position to the rightmost grouped control position, and the rightmost MT pointer digit position to the leftmost grouped control position. If the closer of the two proximities is within a small range (e.g., 40 pixels), the grouped controls are highlighted 430*b* in some way. Some embodiments highlight the group as a whole (e.g., a darker shading behind the grouping), highlight individual group elements (e.g., a thicker border around each UI element), and/or highlight digits of the MT pointer (e.g., color coding or link lines to the corresponding UI element). If the user continues to drag the MT pointer, the process continues 410*b* determining proximities and highlighting or un-highlighting group control UI elements. Otherwise, if the user has concluded the drag operation 440*b*, the MT pointer is moved to the ideal position 450*b* if it is within the determined proximity. In some embodiments, the MT pointer is moved to the ideal position as a whole (without adjusting inter-digit spacing) so that it is as closely centered on the UI elements as possible. In other embodiments, the position of each digit is matched with the exact or proximate location of the matching UI element (within a range), and when the pointer is later moved the inter-digit spacing is restored. With the MT pointer and its digits are ideally positioned, the grouped control highlighting fades away 460*b* or is altered in some way, and the process continues 410*b*. In some embodiments, grouped controls are determined in advance by the software creator, so that the process can determine which UI elements should be considered as grouped controls. Furthermore, if the user positions the MT pointer over non-grouped controls and then activates various UI elements with specific digits of the MT pointer, this correspondence of digit activation per UI element is stored in the MTI database. After several such consistent usages, the MTI system determines that the so identified adjacent UI elements should be considered as a grouped set. The user would then see the grouped highlighting and snapping while in operation, and muscle memory can be formed because a particular finger is always used to trigger a particular UI element.

Figure 3B:
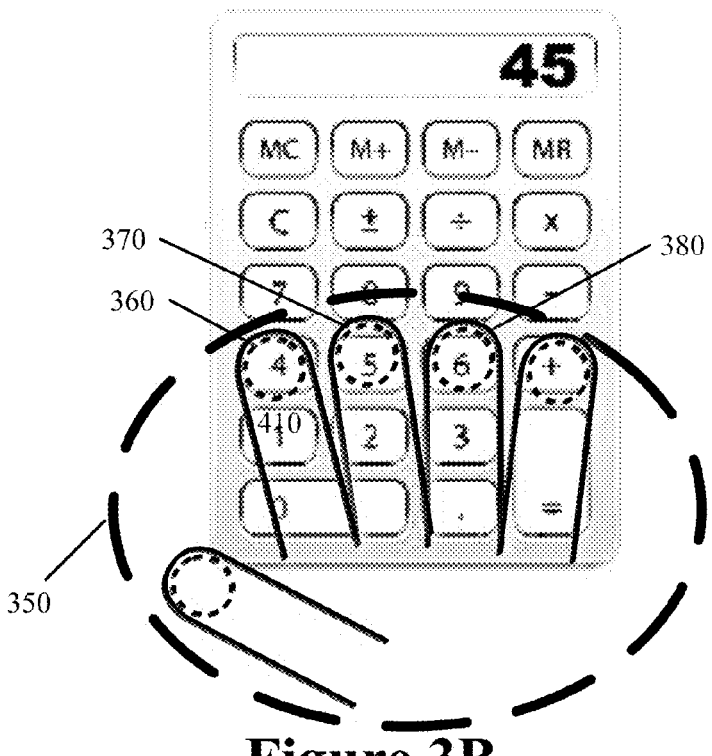
FIG. 3B illustrates using the MT pointer to access related functionality of a calculator application.

FIG. 3B illustrates using the MT pointer 350 to access related functionality of a calculator application. In this figure, the MT pointer 350 is positioned over a row of UI elements that represent numeric keys of a calculator. Specifically, the MT pointer 350 is positioned with the index finger digit indicator 360 over the "4" numeric key, the middle finger digit indicator 370 over the "5" numeric key, and the ring finger digit indicator 380 over the "6" numeric key. Once positioned over this set of keys, the user can access each of these UI elements (e.g., numbers "4", "5", and "6") without further movement of the MT pointer. As shown, the user activates the index finger digit indicator 360 to enter the number "4" and then the user activates the middle finger digit indicator 370 to enter the number "5". Activating the various digit indicators can also be performed using discrete keyboard keys or taps on a touchpad as will be explained in greater detail below. In comparison, when using a traditional single pointing tool, the user first positions the pointing tool over the "4" UI element, performs a left click to enter the number "4", then repositions the pointing tool over the "5" UI element, and performs a left click to enter the number "5". By using the MT pointer 350 in this simplified example, the second positioning step is avoided. To access other numbers, MT pointer movements are simplified because the user only needs to move the pointing device in the vertical plane, as the x-axis remains constant. As previously mentioned, the MTI of some embodiments incorporates a "snap" algorithm which senses grouped controls and facilitates this kind of single-axis or otherwise simplified pointer movement. Additionally, some embodiments provide tap above and below functionality to access, for instance, the "7" and "1" buttons with the index finger, without repositioning the MT pointer at all. Furthermore, when the digit indicators are activated by discrete keyboard keys (as will be described below), keys above and below the normal "home" activating keys may also be used to access UI elements above and below the digit indicators in some embodiments.

Because the MPI system can distinguish thumb touches from finger touches, some embodiments utilize the thumb to move the MP pointer and the fingers to activate various UI elements over which they are positioned. For example, in FIG. 4, the thumb is used to move the MP pointer by simply resting the thumb on the trackpad (or other control surface)

and dragging. Any UI element that is beneath the thumb pointer is not clicked or activated in any way, which allows the user to drag the MT pointer into position without being concerned about accidental activation. After positioning, the fingers are free to simply tap on the desired calculator buttons with the appropriate digit.

Figure 5:
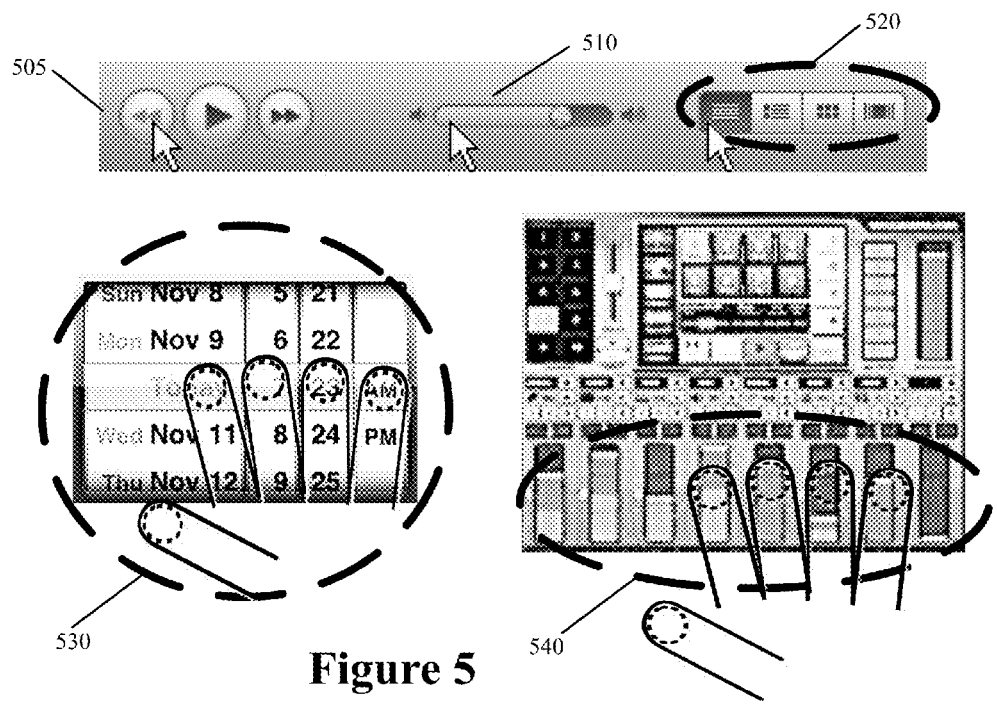
FIG. 5 illustrates some other UI element groupings for which the MT pointer is well suited.

FIG. 5 illustrates some other UI element groupings for which the MT pointer is well suited. These UI groupings are shown in a typical media control surface which includes a group of transport controls 505 (previously discussed), volume slider 510, and a grouped set of view selector UI elements 520. The MT pointer may be used to access the slider UI element 510, because when the MT pointer is positioned over the slider 510 near the position indicated by the arrow, different positions of the slider UI element 510 can be accessed based on the positions of the different digit indicators of the MT pointer relative to the slider UI element 510. The slider UI element 510 can control a volume setting as shown, or any number of other value setting parameters, such as a track position slider in a media playing application. The view controller 520 of the media player application selects one of four ways to view the track data (not shown in figure). As before, when the MT pointer index finger digit indicator is placed on the leftmost element, it is easy for the user to switch between different views. This quick, intuitive access encourages the user to more fully utilize the features of the application because it is easier to simply tap a finger and see the results, rather than position the cursor on each and read "help text" or try to remember the meaning of a small icon with abstract graphics.

530 depicts a rotary controller for specifying a value based on individual component values. In addition to activating a UI element identified by a digit indicator by tapping, values may be adjusted for each segment of the controller by utilizing drag, swipe and hold gestures on the corresponding touch or key. Standard features such as inertial scrolling and stopping can thus be utilized without repositioning the MT pointer, and simultaneous control of two or more parameters can be effectuated. Similarly, manipulating multiple individual related controls simultaneously is shown in an audio mixing application 540, where such control is an important component of successful use. In this setting, while a thumb touch is maintained, the MT pointer remains stationary, allowing the fingers to manipulate their corresponding UI objects without moving other digits of the MT pointer off of their intended UI elements.

Operation of the MT pointer 110 is discussed below in relation to a trackpad, trackpad and keyboard combination, and keyboard with integrated trackpad functionality.

B. MTI Operation with Trackpad

In some embodiments, the MTI is controllable using a trackpad or other similar multiple touch detecting input device. In this method of MTI operation, on-screen movement of the MT pointer, including all five digit indicators, is controlled by single touch movements on the trackpad, or multiple simultaneous touch movements that are essentially parallel, in a manner similar to how a single touch movement produces a corresponding movement of a traditional pointing tool. When the MTI is active, instead of moving the traditional pointing tool, the MTI adapts touch inputs that are provided by the trackpad to perform movements of the MT pointer. The MT pointer can be moved anywhere on-screen so long as at least some part of a digit indicator is positioned within the screen bounds. For instance, the MT pointer can be positioned such that the thumb digit indicator is moved off-screen and the other digit indicators remain active. Such functionality also applies when, for example, a touch of the thumb is extended beyond a touch surface of a trackpad or touchscreen to a touch sensitive bezel or border of the trackpad or touchscreen.

Figure 6:
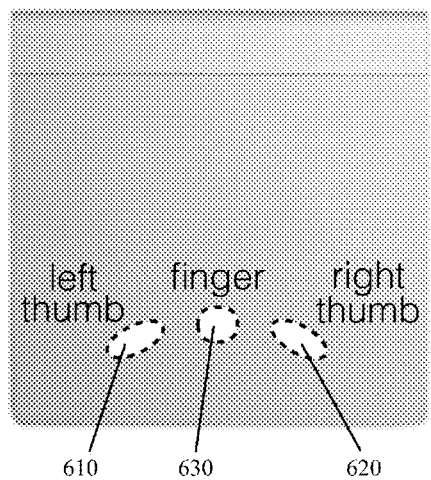
FIG. 6 conceptually illustrates how the touch of the left hand thumb contact area differs from the right hand thumb contact area, and how it differs from a touch contact area of the index, middle, ring, or little fingers.

In some embodiments, touch movements of the thumb are used to move the MT pointer, and the fingers are used to activate functionality after the MT pointer is in place. The thumb is a preferred manner to move the on-screen position of the MT pointer, because it frees the fingers to activate functionality by a tap, hold, drag, flick, other touch, or gesture. Because the thumb is used for movement only, and a tap of the thumb does not activate anything that happens to be beneath the on-screen location of the thumb, there is no consequence to the user inadvertently tapping the thumb while making repeated MT pointer movements with the thumb. Also, a detected touch of the thumb may be distinguishable on a trackpad from detected touches of other digits. Moreover, a touch of the right hand thumb is distinguishable from a touch of the left hand thumb and this allows for the MT pointer to change from a right hand representation to a left hand representation. In some embodiments, the user signals a switch between left and right hands by tapping all 5 digits on the trackpad. FIG. 6 conceptually illustrates how the touch of the left hand thumb contact area 610 differs from the right hand thumb contact area 620, and how it differs from a touch contact area 630 of the index, middle, ring, or little fingers. In some embodiments, the MTI analyzes the touch contact area geometry data from the trackpad to identify a touch of the left hand thumb, the right hand thumb, and touches of the other fingers based on the overall perceived shape of the contact area. In some embodiments, data from the use of the device is analyzed and stored to refine and improve the accuracy of thumb/finger differentiation. In other embodiments the trackpad itself and/or the system software may be responsible for making such distinctions and pass such information to the MTI engine in a more concise manner. Though the discussion above pertains to movements of the MT pointer using the thumb, other means are also available to move the MT pointer including using a finger, or parallel movements of two or more fingers in some embodiments.

As noted above, each digit indicator of the MT pointer can be independently activated based on different user inputs. For trackpad operation, touches and taps performed by different fingers of the user's hand are used to independently activate each of the MT pointer's digit indicators. In other words, each finger of the user's hand activates a different MT pointer digit indicator. A single tap performs a traditional single mouse left-click, a double tap performs a traditional mouse double-click, and a press and hold performs a traditional mouse-down message followed by a mouse-up message when the touch is released. If the touch is moved while held down, traditional mouse-drag messages are sent. This is in contrast to current art where a tap gesture is typically actuated with a single finger and a hold or move or drag operation requires two fingers or a switch depression or some other distinguishing characteristic. In some embodiments, other messages such as a mouse right-click are performed when the user performs a different type of touch with the corresponding digit indicator. Other usage examples include performing a slide or flick up to scroll a view up and a slide or flick down to scroll a view down in some embodiments. The MTI supports other touches and combinations of touches such as an example presented below which utilizes a press and hold of a first digit and a subsequent tap of a second digit.

Figure 7:
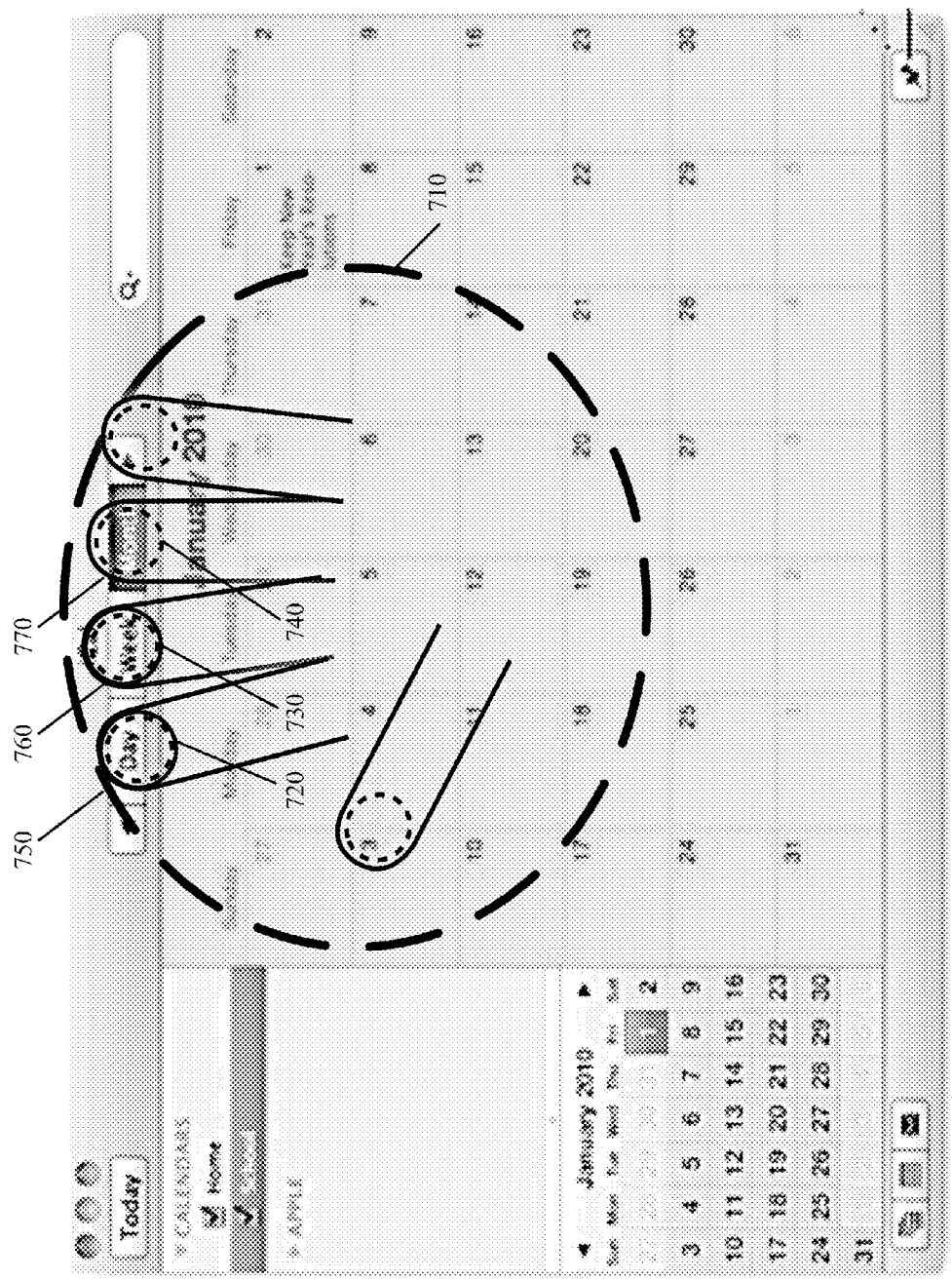
FIG. 7 illustrates the advantage of being able to use different digit indicators of the MT pointer to access different UI elements without having to reposition the MT pointer.

FIG. 7 illustrates the advantage of being able to use different digit indicators of the MT pointer to access different UI elements without having to reposition the MT pointer. In this figure, the MT pointer 710 has digit indicators 720, 730, and 740 positioned over UI elements 750, 760, and 770. The digit indicator 720 corresponds to the index finger of the user's right hand, the digit indicator 730 corresponds to the middle finger of the user's right hand, and the digit indicator 740 corresponds to the ring finger of the user's right hand. Therefore, to access UI element 750, the user taps the index finger on the trackpad to activate the index finger digit indicator 720 of the MT pointer 710. Similarly, to access UI element 760, the user taps the middle finger on the trackpad to activate the middle finger digit indicator 730 of the MT pointer 710, and to access UI element 770, and the user taps the ring finger on the trackpad to activate the ring finger digit indicator 740 of the MT pointer 710. Various techniques described below in the implementation section describe how the MTI differentiates between touches of the index, middle, ring, and little fingers on the trackpad. Not shown in FIG. 7 is the effect of the tap on the UI elements, which change the calendar view from day to week to month. As noted in the usage examples in section A above, this permits the user to quickly change the view back and forth without repositioning the MT pointer.

In some embodiments, the MT pointer is automatically scaled to a size that is optimized for the UI elements that lie below. Such automatic scaling and positioning may be determined and saved per application, and in some cases per context within an application. More specifically, the MT pointer is set to a size whereby the digit indicators of the MT pointer are sized and distanced similarly to the size and distance of UI elements on-screen at the current position of the MT pointer. However, different UI elements may differ in size and distance. Accordingly, some embodiments of the MTI provide a touch gesture for customizing the overall size of the MT pointer and, as a result, the size of the constituent digit indicators, so that the user can override any automatic setting. Some embodiments of the MTI provide a different touch gesture for customizing the distance between and relative position of the MT pointer digit indicators.

In some embodiments, a touch gesture invokes a size adjustment function to adjust the size of the MT pointer and, thereby, adjust the size of the constituent digit indicators. This function is useful to adjust the overall size of the MT pointer so that the MT pointer digit indicators can be more closely aligned to the UI elements based on the size and spacing of the UI elements on-screen. In some embodiments, to invoke the size adjustment function, the user performs a simultaneous four finger touch on the trackpad. Once invoked, the user can reduce the size of the MT pointer and its digit indicators by sliding the four touches down. Conversely, the user can increase the size of the MT pointer and its digit indicators by sliding the four touches up.

Figure 8:
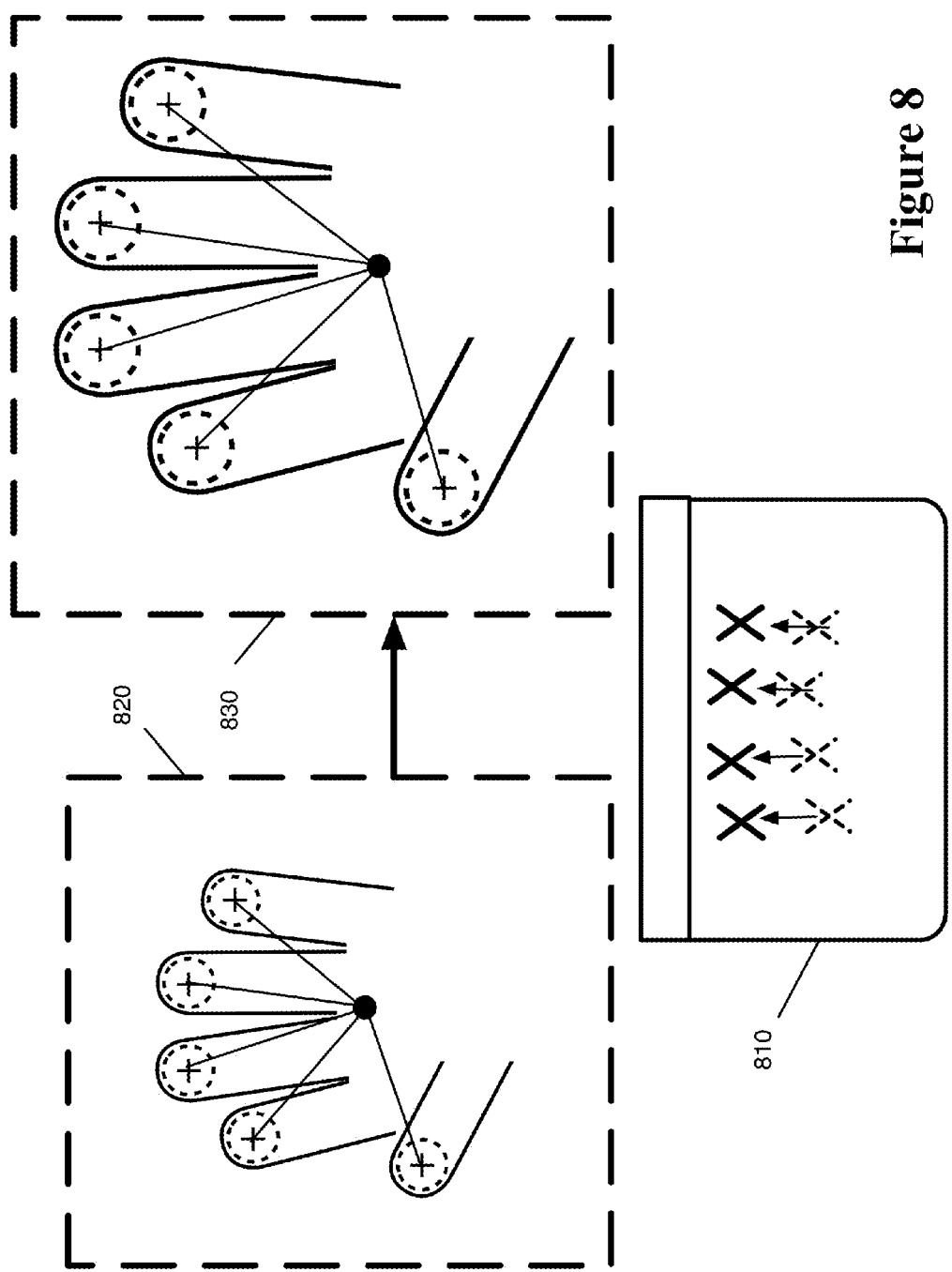
FIG. 8 illustrates performing a four touch slide gesture to increase the size of the MT pointer and its digit indicators in accordance with some embodiments.

FIG. 8 illustrates performing a four touch slide gesture to increase the size of the MT pointer and its digit indicators in accordance with some embodiments. The figure illustrates a trackpad 810 on which the four touch upward slide gesture is performed. Each dotted "X" represents an initial touch position of a finger of the right hand and each solid "X" represents the final position of a finger of the right hand after the gesture is complete. The figure also shows how this gesture increases the size of the MT pointer by illustrating the size of the MT pointer based on the initial MT pointer 820 and the size of the MT pointer 830 after the four touch slide up gesture is performed on the trackpad 810.

To implement the size adjustment function, the MTI intercepts or otherwise obtains touch data generated by the trackpad based on user touches. From the touch events, the MTI identifies four separate but essentially simultaneous touches where the touches correspond to some degree with known locations for the index, middle, ring and little finger touches and spacing. Then when the four touches are slid up or down, the MTI tracks the change or delta in the positions of the four sets of coordinates. From these deltas, the MTI can compute whether a resize gesture occurred, and if so, change the size of the MT pointer and the digit indicators in proportion to an average delta value. Relative spacing of the digit indicators is changed proportionally, but inter-digit spacing ratios remain constant. It should be well noted that the foregoing gesture is given as an example, and other gestures and/or keys (as described in the following section C) may be employed to modify the size of the MT pointer.

In contrast to modifying the size of the MT pointer, some embodiments also provide a digit indicator position adjustment function that can be used to independently adjust the position of each MTI digit indicator of the MT pointer. This function is useful to adjust the position of the MT pointer digit indicators so that they are better positioned in orientation and distance with the position of the UI elements on-screen. For example, UI elements of an application are often horizontally aligned. Therefore, by adjusting the position of the MT pointer digit indicators so that they too are horizontally aligned, the digit indicators can be used to more easily access the horizontally aligned UI elements without re-positioning the MT pointer as a whole. In some embodiments, the digit indicator position adjustment function is invoked when the user holds two or more touches, and while retaining those touches on the trackpad, moves of any one or more touches produce a positional adjustment to the corresponding digit indicators of the MT pointer.

Figure 9:
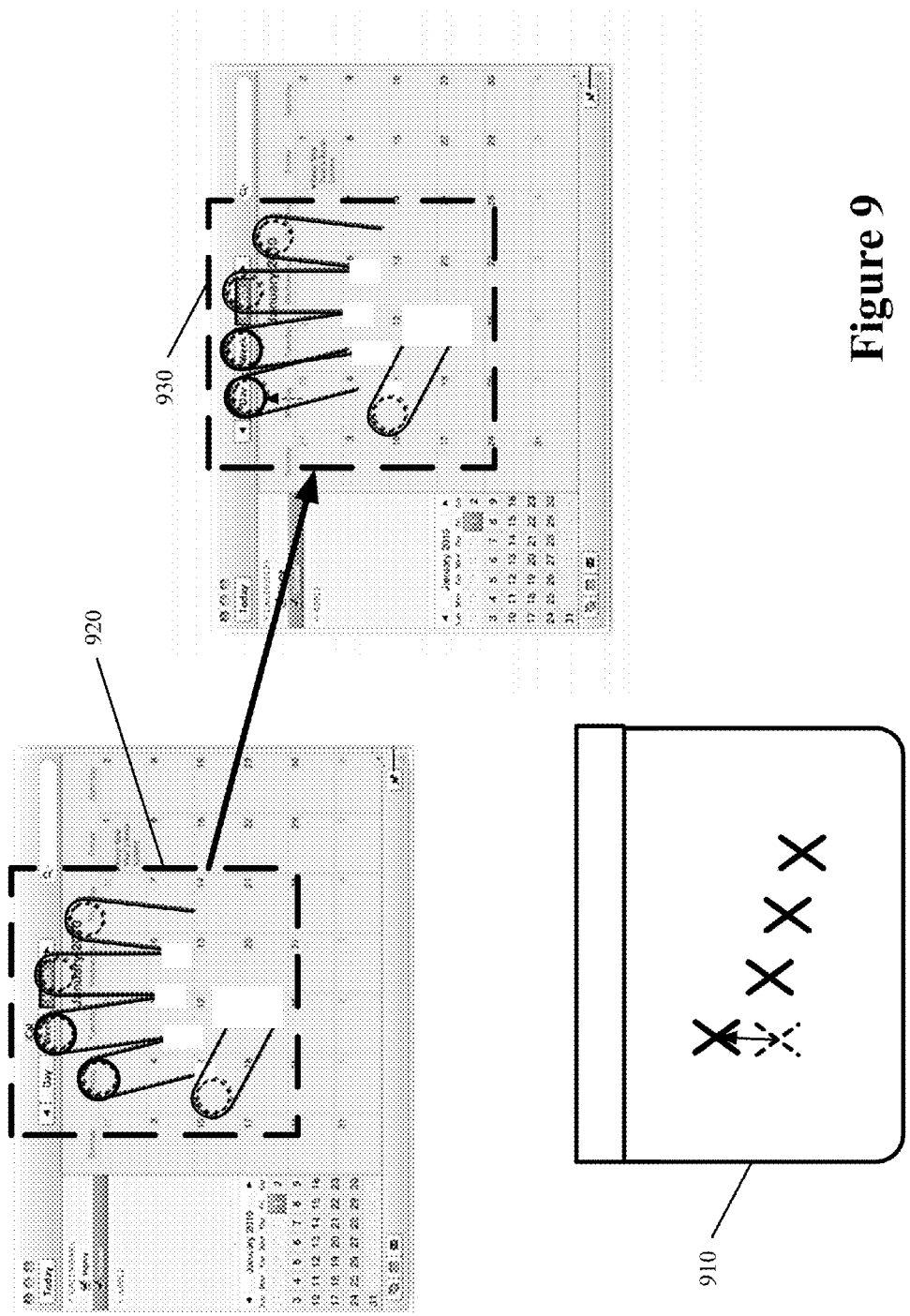
FIG. 9 illustrates performing a four finger touch and subsequently moving the touch of only the index finger to adjust the relative position of the index finger digit indicator of the MT pointer in accordance with some embodiments.

FIG. 9 illustrates performing a four finger touch and subsequently moving the touch of only the index finger to adjust the relative position of the index finger digit indicator of the MT pointer in accordance with some embodiments. The figure illustrates a trackpad 910 on which the four finger touch is performed. The dotted "X" represents an initial touch position of the index finger and each solid "X" represents the final position of a finger of the right hand, which, in the case of the non-moving middle, ring, and little fingers is also the initial position. The figure shows how moving the index finger touch from the initial position to its final position changes the positioning of the index finger digit indicator of the MT pointer from an initial digit indicator position configuration 920 to a final digit indicator position configuration 930.

Figure 10:
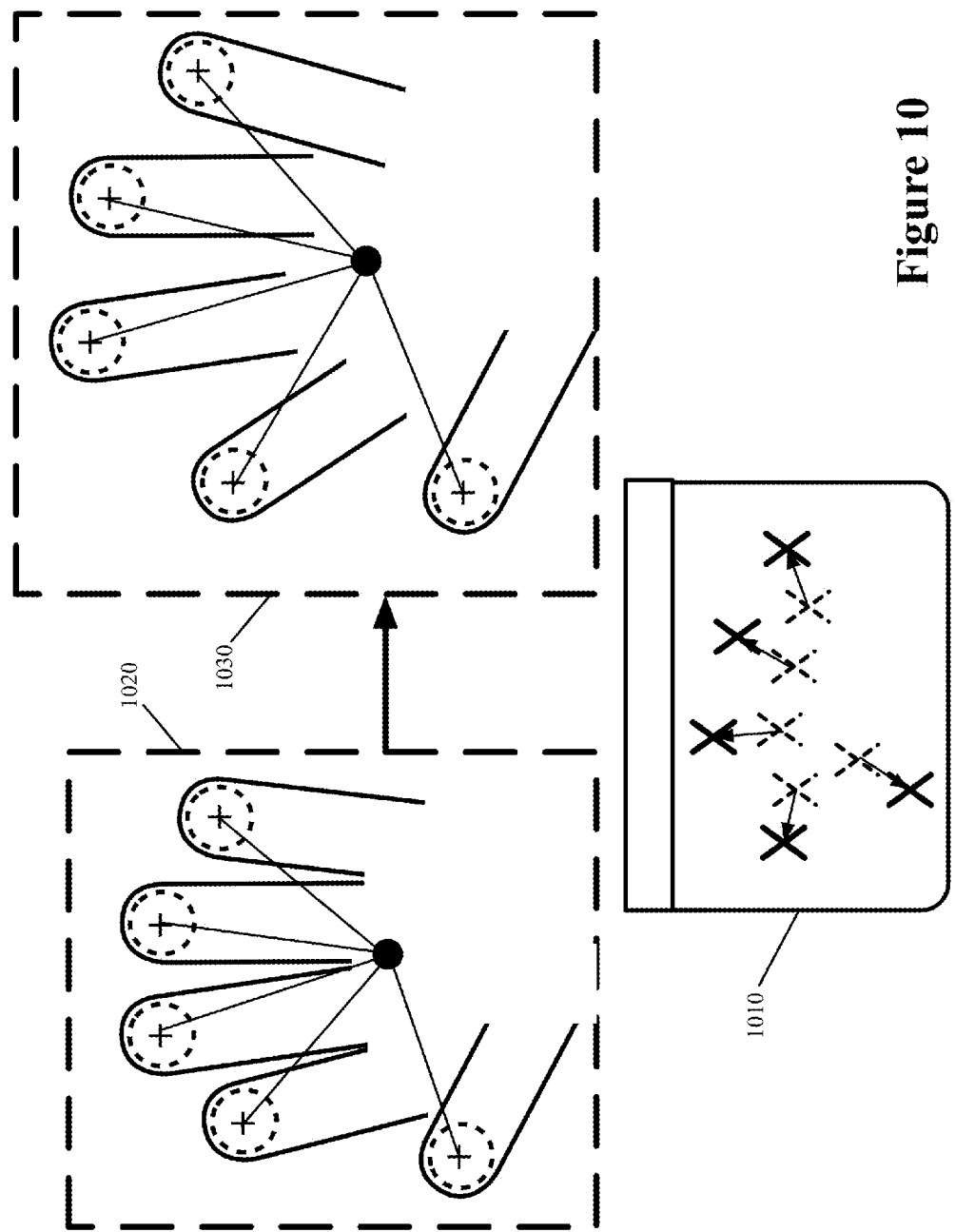
FIG. 10 illustrates performing a five finger expansion gesture to reposition each of the digit indicators of the MT pointer.

Different embodiments of the MTI utilize different touch combinations, gestures, and movements to perform the above described size adjustment function and the digit indicator position adjustment function. Accordingly, it is not necessary to implement these functions based on a four finger touch. For example, with reference to FIG. 9, some embodiments of the MTI do not require the indicated touches of the ring and little fingers to invoke the described functionality. As another example, FIG. 10 illustrates performing a five finger expansion gesture to reposition each of the digit indicators of the MT pointer. As shown, each of the user's fingers are moved out and away from one another on the trackpad 1010 and, in response, the MT pointer digit indicators change from an initial position 1020 to a final position 1030. It should be noted that the relative offsets that are used in the mathematical model of the MT pointer are altered in the digit indicator position adjustment function, unlike the size adjustment function where the offset ratios remain consistent.

C. MTI Operation with Keyboard

In some embodiments, the MTI is controllable using a traditional keyboard independent of or in conjunction with a mouse, trackpad, touchscreen or other similar spatially dependent input device.

a. Traditional Keyboard with Pointing Device

In this method of MTI operation, movement of the MT pointer is controlled with a mouse, trackpad, or other input device, and keyboard keys activate the MTI digit indicators. In some embodiments, the keyboard home keys activate the MTI digit indicators. Some embodiments allow the user to use the left hand or thumb to operate a trackpad or similar device to move the MT pointer and the fingers of the right hand to press (1) the "J" keyboard key to activate the index finger digit indicator of the MT pointer, (2) the "K" keyboard key to activate the middle finger digit indicator of the MT pointer, (3) the "L" keyboard key to activate the ring finger digit indicator of the MT pointer, and (4) the "Semicolon" keyboard key to activate the little finger digit indicator of the MT pointer. Other embodiments allow the user to use of the right hand or thumb to operate a trackpad or similar device to move the MT pointer and the fingers of the left hand to press (1) the "F" keyboard key to activate the index finger digit indicator of the MT pointer, (2) the "D" keyboard key to activate the middle finger digit indicator of the MT pointer, (3) the "S" keyboard key to activate the ring finger digit indicator of the MT pointer, and (4) the "A" keyboard key to activate the little finger digit indicator of the MT pointer. In other embodiments, other keys or key combinations are used.

The above enumerated home keys may be used to perform mouse right-click activation with a corresponding digit indicator of the MT pointer. Right-click activation may also be provided by using a row of keyboard keys above or below the home keys. For example, when using the right hand or thumb to operate a trackpad or similar device to move the MT pointer, the "R" keyboard key can be used to perform mouse right-click activation with the index finger digit indicator of the MT pointer, the "E" keyboard key can be used to perform mouse right-click activation with the middle finger digit indicator of the MT pointer, the "W" keyboard key can be used to perform mouse right-click activation with the ring finger digit indicator of the MT pointer, and the "Q" keyboard key can be used to perform mouse right-click activation with the little finger digit indicator of the MT pointer.

To integrate MTI functionality with traditional keyboard usage (i.e., text insertion), some embodiments utilize a particular keyboard key, such as the spacebar, to enable MTI functionality. The spacebar is the preferred keyboard key to enable the MTI functionality in some embodiments, because it is easily accessible with the thumb of either the left hand or the right hand and it allows the other fingers to remain positioned on the home keys. When the spacebar is not pressed, the MTI functionality is disabled in some embodiments. When disabled, the GUI pointer is a traditional single pointing tool. When the spacebar is pressed and held down beyond a specified threshold duration (e.g., 200 milliseconds), the MTI functionality is enabled and the GUI pointer changes to the MT pointer. By continuing to hold down the spacebar, the home keyboard keys can be used to activate different MT pointer digit indicators. For instance, holding the spacebar down and tapping the "J" key activates the index finger digit indicator of the MT pointer whereby the activation simulates performing a mouse left-click on the UI element over which the index finger digit indicator of the MT pointer is positioned. To implement this and similar methods of operation, the MTI intercepts or otherwise obtains data and/or events generated as inputs from the keyboard and other input devices. Such data and/or events are then processed to determine whether to enable MTI functionality. When disabled, the inputs are passed through to the OS or application event handler. When enabled, the inputs are processed to determine whether to activate the MTI digit indicators, move the MT pointer, or provide other functionality.

b. Traditional Keyboard without Pointing Device

MTI functionality can be provided so that a traditional keyboard can be used to fully utilize the MTI without the need of a separate input device such as a mouse or trackpad. In some such embodiments, holding down the spacebar enables MTI functionality whereby home keys associated with a first hand (e.g., left or right hand) are usable to activate MT pointer digit indicators and home keys associated with a second hand are usable to perform MT pointer movements wherein the home keys associated with the second hand can be used to perform different directional on-screen incremental movements of MT pointer. More specifically, the home keys associated with the second hand are adapted to perform arrow key functionality for moving the MT pointer up, down, left, right, or diagonally. In this method of MTI operation, the user's hands remain on the keyboard when performing traditional text insertion functionality and when performing MT pointer movements and MT pointer digit indicator activation. To further facilitate MT pointer movement, some embodiments continue to move the MT pointer while certain keys remain depressed, and MT pointer movement is stopped when certain keys are released. Such movement may accelerate as the key remains depressed. In some embodiments, pressing additional keys while the cursor is in motion shifts the direction of movement. Pressing other additional keys may speed up the rate at which the MT pointer moves across the screen.

Figure 11:
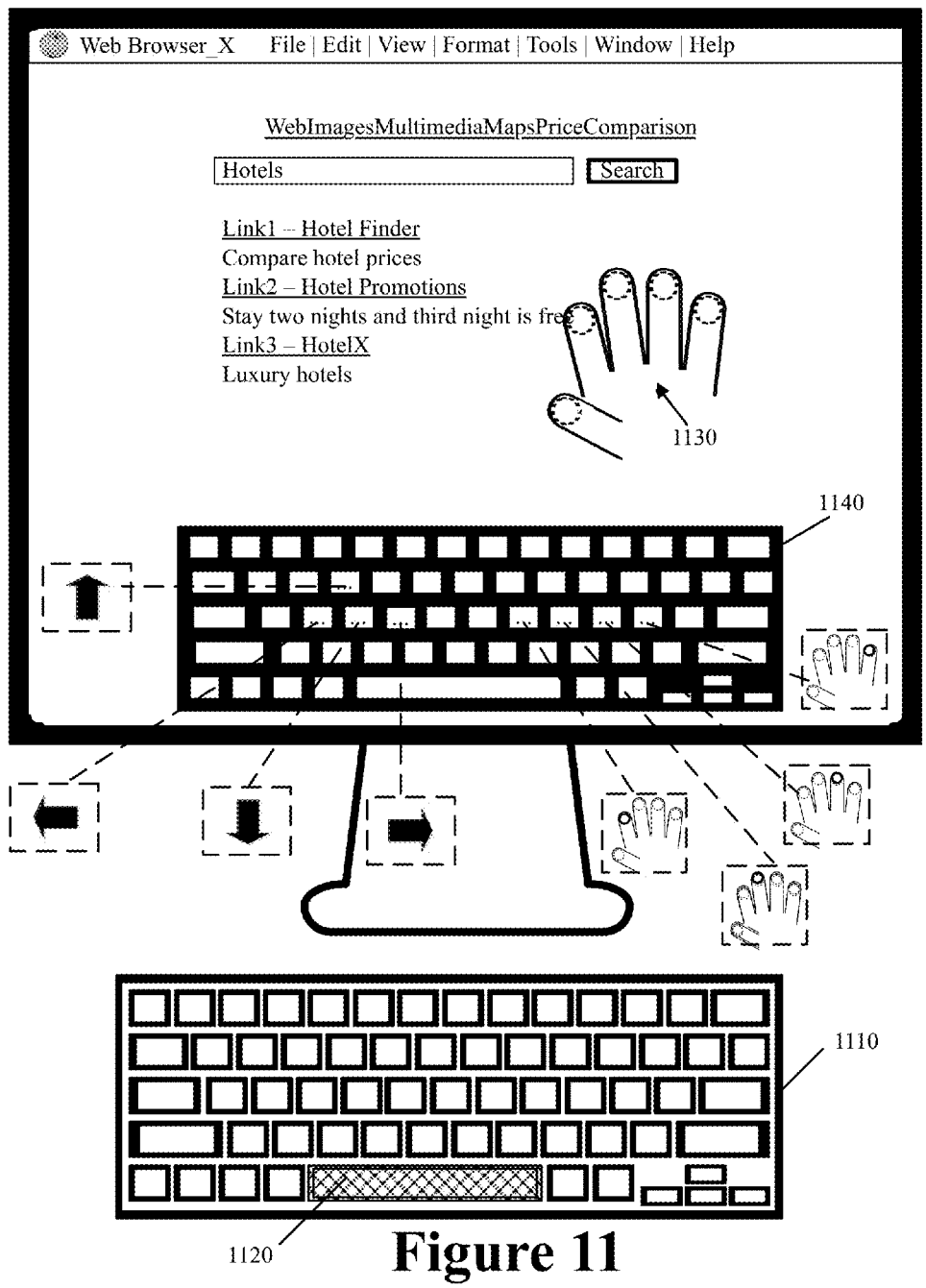
FIG. 11 illustrates an embodiment whereby a standard keyboard is used to operate the MT pointer.

For example, FIG. 11 illustrates an embodiment whereby a standard keyboard 1110 is used to operate the MT pointer, including moving the MT pointer on the screen. Pressing and holding the space bar 1120 causes the MT pointer 1130 to appear on-screen. In some embodiments, an animation is presented which helps bring the user's focus to the location of the MT pointer 1130. Also, an on-screen keyboard 1140 appears which identifies the various keys of the keyboard 1110 that may be utilized to invoke various MT pointer 1130 functionality or other functionality. As shown, the "F" key can be used to move the MT pointer 1130 right, the "D" key can be used to move the MT pointer 1130 down, the "S" key can be used to move the MT pointer 1130 left, the "E" key can be used to move the MT pointer 1130 up, the "J" key can be used to activate the index finger digit indicator, the "K" key can be used to activate the middle finger digit indicator, the "L" key can be used to activate the ring finger digit indicator, and the "Semicolon" key can be used to activate the little finger digit indicator. Accordingly, when the "F" key is pressed, the MT pointer 1130 moves to the right.

In some embodiments, pressing or holding any of the "E", "S", "D", and "F" keys also changes the on-screen keyboard 1140 to show a new or modified set of options. For example, pressing and/or holding the "F" key with the "D" key (down) causes the MT pointer 1130 to move in both the leftward and the downward directions at a 45 degree angle until the "D" key is released and then movement continues to the right until the "F" key is released. As another example, when pressing or holding any of the "E", "S", "D", and "F" keys, the "L" key can also be pressed to increase the speed with which the MT pointer 1130 moves in the direction associated with the "E", "S", "D", or "F" key being pressed or held. Releasing the "L" key resumes the normal slower movement speed.

In some embodiments, an on-screen indicator, such as an arrow, appears on-screen to clearly show the current movement direction and to aid the eye in tracking the MT pointer 1130 as it moves across the screen. With the MT pointer 1130 properly positioned on a desired UI element, the user taps the "J" key to activate the UI element below the index finger digit indicator of the MT pointer 1130. Finally, the user releases the space bar 1120 which hides the MT pointer 1130 and the on-screen keyboard 1140, and the user may resume normal typing.

c. Enhanced Keyboard with Single Touch Key

In some embodiments, the MTI is operable using an enhanced keyboard that includes at least one touch sensitive key and software for adapting touches applied over the touch sensitive key or keys to emulate trackpad functionality. The software may be stored on specialized hardware of the enhanced keyboard, such as in a controller of the enhanced keyboard. In some such embodiments, the controller is implemented with firmware that is executed using an integrated circuit (IC) of the enhanced keyboard. The controller converts raw touch data sensed over the touch sensitive key and keyboard key presses and key releases into appropriate real-time messages that are then communicated via an appropriate protocol such as USB or Bluetooth to the host device (i.e., the OS of the computing system) on which the MTI executes.

In a preferred single touch sensitive key embodiment shown in FIG. 12, the touch sensitive key is the spacebar key 1210. In some embodiments, the touch sensitive spacebar 1210 is enlarged with respect to a traditional spacebar key in order to provide a larger touch surface over which trackpad functionality can be emulated. The touch sensitive spacebar key 1210 includes one or more touch sensitive layers that provide touch and motion detection over the key using capacitive, resistive, or other touch or presence sensing technologies. When the user's fingers are over the home position keyboard keys, the natural resting position of the thumb of either hand is over the spacebar 1210. The thumb of either hand can therefore be used to perform various touches or movements over the touch sensitive spacebar 1210 without removing the other fingers from atop the home keyboard keys (e.g., "A", "S", "D", "F", "J", "K", "L", and "Semicolon" keys).

Figure 14:
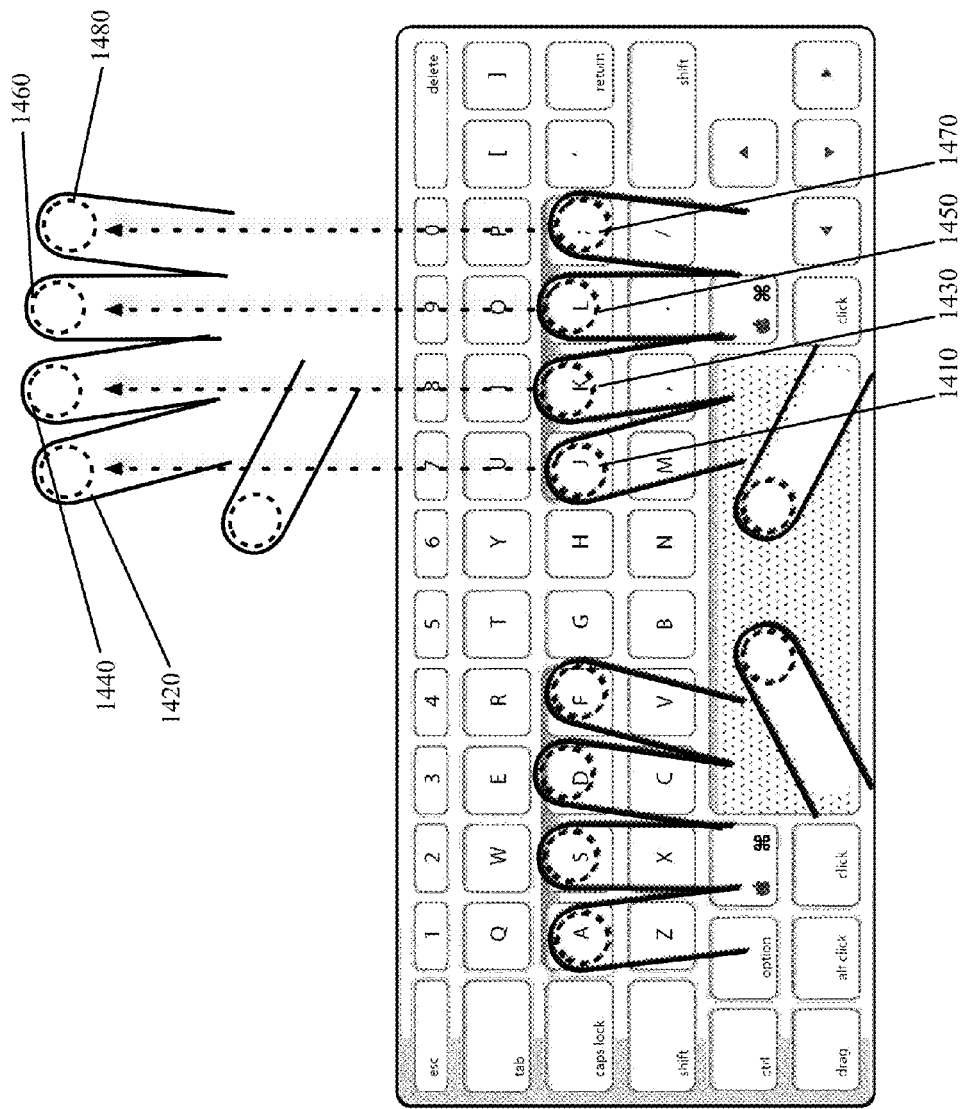

In some embodiments, touch movements performed on the spacebar 1210 when the spacebar 1210 is not fully pressed down can be used to perform traditional pointer movements onscreen. In some embodiments, holding down the spacebar 1210 enables the MTI functionality. Then while continuing to hold down the spacebar 1210, touch movements that are performed on the touch sensitive spacebar 1210 may be used to move the MT pointer as shown in FIG. 13. When the MTI functionality is enabled, the home keyboard keys are usable to activate the MT pointer digit indicators as shown in FIG. 14. Specifically, FIG. 14 illustrates the correspondence between the home keys of the enhanced keyboard and the digit indicators of the MT pointer in accordance with some embodiments. When the MTI functionality is enabled, the "J" keyboard key 1410 can be used to activate the index finger digit indicator 1420, the "K" keyboard key 1430 can be used to activate the middle finger digit indicator 1440, the "L" keyboard key 1450 can be used to activate the ring finger digit indicator 1460, and the "Semicolon" keyboard key 1470 can be used to activate the little finger digit indicator 1480. In other embodiments, the MTI functionality is enabled by pressing and holding a different keyboard key or keys, or by a gesture or other sensing means.

Figure 15:
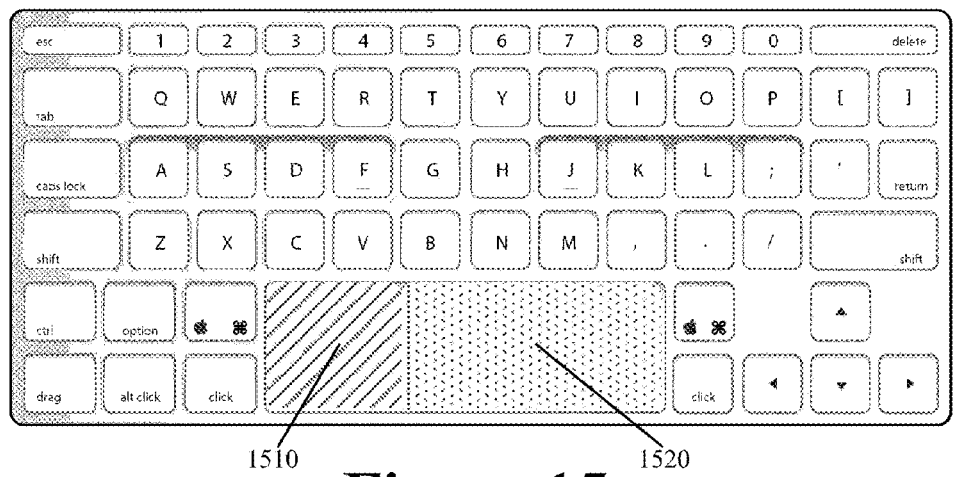
FIG. 15 illustrates adapting the touch surface of the touch sensitive spacebar keyboard key to provide different functionality depending on where a touch or tap is applied to the spacebar.
Figure 16:
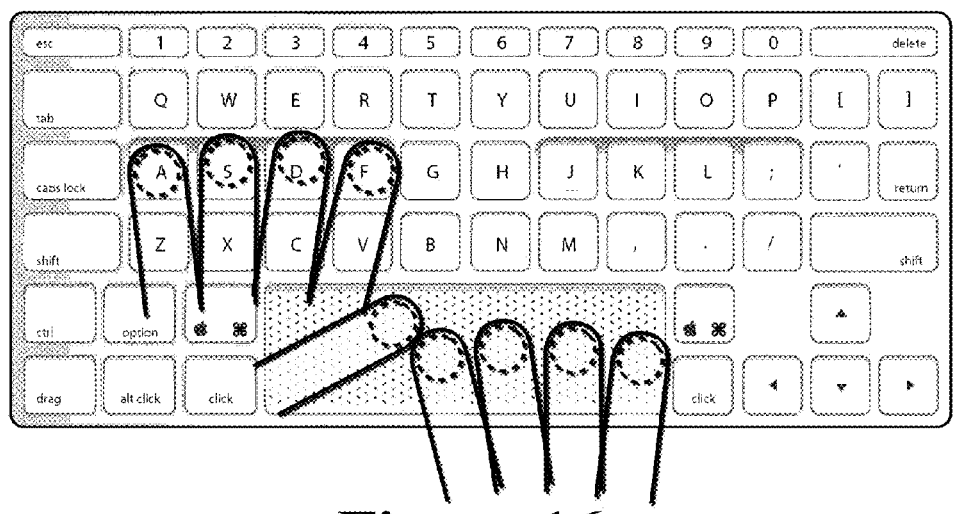
FIG. 16 illustrates usage of the enhanced keyboard with fingers of one hand providing touches and gestures on the spacebar where such touches and gestures can be used to emulate traditional trackpad functionality, move the MT pointer when the MTI is enabled, and activate the various digit indicators of the MT pointer when the MTI is enabled.

Other embodiments of the enhanced keyboard are shown in FIGS. 15 and 16. FIG. 15 illustrates adapting the touch surface of the touch sensitive spacebar keyboard key to provide different functionality depending on where a touch or tap is applied to the spacebar. Specifically, in some embodiments, the touch surface of the spacebar is split into two regions 1510 and 1520. Taps applied over the first region 1510 may be interpreted by the enhanced keyboard controller and associated software differently than taps applied over the second region 1520. For example, in some embodiments, a tap to the first region 1510 is interpreted as a mouse left-click without having to hold down the spacebar and a tap to the second region 1520 is registered as a mouse right-click only when the spacebar is held down. This region sensing capability is combined with previously disclosed thumb/finger contact area sensing for more accuracy in some embodiments. Such region sensing areas include two or more non-rectangular areas in some embodiments, and such areas may change dynamically in response to user activity and/or system state. For example, in some embodiments the area where the user normally rests the left thumb may be tracked, and subsequent touches and taps to that area are not translated into a mouse click or any other message, as this contact area is used to depress and hold the spacebar down for MTI activities, and/or enable scrolling in conjunction with slides on other areas or keys, or as a modifier key used in combination with flag keys.

In some embodiments, the touch surface of the spacebar of the enhanced keyboard recognizes multiple touches as distinct touches. As such, multi-touch gestures may be performed on the spacebar to emulate multi-touch trackpad functionality. Moreover, the digit indicators of the MT pointer can be activated directly using the touch surface of the spacebar. FIG. 16 illustrates usage of the enhanced keyboard with fingers of one hand providing touches and gestures on the spacebar where such touches and gestures can be used to emulate traditional trackpad functionality, move the MT pointer when the MTI is enabled, and activate the various digit indicators of the MT pointer when the MTI is enabled. The use of gestures on the spacebar may be enabled with the spacebar in the up or down state, and as previously mentioned, a thumb resting or pressing the spacebar may be essentially filtered so that the touch event(s) do not affect the gesture(s) performed on other areas of the spacebar. Further description of the enhanced keyboard is provided in United States Provisional patent application entitled "Input Device User Interface Enhancements", having Ser. No. 61/465,345, and a filing date of Mar. 17, 2011.

D. MTI Implementation

In some embodiments, the MTI is implemented as a software application or a background process of an operating system (OS). In some other embodiments, the MTI is integrated as part of operating system (OS) or GUI functionality. Through the use of various interfaces, system calls, application programming interface (API) calls, or other integration tools, the MTI gains access to data and events that are provided by input devices such as a mouse, trackpad, keyboard, enhanced keyboard, etc. It should be apparent that different operating systems and electronic devices provide different means for accessing such data and events. Accordingly, different embodiments of the MTI are adapted to obtain the data and events using the appropriate interface or calls. The MTI processes the data and events to provide the above described MTI functionality.

a. MT Pointer Movement

Figure 17A:
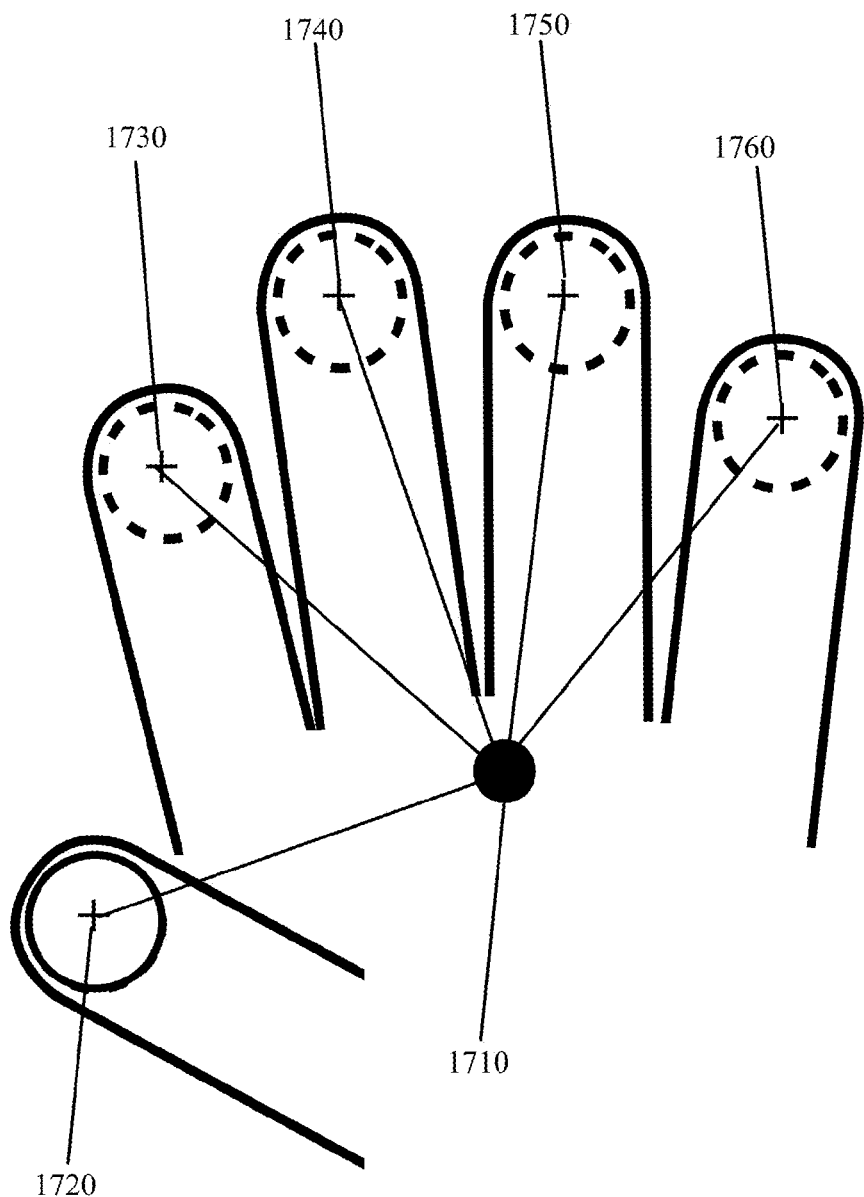
FIG. 17A conceptually illustrates an internal mathematical model for tracking an on-screen position of the MT pointer in accordance with some embodiments.

Core MTI functionality involves tracking MT pointer movement as a whole and activating the appropriate individual MTI digit indicators. FIG. 17A conceptually illustrates an internal mathematical model for tracking an on-screen position of the MT pointer in accordance with some embodiments. In this implementation, the MT pointer is represented as a center point 1710 with offsets 1720, 1730, 1740, 1750 and 1760. The center point tracks the current on-screen position of the MT pointer. Each offset 1720-1760 represents a position of a digit indicator relative to the center point 1710. In some embodiments, the center point 1710 is an x-y on-screen coordinate and each offset is an x-y delta value identifying a directional distance from the center point 1710. The graphical representation for the MT pointer is approximately centered about the center point 1710 when displayed on-screen and the graphical representation for each digit indicator is shifted to extend from the center point 1710 by the corresponding offset value, and at a rotation that emulates human hand geometry for either the left or right hand. In some embodiments where touch shape and angle data are available, the rotation value is derived from the actual angle of the touch. This is especially important for the thumb digit display, as left-right thumb movement should also affect the rotation value to appear realistic on-screen.

When the MT pointer is moved using a keyboard, mouse, trackpad, touch sensitive spacebar, or other pointing device, the MTI intercepts the data and events that quantify the movement, and the MTI adjusts the position of the center point 1710 relative to intercepted data or events. In embodiments where a trackpad or other multiply touch sensitive device is used with the MTI, a single touch with subsequent slides is used to make corresponding movements of the MT pointer. Two or more essentially simultaneous touches which are then slid in an essentially fixed-relationship fashion also cause a corresponding movement of the MT pointer as a whole. Two or more touches that are held and then slid in essentially non-fixed-relationship fashion cause the inter-digit indicator offsets to change so that they reflect the offsets of the fingers on the trackpad. In some embodiments, when the MT pointer is active, a highlight ring appears for touches that are currently in contact with the trackpad.

In some embodiments, the position of the MT pointer tracks the existing GUI pointer of the operating system, such that the x-y coordinates of the GUI pointer are equal to the center of the index finger digit indicator. Offsets to the other digit indicators and center point remain consistent. When the MTI is invoked, the GUI single pointer is hidden and the MT pointer appears such that the position of the index finger center is in its place. In other embodiments, the position of the MT pointer is independent of the GUI pointer, and the last position of the MT pointer is used as the starting point when the MTI is newly invoked. In some embodiments, the position of the MT pointer is saved on a per-application basis so that the user may leave the MTI positioned above certain UI elements in each application. This per-application MT pointer data is saved so that when the application is re-launched the persisted MT pointer position is restored. When the MT pointer is first invoked in an application which has no such saved location data, the GUI pointer is used as the index finger digit indicator location. Furthermore, some embodiments provide for various locations of the MT pointer and digit indicators to be saved, along with the UI elements that have been invoked at that proximate position. This allows functionality such as the MT pointer position snapping to previous known locations, and also requiring confirmation in some cases when a UI element has not been previously activated by a particular digit indicator.

As described in the operation section above, the size adjustment function and the digit indicator position adjustment function adjust the offsets 1720-1760 relative to the center point 1710. In some embodiments, the size adjustment function is performed by applying a multiplier to the offsets 1720-1760, where the multiplier is greater than one when increasing the size of the MT pointer and less than one when decreasing the size of the MT pointer. The digit indicator position adjustment function is used to individually adjust the relative positions of each of the digit indicators. When the digit indicator position adjustment function is performed for a particular digit indicator, the offset for a particular digit indicator is adjusted relative to the center point 1710. In other embodiments, the offsets are determined directly from touch data that corresponds with each digit.

Figure 17B:
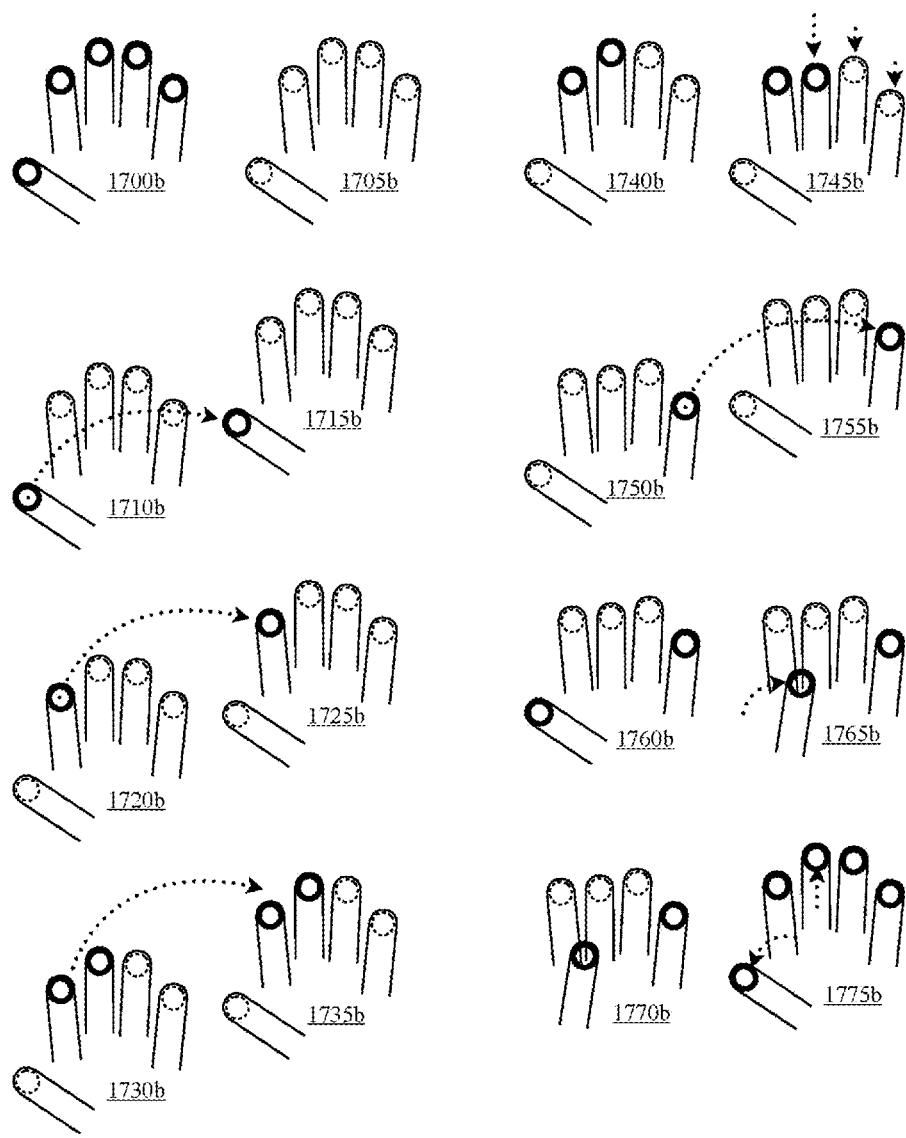
FIG. 17B illustrates MT pointer movement in an embodiment which processes touch data from a device such as a trackpad which tracks multiple digits.

FIG. 17B illustrates MT pointer movement in an embodiment which processes touch data from a device such as a trackpad which tracks multiple digits. An MT pointer with all 5 digits touching 1700*b* is indicated by dark circles centered at each of the touch locations. The same MT pointer when the 5 touches are removed 1705*b* is distinguished by dotted circles. When the thumb is touching 1710*b* and is then slid to a new location 1715*b*, the MT pointer maintains the inter-digit relationships such that the entire MT pointer tracks the thumb movement. A touching index finger 1720*b* can also be used to move the entire MT pointer 1725*b* to various on-screen locations. In some embodiments, when any single touching digit slides or flicks on the touch surface, the entire MT pointer moves as a single entity, responding in a way analogous to traditional single pointer movement, with settings and algorithms for tracking speed, simulated inertia, etc. When two fingers are touching 1730*b* and slid to a new location 1735*b* in an essentially parallel or fixed-relationship manner, the MT pointer also moves as a single entity to the new location. When two touches 1740*b* are moved in a non-parallel or non-fixed-relationship manner 1745*b*, the MT pointer center point is moved in relation to the touching digit movements, with offsets updated to that new center point, and non-touching digits are moved according to their pre-existing offsets. When the touches are lifted, the inter-digit spacing, or shape, of the MT pointer is retained. The ability to change the inter-digit spacing allows the user to change the shape of the MT pointer easily. When a touch of the little finger is applied 1750*b* and then slid to a new location 1755*b*, the MT pointer is moved as a group and the shape of the MT pointer is retained. To more closely emulate human hand movement geometry, some embodiments calculate thumb movements independently from finger movements. For example, when a thumb touch is added to the previous little finger touch 1760*b*, a slide of the thumb (while the little finger remains stationary) 1765*b* causes the thumb to move (and change angle) while all fingers remain stationary. This is in contrast to a thumb movement where no fingers are touching 1715*b*, which moves the entire MT pointer. If any finger is touching, thumb movement is treated independently, and in some embodiments is offset from the index finger rather than the center point. From the previous position 1770*b*, when all digits touch 1775*b*, the MT pointer assumes a new shape by updating the inter-digit spacing to reflect the current touch positions. Thus, the MT pointer moves both as a group based on overall digit movement, and independently based on inter-digit relationships within the overall movement.

In some embodiments, the MT pointer is assigned a default size and position for the digit indicators. When either the size of the MT pointer or the position of the digit indicators is changed, the MTI stores the change so that any changes are retained whenever the MTI is enabled. Some embodiments store the size of the MT pointer and the position of the digit indicators on a per application basis. This allows for the MT pointer to be customized according to the layouts of different applications whereby a first application may have UI elements sized and spaced differently than a second application. By providing the per application customizations, users can adjust the size of the MT pointer and offsets of the digit indicators once per application and when that application becomes frontmost, the MT pointer and digit indicators change according to the settings specified for that application. To provide such customizations, the MTI includes a database or a configuration file to store the per application customizations. Additionally, the MTI tracks the frontmost application using system state information that is obtainable via various system or application programming interface (API) calls. In some embodiments, the size and or spacing of the MT pointer changes depending on the position of the MT pointer. Specifically, the UI elements below the MT pointer adjust the position of individual digit indicators in order to match positions as closely as possible for a one-to-one correspondence between the digit indicators and the UI elements below.

b. MTI Digit Indicator Activation

To activate the appropriate digit indicator when the MTI is touch operated (using a trackpad or touch sensitive enhanced keyboard), the MTI performs one or more touch assignment processes. The MTI includes logic for determining which one or more fingers of which hand are used to perform each touch. The logic performs a touch assignment whereby each detected touch is assigned to control operations of a particular finger (e.g., index, middle, ring, or little). In some embodiments, the touch assignment is performed relative to home positions that are established from a previously issued four finger touch, or a five finger touch if the thumb is touching.

i. Establishing Home Positions

In some embodiments, the MTI establishes a home position for each of the index, middle, ring, and little fingers whenever four essentially simultaneous touches are registered as a valid four finger touch. The home positions are retained in memory until a new valid four essentially simultaneous touches are performed. As will become evident from the discussion below, the home positions are used in determining which finger is assigned to each touch. As noted above, a touch of the thumb of either the left or right hand is distinguishable from touches of other fingers because of the geometry (e.g., size, shape, and angle) of the contact area of a touch produced by the thumb.

Upon receiving a valid four finger touch from which home positions can be established, the MTI determines (i) a center point of the four finger touch and (ii) offsets of each touch from the center point. The center point is a single point of a mathematical model which tracks movement of the user's hand in order to keep the home positions aligned with the user's hand as new touches are added and existing touches are moved. The MTI derives the home positions based on the offsets from the current center point position. Each of four offsets from the current center point position establishes a home position for a particular touch of the index, middle, ring, and little fingers. Accordingly, the center point is a single point from which individual digit proximities can be derived when analyzing new touches, and by which existing touches that move can bias the center point so it can be used as a basis for future calculations. Once the offsets for each touch are computed, the mathematical model is established and predictive zones for each home position are calculated.

ii. Proximity Assignment

Proximity assignment involves comparing the x-y coordinates of a detected touch to the x-y coordinates of previously established home positions. If the touch is a tap gesture, the detected touch is then used to activate the MT pointer digit indicator that is associated with whichever finger's home position is closest to the detected touch.

For a single finger tap, some embodiments identify which digit indicator of the MT pointer to activate by comparing the x-y coordinates of the tap to the x-y coordinates of established home positions. The tap activates the digit indicator with established home position x-y coordinates that are closest to the x-y coordinates of the tap. Other embodiments utilize more complex algorithms wherein home positions may be biased by previous activity such as slides. Still other embodiments take into account information about the UI element that would be the target of the proposed tap. For example, an assignment to the middle finger using a basic algorithm may not yield a valid UI element, whereas an assignment to the index finger would yield a valid UI element. Furthermore, historical data representing previous successful UI element invocations with the proposed finger assignment are included in the analysis of some embodiments.

Figure 18A:
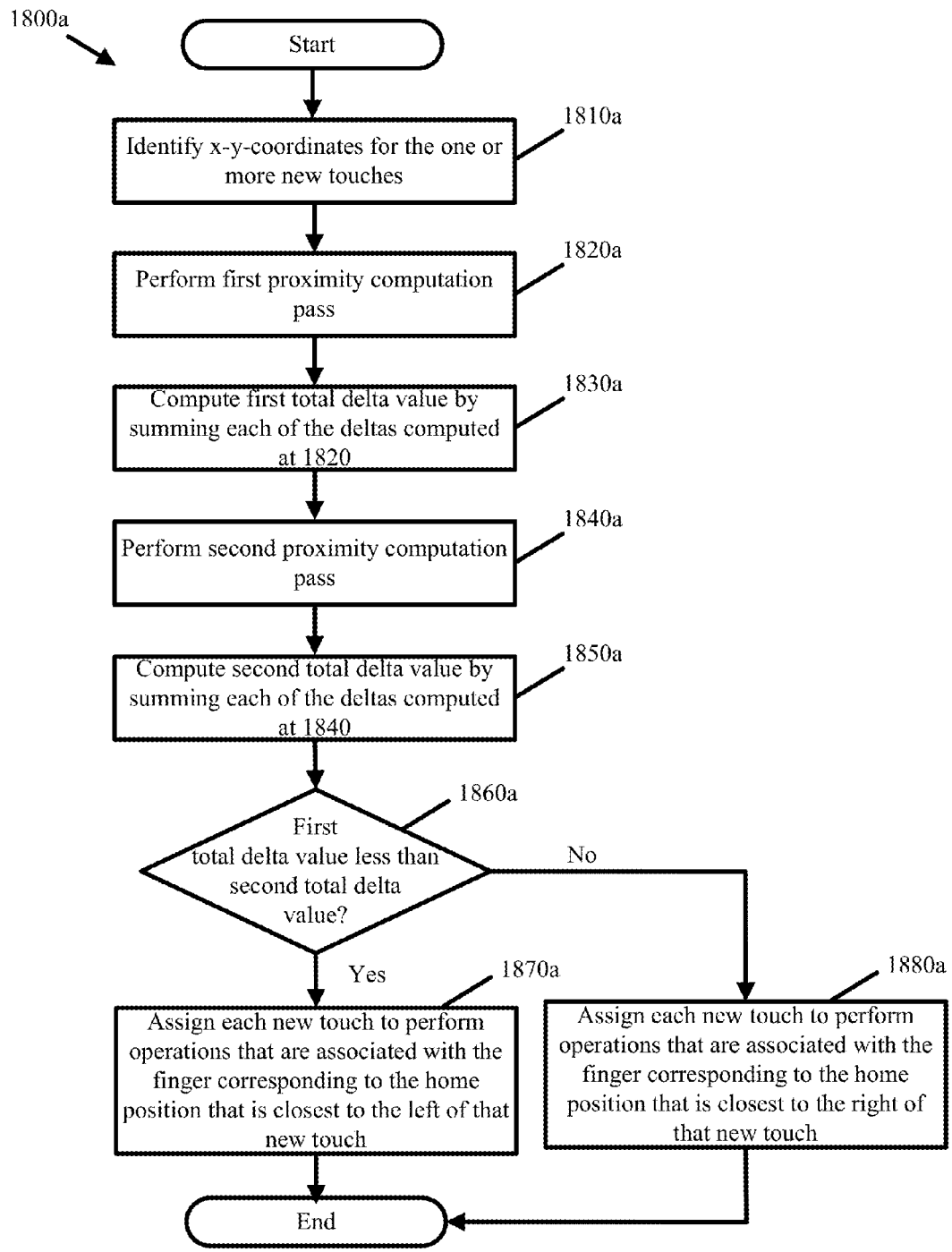
FIG. 18A presents a proximity assignment process performed by the MTI to determine which touch corresponds with which finger in accordance with some embodiments.

For a two or more finger touch or tap, the digit indicator identification/assignment is slightly more complex. Since two different detected touches can both be closest to a single home position, the MTI performs the proximity assignment process in two passes as described below in FIG. 18A. FIG. 18A presents a proximity assignment process 1800a performed by the MTI to determine which touch corresponds with which finger in accordance with some embodiments. The process begins when one or more touches are newly detected.

The process identifies (at 1810a) the x-y coordinates for the one or more new touches. The process performs (at 1820a) a first proximity computation pass. For the first proximity computation pass, the process (i) identifies which previously established home position is closest to the left of each newly detected touch and (ii) computes a delta or distance between the x-y coordinate for each newly detected touch and the x-y coordinate for the home position that is closest to the left of that newly detected touch. The process sums each of the deltas computed at step 1820a to compute (at 1830a) a first total delta value. The process then performs (at 1840a) a second proximity computation pass. For the second proximity computation pass, the process (i) identifies which previously established home position is closest to the right of each newly detected touch and (ii) computes a delta between the x-y coordinate for each newly detected touch and the x-y coordinate for the home position that is closest to the right of that newly detected touch. The process computes (at 1850a) a second total delta value by summing each of the deltas computed at step 1840a.

The process compares (at 1860a) the first total delta value to the second total delta value to identify the lowest total delta value. This comparison determines how the MTI will assign the newly detected touches and, as a result, which digit indicator will be activated by the newly detected touch. When the first total delta value is less than the second total delta value, the process assigns (at 1870a) each new touch to perform operations that are associated with the finger corresponding to the home position that is closest to the left of that new touch. Otherwise, the process assigns (at 1880a)

each new touch to perform operations that are associated with the finger corresponding to the home position that is closest to the right of that new touch. Other touch assignment processes (e.g., shift assignment and release reassignment) are described in the United State Provisional patent application entitled "Touch Enhanced Interface", having Ser. No. 61/465,309, and a filing date of Mar. 17, 2011.

iii. Shift Assignment

Figure 18B:
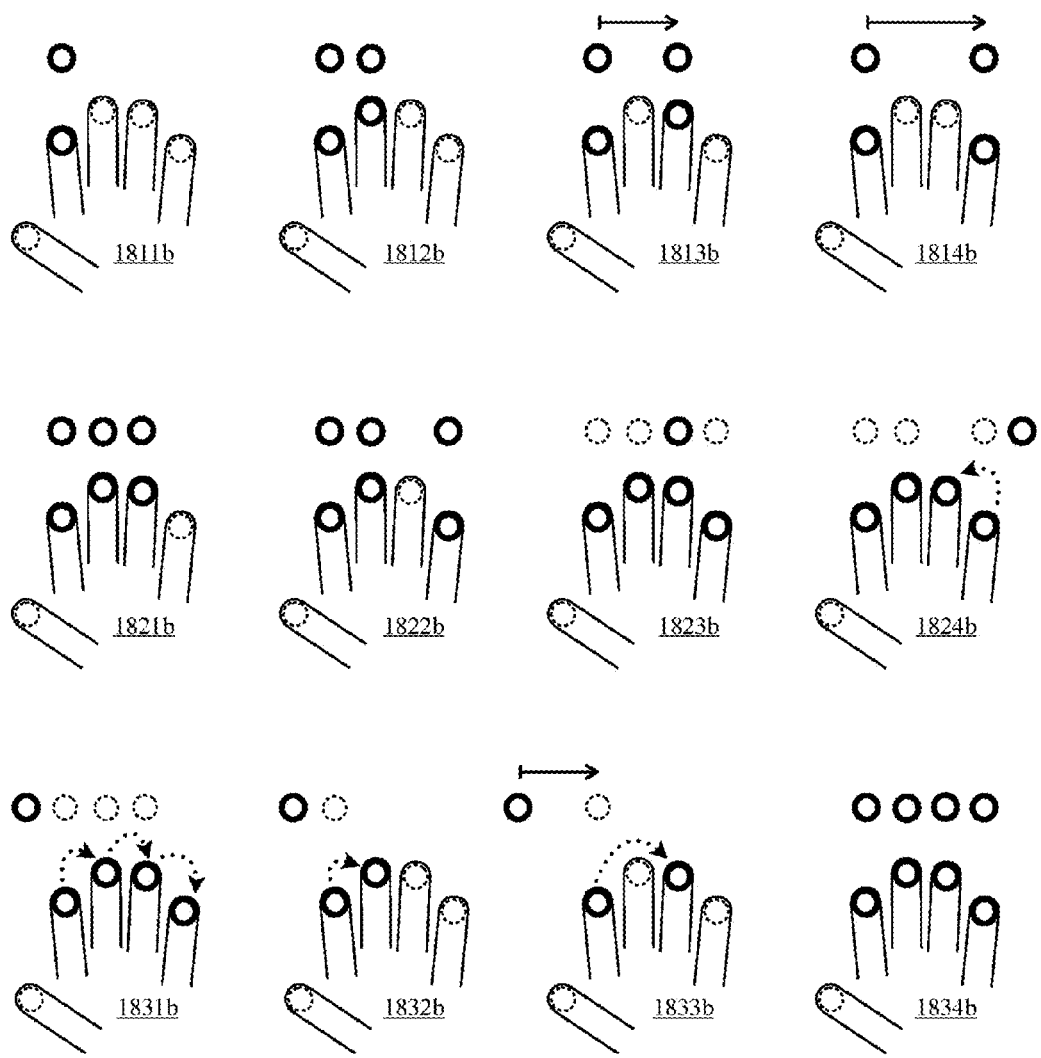
FIG. 18B provides several examples of shift assignments which map touches to fingers without regard to previous touch assignment locations.

Shift assignment is used in some embodiments when home positions are not suitable, such as when the user has repositioned the hand after some period of time, or after switching back from keyboard operation. FIG. 18B provides several examples of shift assignments which map touches to fingers without regard to previous touch assignment locations. When a single touch is detected as depicted in 1811*b* as a bold circle above the MT pointer, the touch is mapped to the index finger as indicated by the bold circle on the index finger in 1811*b*. If two touches are essentially simultaneously detected 1812*b*, they are assigned to the index and middle fingers if the x-axis spacing is approximately finger width apart. If two touches are wider apart, index and ring assignment is determined, and even wider two touch spacing 1814*b* results in an index, little finger assignment. Some embodiments track finger width spacing dynamically and per user. If three essentially simultaneous touches are received 1821*b*, they are assigned to the index, middle and ring fingers unless there is a significant x-axis space between two of the digits. If the significant space is between the second and third touches 1822*b*, index, middle and little finger assignments would result. Subsequently, if a new received touch has an x-axis coordinate that is between the x-axis of the middle and little finger 1823*b*, the new touch is assigned to the ring finger. As depicted for 1823*b* and the subsequent diagrams, dotted circles represent previous touches that remain held down and bolded solid circles represent new touches. Unlike 1823*b*, if the new touch has an x-axis coordinate that is greater than the current little finger assignment's x-axis position 1824*b*, this indicates that a re-assignment must occur such that the touch of the little finger is re-assigned to the ring finger, and the new touch is assigned to the little finger. As another example of reassignment, if three fingers are assigned to the index, middle and ring fingers 1821*b*, and a new touch is detected with an x-axis coordinate that is to the left of the other touches 1831*b*, re-assignments must occur to accommodate the new touch assignment to the index finger as indicated by the dotted line arrows. Similarly, if a single touch is assigned to the index finger and a new touch has a lower x-axis value 1832*b*, the touch of the index finger is re-assigned to the middle finger to accommodate the assignment of the new touch to the index finger. If there is significant x-axis spacing between the previously assigned touch and the new touch 1833*b*, the previous touch will be re-assigned to the ring finger, and the new touch assigned to the index finger. If four essentially simultaneous touches are received 1834*b*, the assignment is determined by the x-axis ordering of the touches. In practice, if the user wishes to assign a touch to, for instance, the little finger, they can simply touch all four fingers down and then release the index, middle and ring fingers.

Figure 18C:
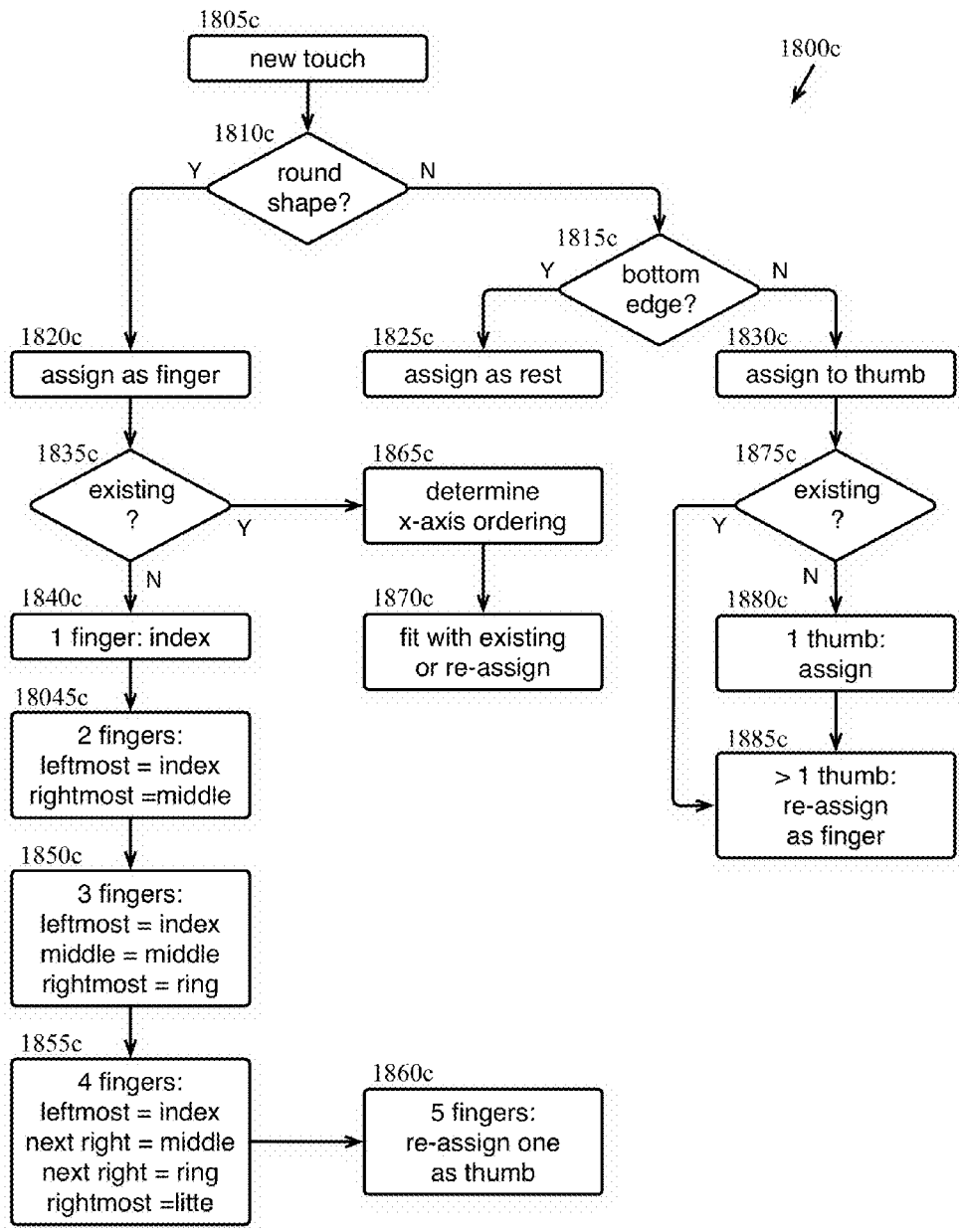
FIG. 18C provides a process used in some embodiments to make assignment determinations when finger, thumb and resting touches are considered.

It should be noted that touches may begin, move and end at any time and in any combination, so the MTI system must accommodate more scenarios than the representative examples just given. Furthermore, thumb detection is also considered in assignment and re-assignment, based on the geometry and attributes of received touches. FIG. 18C provides a process used in some embodiments to make assignment determinations when finger, thumb and resting touches are considered. The process 1800*c* starts when a new touch is received (at 1805*c*). The MTI system may coalesce multiple touches that began essentially simultaneously so that they can be evaluated as a group, which aids in the assignment process. At 1810*c* a determination is made about the actual contact shape of the touch or touches. Typically, the contact area for a finger is rounder (less elongated). This and other attributes, including user touch history are used to determine if the touch or touches were generated by a finger as opposed to a thumb or a resting palm. A finger designation (at 1820*c*) expects one to four touches corresponding with the fingers of either left or right hand. The left-right hand determination is made in some embodiments by touching all 5 digits, at which time the hand orientation is set until it is changed by the user. For clarity, the balance of this process will assume right hand orientation. At 1835*c* a determination is made as to whether any previously assigned fingers are still touching. If not, assignments are made according to the number of essentially simultaneous touches and their positions. If there is only one detected touch, it is assigned (at 1840*c*) to the index finger. If there are two touches, the leftmost touch is assigned (at 1845*c*) to the index finger and the rightmost to the middle finger. FIG. 18B provides some detail about the spacing of the touches as to whether the rightmost touch is potentially mapped to the ring or little finger. For the sake of clarity, fingers in this process are assumed to be not broadly spaced. If three fingers are detected, they are assigned (at 1850*c*) to the index, middle and ring fingers, and if four fingers are detected, they are assigned (at 1855*c*) by increasing x-axis position to the index, middle, ring and little fingers. If five fingers are detected, this is an indication that a previous finger/thumb determination was incorrect. Further analysis is utilized to re-assign (at 1860*c*) one of the fingers as a thumb. Such analysis usually concludes that the lowest y-axis touch, and usually the lowest x-axis touch should be assigned to the thumb. If it was determined (at 1835*c*) that there were pre-existing finger assigned touches, the process determines the x-axis ordering of all finger touches and either fits (at 1870*c*) the new touches in sequentially with the prior finger touches, or determines that certain of the prior finger touches must be re-assigned. Further detail on this aspect of the process is provided in FIG. 18B above. If the initial shape and attribute determination (at 1810*c*) determines that a touch was not made by a finger, the process next determines (at 1815*c*) if the touch is at the bottom edge of the device or exhibits other characteristics of a touch that is resting on the surface. If so designated, the touch is assigned (at 1825*c*) as a resting touch and it does not figure into further hand geometry calculations nor trigger any output action. If the determination (at 1815*c*) is not a resting touch, then it is determined (at 1830*c*) to be a thumb touch. The process checks (at 1875*c*) to see if there is already an existing thumb-designated touch down at, and if not the touch is assigned (at 1880*c*) to the thumb. If there were more than one new touches that were characterized as thumb touches, or if there was an existing thumb touch down when a new one was detected, the process re-evaluates (at 1885*c*) the touches based on the current touch data and locations to re-assign (at 1820*c*) some touches as finger touches.

iv. Hybrid Assignment

The MTI system employs various digit assignment processes such as the proximity and shift assignment processes detailed above. In some embodiments, combinational assignments are utilized in series or in tandem to improve the accuracy of touch to digit assignments. Furthermore, the MTI can accept input from a variety of presence sensing and other technologies (such as image or infrared sensors) to improve the accuracy of the touch to digit assignment process. For example, a trackpad or other sensing hardware can be used by the MTI to monitor a user's hand, finger, and palm positions even when no touches are directly applied to the touch surface of the trackpad or other sensing hardware. Specifically, the sensing capabilities of the trackpad or other sensing hardware can be enhanced to identify a user's hand proximity as it hovers over the touch surface. It should be noted that the accuracy of this proximity does not necessarily need to be precise in order to still provide cues to the MTI, so that it can increase the accuracy of the touch to digit assignment process.

MTI digit indicator activation is simpler process when a keyboard is used as a digit indicator activation mechanism. Specifically, when the MTI is enabled, a "J" keyboard key press activates the index finger digit indicator, a "K" keyboard key press activates the middle finger digit indicator, an "L" keyboard key press activates the ring finger digit indicator, and a "Semicolon" keyboard key press activates the little finger digit indicator.

Digit indicator activation involves issuing an event that represents the activation at the current location of the corresponding digit indicator. The event may include a mouse left-click action, a mouse right-click action, a mouse double-click action, a hold action, a drag action, a scroll action, etc. The specified location is determined based on summing the center point of MT pointer with the offset position of the activated digit indicator. The event is passed to the OS or the appropriate frontmost application for processing. In some embodiments, the MTI is unconcerned with whether activation of a digit indicator results in any functionality being performed (e.g., selection being made or output action being invoked). The determination as to whether the issued event produces any functionality is left to the OS or frontmost application event handler.

c. MTI UI Element Disambiguation

In a traditional GUI pointer, there is an attribute called a "hotspot" which is the exact single x-y coordinate at which UI element disambiguation occurs. For example, the arrow pointer in many existing GUI implementations is an icon that looks like an arrow pointing up and to the left. If only the tail end of this icon is placed above a UI element and the user clicks, activation of that UI element will not occur, because only the hotspot of the arrow icon is relevant, and the rest of the icon is as a visual aid only. The position of the hotspot may change depending on which pointer icon is current. In the case of the above described pointer icon, the hotspot is typically near the top left of the arrow icon.

The present invention departs from this single-coordinate hotspot paradigm in favor of a "hotzone", wherein there is a much larger area in which the user may click on or otherwise access a particular UI element. This allows the user to more easily navigate the UI, because less precise pointer movement is required. In some embodiments, the hotzone is displayed on-screen as a transparent circular area at the end of a semi-transparent digit indicator.

Figure 19:
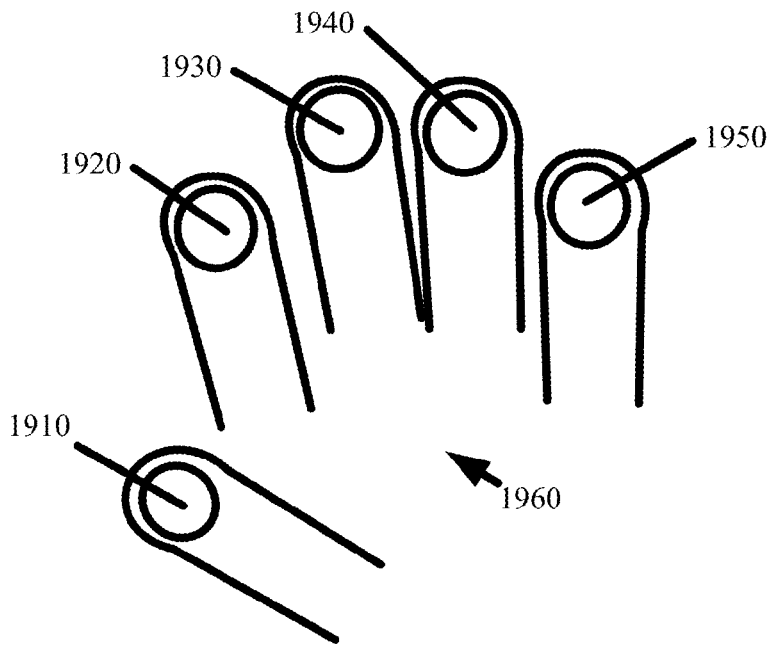
FIG. 19 illustrates hotzones that are associated with each digit indicator of the MT pointer in accordance with some embodiments.

FIG. 19 illustrates hotzones 1910, 1920, 1930, 1940, and 1950 that are associated with each digit indicator of the MT pointer 1960 in accordance with some embodiments. As shown, the hotzones 1910-1950 include circular regions toward the end of each digit indicator. It should be apparent that a hotzone can be any shape comprising an area instead of a single point and need not be embodied as a circular region. Furthermore, it is not necessary for each digit indicator to be associated with a hotzone. For example, the hotzone 1910 for the thumb digit indicator may be omitted in some embodiments.

When the user moves the MT pointer 1960, one or more digit indicators and their hotzones analyze the UI elements below in order to determine which particular UI element (if any) should be highlighted, selected, activated, or otherwise manipulated or utilized. This UI element disambiguation for a particular hotzone is streamlined if there are no other UI elements within the hotzone's area. A further analysis is required if there are two or more UI elements within the hotzone. Such UI element disambiguation is described with reference to FIGS. 21-25 below.

In a traditional GUI, there are many types of UI elements such as windows, text boxes, scrolling fields, sliders, buttons, etc., and these UI elements can be superimposed atop one another in a hierarchy so that, for instance, a button is always atop the window which contains it. This allows the user to click on the button if the pointer is within the bounds of the button, or on the window if the pointer is outside the bounds of the button but within the bounds of the window. In this case, the window may be called a "container" UI element, since it contains other UI elements. Furthermore, clicking on a non-button area of the window may not trigger any particular action. The MTI analyzes this UI element hierarchy and other attributes to determine which UI elements the hotzone should consider in the disambiguation process.

Figure 20:
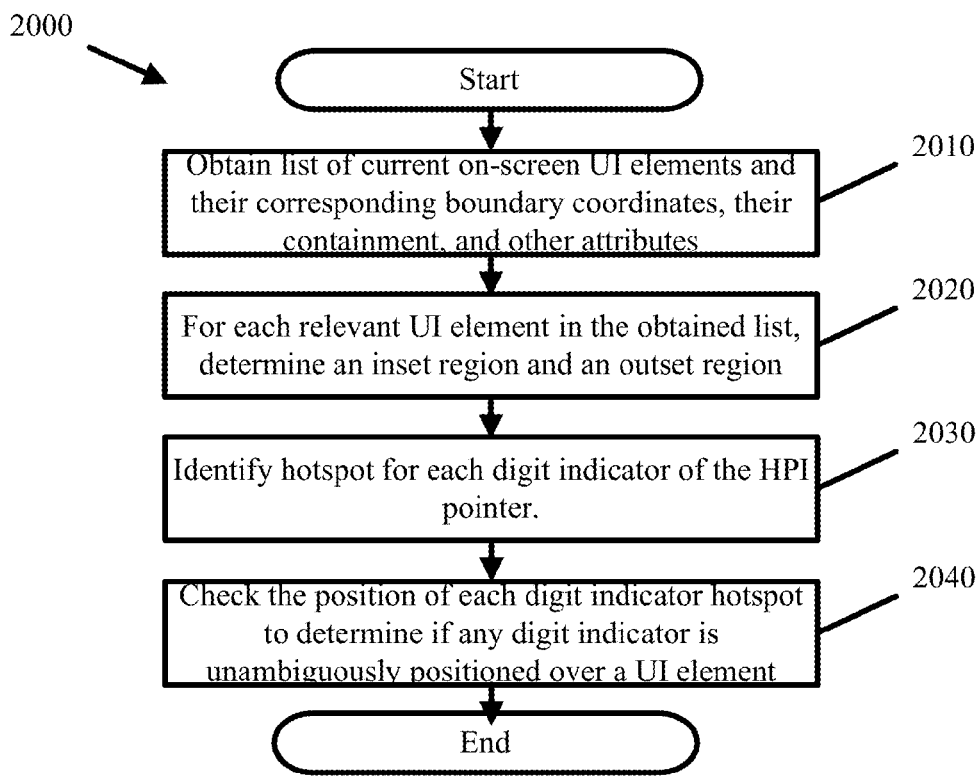
FIG. 20 presents the disambiguation process that is performed by the MTI in accordance with some embodiments.

FIG. 20 presents the disambiguation process 2000 that is performed by the MTI in accordance with some embodiments. The process begins by obtaining (at 2010) a list of current on-screen UI elements and their corresponding boundary coordinates, containment, and other attributes. This list may be obtained from the OS or other system software through a series of API or system calls.

Figure 21:
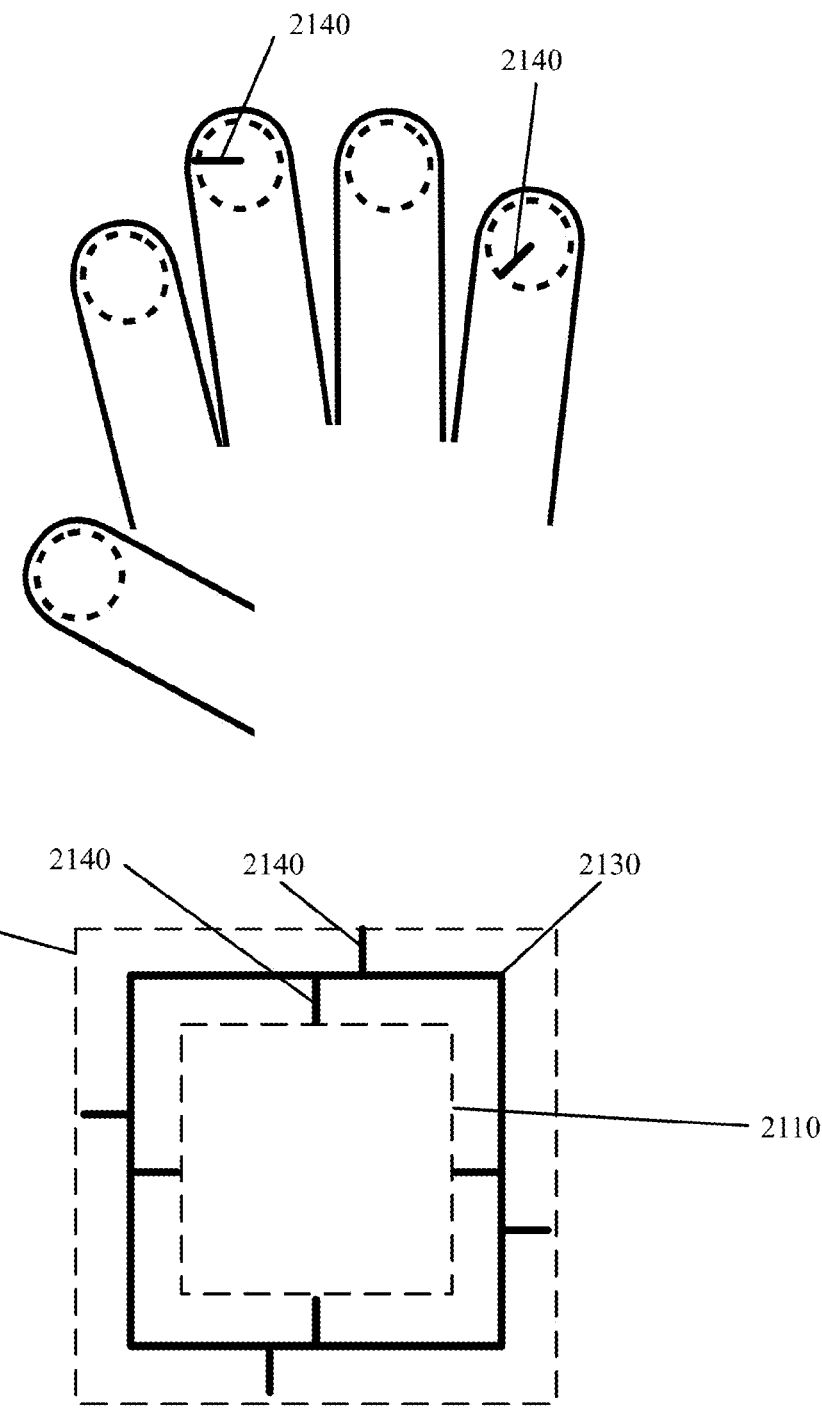
FIG. 21 illustrates an inset region and an outset region for a rectangular shaped UI element.

For each UI element in the obtained list that is relevant, the process determines (at 2020) an inset region and an outset region. To determine the inset region and the outset region, the process first computes the radius of the digit finger hotzone. As the hotzone region for each digit finger indicator has the same area, the radius is a value that is shared by all digit indicators. Next, the process determines the inset region for a UI element by shrinking the boundary for the UI element by the radius. The process determines the outset region for the UI element by expanding the boundary for the UI element by the radius. The inset and outset regions can be any convex shape, however for purposes of clarity, rectangular inset and outset regions are shown in the figures below. FIG. 21 illustrates an inset region 2110 and an outset region 2120 for a rectangular shaped UI element 2130. The original boundary of the UI element 2130 is illustrated by the solid lines, the inset region 2110 is illustrated by the innermost dotted lines, the outset region 2120 is illustrated by the outermost dotted lines, and the radius of the digit indicators is shown by lines 2140.

Figure 22:
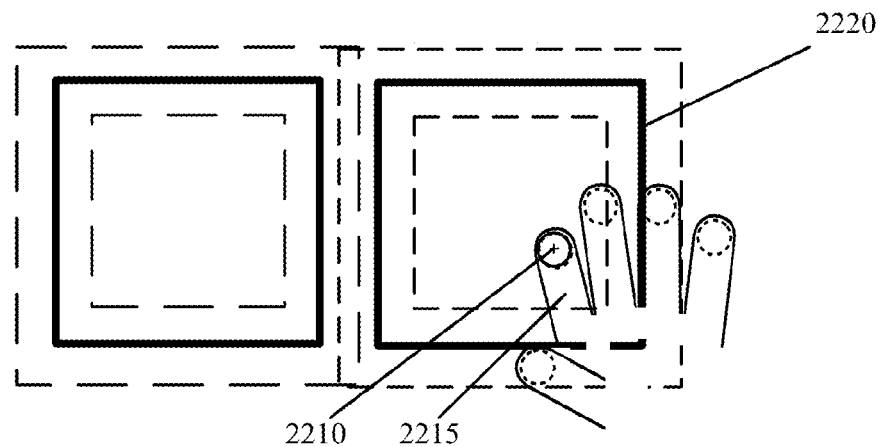
FIG. 22 illustrates when the hotspot of a particular digit indicator falls within an inset region of a UI element, that particular digit indicator is unambiguously positioned over that UI element.
Figure 23:
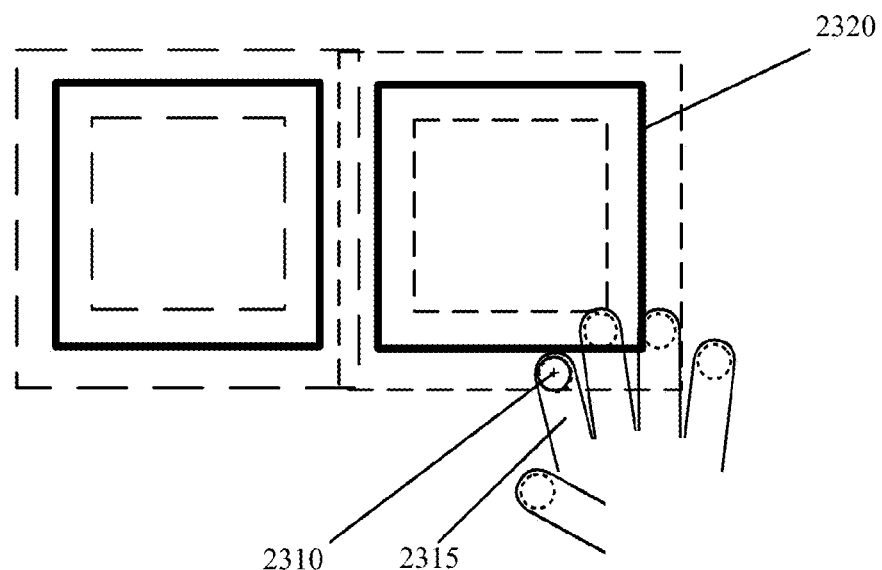
FIG. 23 illustrates when the hotspot of a particular digit indicator falls within an outset region of only a single UI element, that particular digit indicator is unambiguously positioned over that UI element.
Figure 24:
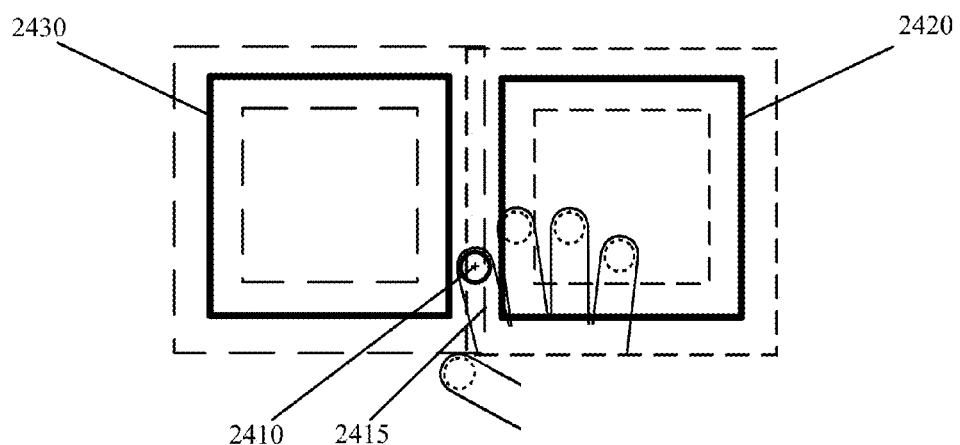
FIG. 24 illustrates when the hotspot of a particular digit indicator falls within the outset regions of at least two UI elements, then that particular digit indicator is ambiguously positioned and therefore cannot be used to activate either of the UI elements.
Figure 25:
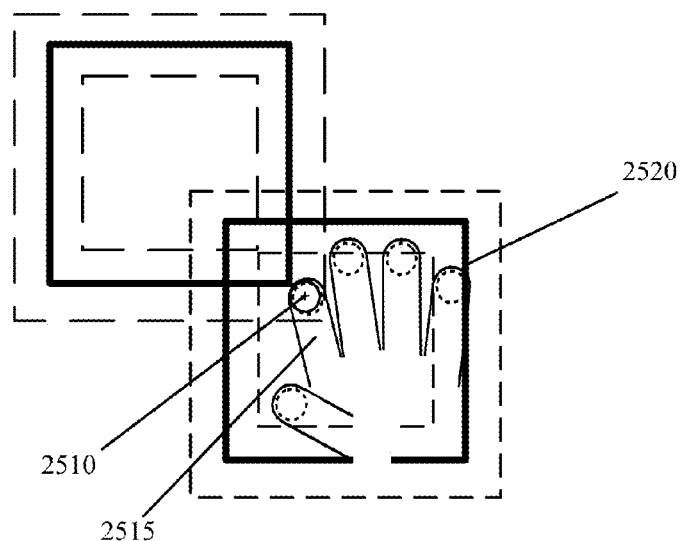
FIG. 25 illustrates when the hotspot of a particular digit indicator falls within the outset region of a first UI element and within the inset region of a second UI element, then that particular digit indicator is unambiguously positioned over the second UI element and can be used to activate the second UI element.

The process identifies (at 2030) a hotspot for each digit indicator of the MT pointer. The hotspot for each digit indicator is the center point within the digit indicator's hotzone. Each digit indicator hotspot is associated with a single x-y coordinate. The position of each digit indicator hotspot is then checked (at 2040) to determine if any digit indicator is unambiguously positioned over a UI element. The following presents the various scenarios that may exist when performing UI element disambiguation and the result of the disambiguation process 2000. As shown in FIG. 22, when the hotspot 2210 of a particular digit indicator 2215 falls within an inset region of a UI element 2220, that particular digit indicator 2215 is unambiguously positioned over that UI element 2220 and therefore that particular digit indicator 2215 can be activated to access that UI element 2220. As shown in FIG. 23, when the hotspot 2310 of a particular digit indicator 2315 falls within an outset region of only a single UI element 2320, that particular digit indicator 2315 is unambiguously positioned over that UI element 2320 and therefore that particular digit indicator 2315 can be activated to access that UI element 2320. As shown in FIG. 24, when the hotspot 2410 of a particular digit indicator 2415 falls within the outset regions of at least two UI elements 2420 and 2430, then that particular digit indicator 2415 is ambiguously positioned and therefore cannot be used to activate either of the UI elements 2420 and 2430. Lastly as shown in FIG. 25, when the hotspot 2510 of a particular digit indicator 2515 falls within the outset region of a first UI element 2520 and within the inset region of a second UI element 2530, then that particular digit indicator 2515 is unambiguously positioned over the second UI element 2530 and can be used to activate the second UI element 2530 only.

The above described UI element disambiguation process can be used for enabling different MTI functionality in addition to or instead of determining if a digit indicator activation should occur. One such usage of the disambiguation process is automated UI element identification. Automated UI element identification is a process that is performed in conjunction with MT pointer movements to provide visual identifiers that identify when a particular digit indicator of the MT pointer can be used to access a UI element. In some embodiments, the visual identifiers include outlining or in some way identifying or highlighting the UI element that becomes accessible. Other visual, audible, or tactile identifiers may also be provided in addition to or instead of the outlining and highlighting. For example, the coloring, transparency, or other visual aspect of the digit indicators may change.

Figure 26:
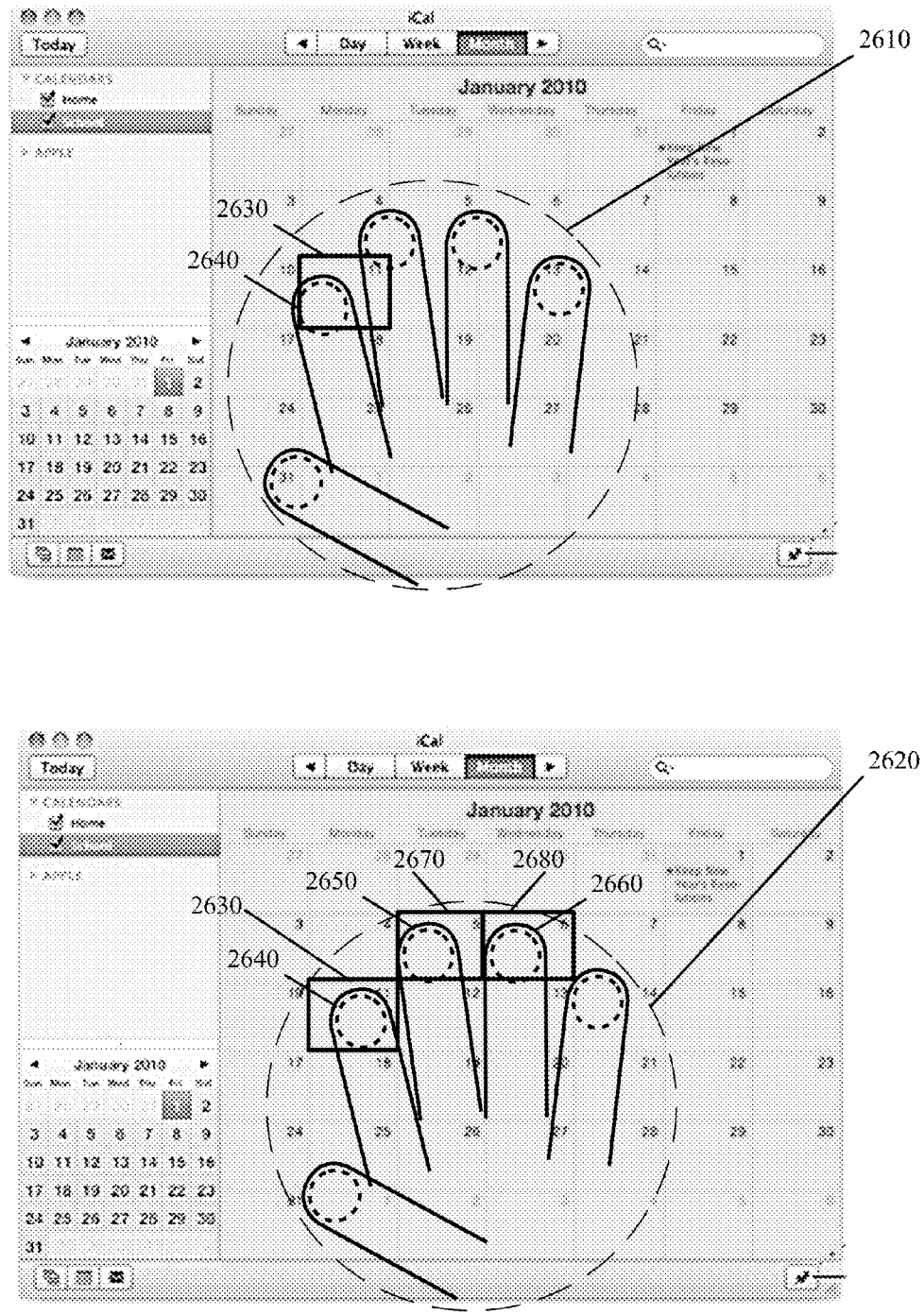
FIG. 26 illustrates the visual identifiers in accordance with some embodiments.

FIG. 26 illustrates the visual identifiers in accordance with some embodiments. This figure illustrates two different MT pointer positions 2610 and 2620. At the first MT pointer position 2610, UI element 2630 is highlighted because the hotzone of the index finger digit indicator 2640 is unambiguously positioned over the UI element 2630. At the first MT pointer position 2610, the other digit indicators cannot be used to access other UI elements, because their hotzone positioning is ambiguous relative to two or more different UI elements.

At the second MT pointer position 2620, the index finger digit indicator 2640 can still be used to access the UI element 2630, as indicated by the highlighting of the UI element 2630. Additionally, the middle finger digit indicator 2650 can now be used to access the UI element 2670 and the ring finger digit indicator 2660 can now be used to access the UI element 2680 as identified by the highlighting of the UI elements 2670 and 2680. At the second MT pointer position 2620, the ambiguity as to the positioning of the middle finger digit indicator 2650 and the ring finger digit indicator 2660 has been resolved. This is because the hotzone of each digit indicator 2650 and 2660 is now positioned within an acceptable non-ambiguous range of a particular UI element.

In conjunction with the UI element disambiguation and highlighting, some embodiments display badges adjacent to one or more of the digit indicators, wherein the badges convey information such as whether the UI element has functionality associated with a left-click, right-click, or double-click operation. Such badges may be activated when the MT pointer is proximate to the object, or the object is select or activated, or by other means such as a gesture or press of one or more keys. Some embodiments display groups of badges simultaneously, and provide further information if then a badge is subsequently clicked or otherwise activated, and fade out when other badges are activated or after some period of inactivity.

d. MTI Auto-Snap

To improve the ease with which a user accesses different UI elements, some embodiments of the MTI provide an auto-snap function that automatically places the digit indicators of the MT pointer horizontally over UI elements along a single y-axis dimensional plane of the GUI. The y-axis dimensional plane can be moved up and down by the user using a mouse, trackpad, keyboard, or other input device. Similarly, the mouse, trackpad, keyboard, or other input device can be used to slide the digit indicators laterally across the set of UI elements on the particular y-axial dimensional plane. Since the digit indicators are automatically snapped to a set of four neighboring UI elements and since the digit indicators may be moved with simple up, down, left, and right discrete inputs or gestures, the user can more readily access UI elements with less GUI navigation and, more importantly, with less reliance on precision movements which require a high degree of fine-motor skills on the part of the user.

In some embodiments of the MTI auto-snap function, the MT pointer is represented as a set of four horizontally linear digit indicators that are partially transparent and color coded, and are connected by a horizontal line which extends across the window and/or display. As before, each digit indicator is associated with one of the index, middle, ring, and little fingers such that touches detected on a trackpad or other touch surface that are assigned to the index, middle, ring, and little fingers can be used to activate the corresponding digit indicator. The home keyboard keys are also usable to activate the current set of four linear digit indicators, and in some embodiments there is an on-screen keyboard viewer which shows the color-coded keys that correspond to the activation of the digit indicators.

Figure 27:
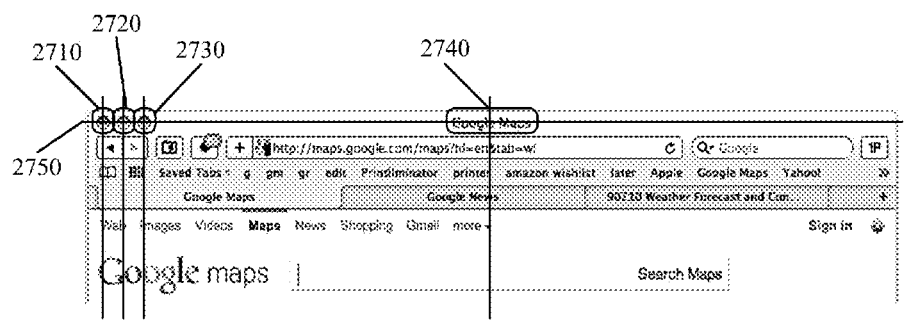
FIG. 27 illustrates the MTI auto-snap function at a first y-axial plane of the GUI.
Figure 28:
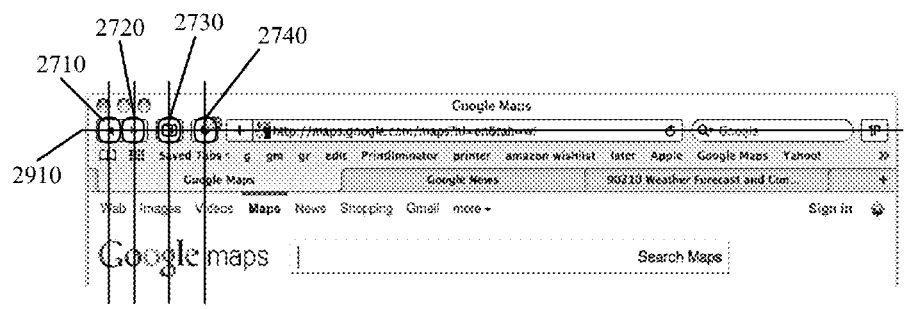
FIG. 28 illustrates the MTI auto-snap function at a second y-axial plane of the GUI.
Figure 29:
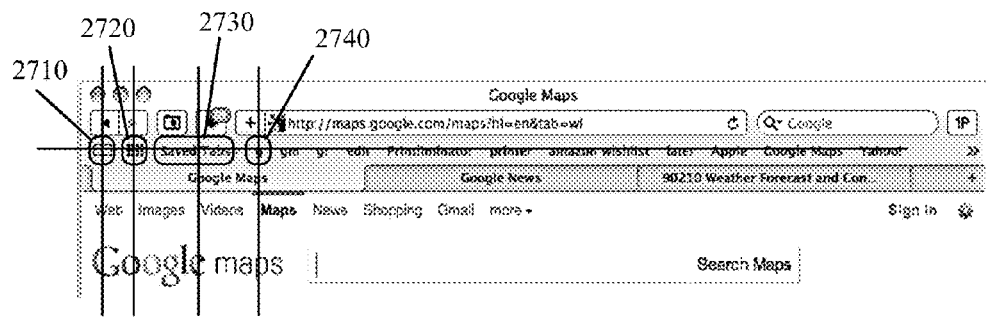
FIG. 29 illustrates the MTI auto-snap function at a third y-axial plane of the GUI.

FIGS. 27, 28, 29, and 30 illustrate operation of the MTI auto-snap function in accordance with some embodiments. FIG. 27 illustrates the MTI auto-snap function at a first y-axial plane of the GUI, FIG. 28 illustrates the MTI auto-snap function at a second y-axial plane of the GUI, and FIG. 29 illustrates the MTI auto-snap function at a third y-axial plane of the GUI.

In FIG. 27, the digit indicators are shown as translucent circles 2710, 2720, 2730, and 2740. The circles 2710, 2720, 2730, and 2740 are automatically positioned over the first four accessible UI elements at the y-axial plane denoted by the horizontal line 2750 connecting the digit indicators 2710, 2720, 2730, and 2740. The UI element over which digit indicator 2710 is positioned can be accessed with a tap of the index finger on the trackpad or by pressing the "J" keyboard key, the UI element over which digit indicator 2720 is positioned can be accessed with a tap of the middle finger on the trackpad or by pressing the "K" keyboard key, the UI element over which digit indicator 2730 is positioned can be accessed with a tap of the ring finger on the trackpad or by pressing the "L" keyboard key, and the UI element over which digit indicator 2740 is positioned can be accessed with a tap of the little finger on the trackpad or by pressing the "Semicolon" keyboard key.

Figure 30:
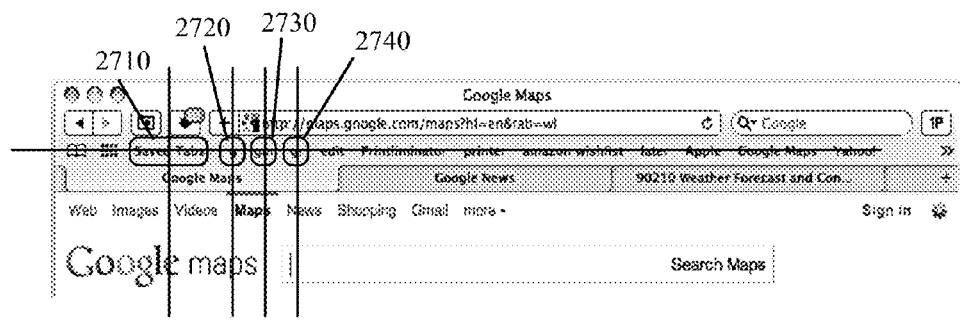
FIG. 30 illustrates the position of the digit indicators along the y-axial plane of FIG. 29 after the digit indicators were moved two incremental positions to the right.

The user can move the digit indicators 2710-2740 to the next y-axial plane as depicted by line 2810 in FIG. 28 by moving a touch on a trackpad downward by moving the thumb downward, by moving a mouse downward, by pressing the down arrow key (or equivalent key or keys) on the keyboard, or by some other gesture. When the y-axial plane changes, the digit indicators automatically snap to the closest four UI elements on the next y-axial plane. The user can shift the digit indicators to the right or left along the current y-axial plane by moving a touch on a trackpad sideways, by moving a mouse sideways, or by pressing the left or right arrow keys (or equivalent keys) on the keyboard. For example, FIG. 30 illustrates the position of the digit indicators 2710-2740 along the y-axial plane of FIG. 29 after the digit indicators 2710-2740 were moved two incremental positions to the right.

In this manner, the user can quickly access a set of four UI elements along a particular y-axial plane. As such, the user no longer has to manually reposition the digit indicators of the MT pointer over UI elements. Moreover, the set of four UI elements need not be directly adjacent to one another in order to be accessed using the MTI functionality.

Figure 31:
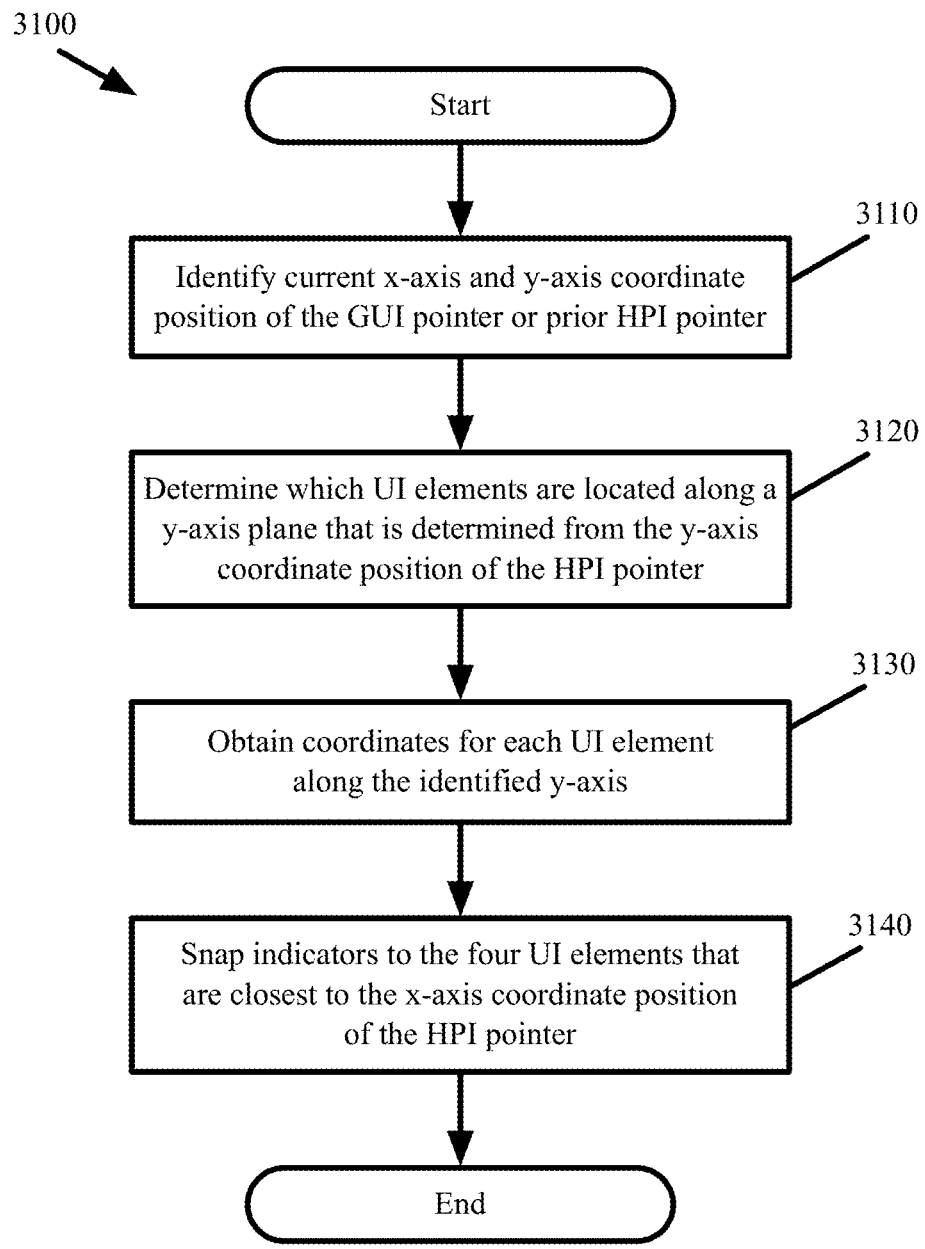
FIG. 31 presents a process for performing the auto-snap MTI functionality in accordance with some embodiments.

FIG. 31 presents a process 3100 for performing the auto-snap MTI functionality in accordance with some embodiments. The process 3100 begins by identifying (at 3110) a current x-axis and y-axis coordinate position of the GUI pointer even though the pointer will be hidden from the screen when the MT pointer appears. In some embodiments, the position of the MT pointer and its constituent digit indicators is independent of the GUI pointer, and is stored per context within each application. In such embodiments, step 3110 would not use the GUI pointer as the starting location, but instead use the prior MT pointer location for the current application and/or document. Next, the process determines (at 3120) which UI elements are located along a threshold zone of a particular y-axis plane that is determined from the y-axis coordinate position of the MT pointer. In some embodiments, the UI element identification is made by querying the system for a list of UI elements that are currently on-screen, and analyzing them based on their y-axis positions relative to the on-screen coordinates. The process obtains (at 3130) the coordinates for each UI element along the identified y-axis plane. The process snaps (at 3140) the digit indicators to the four UI elements that are closest to the x-axis coordinate position of the MT pointer. Internally, the MTI maintains the current position of the MT pointer as a center point and each digit indicator position is determined as an offset from the leftmost (index finger) digit indicator where the offset accounts for the distance from the leftmost digit indicator to the identified UI element. As one skilled in the art would realize in light of the present disclosure, there are many techniques and technologies to identify and position the MTI digit indicators, as well as ways to optimize UI element data fetching, sorting, etc. Such anticipated techniques will vary from system to system, and are envisioned by the present invention.

In some embodiments, more than four digit indicators are displayed on screen, especially in cases where a keyboard key or keys are used to activate the digit indicators. This is because keys next to or above the home keys can also be utilized, unlike when a trackpad is used for activation and there is a limitation as to the number of fingers on the user's hand. As such, in some embodiments, two or more y-axial planes may be displayed concurrently, and in a certain mode all UI element centers may be temporarily identified on screen to aid the user in their identification. In some embodiments, optional horizontal and/or vertical indicators also appear on-screen to aid the user in locating the UI elements, and animation is used to, among other things, smoothly transition between movements of the MT pointer on the x-axis and/or the y-axis. Such horizontal and vertical linear indicators may in some embodiments be extended to include the entire screen, or only the frontmost window. In some embodiments, the user may jump to UI elements that are not included in the frontmost window or frontmost application. When the user taps or activates such a non-frontmost application UI element, the MTI or system switches to the application that is the owner of the activated UI element. Due to the UI element query and analysis process described above, other attributes of a set of UI elements are known by the MTI, and may be presented to the user through various visual, audible or tactile means, such as visual badges as described above with reference to the core MTI functionality.

II. Alternative MTI Enhancements

A. Hold Functionality

In some embodiments, the core MTI functionality is enhanced to provide "hold action" functionality. In some such embodiments, hold action functionality is enabled when a particular MTI digit indicator is activated and held beyond a certain time threshold. So long as that particular MTI digit indicator remains active, the corresponding hold action functionality is enabled. To keep an MTI digit indicator active and thereby keep the hold action functionality enabled, the user retains the touch of the finger that activates that particular MTI digit indicator on the trackpad or other device, or the user continues to hold down the keyboard key that activates that particular MTI digit indicator. While the hold action functionality is enabled, touches of other fingers or other keyboard keys not used in enabling the hold action functionality can be used to provide functionality unrelated to the activation of the digit indicators. In other words, the touches of other fingers or other keyboard keys (not used to enable the hold action) do not manipulate other UI elements, but instead add further options and capabilities to the UI element that is selected or is uniquely identified beneath the MTI digit indicator that is activated and held beyond the certain time threshold. For example, pressing and holding the "J" keyboard key to activate the index finger digit indicator of the MT pointer beyond a time threshold enables a hold action functionality whereby the "K", "L", and "Semicolon" keyboard keys may be used to invoke different functions unrelated to activating the middle, ring, or little finger digit indicators of the MT pointer. When the hold action functionality is disabled, the touches of the other fingers or other keyboard home keys are again usable to activate the other digit indicators. In some embodiments, different sets of functions become enabled when a different MTI digit indicator is activated to enable hold action functionality. In some embodiments, the hold action functionality is adapted for use in conjunction with a single pointer such that the hold action functionality modifies whichever UI element the single pointer is positioned over.

Figure 32A:
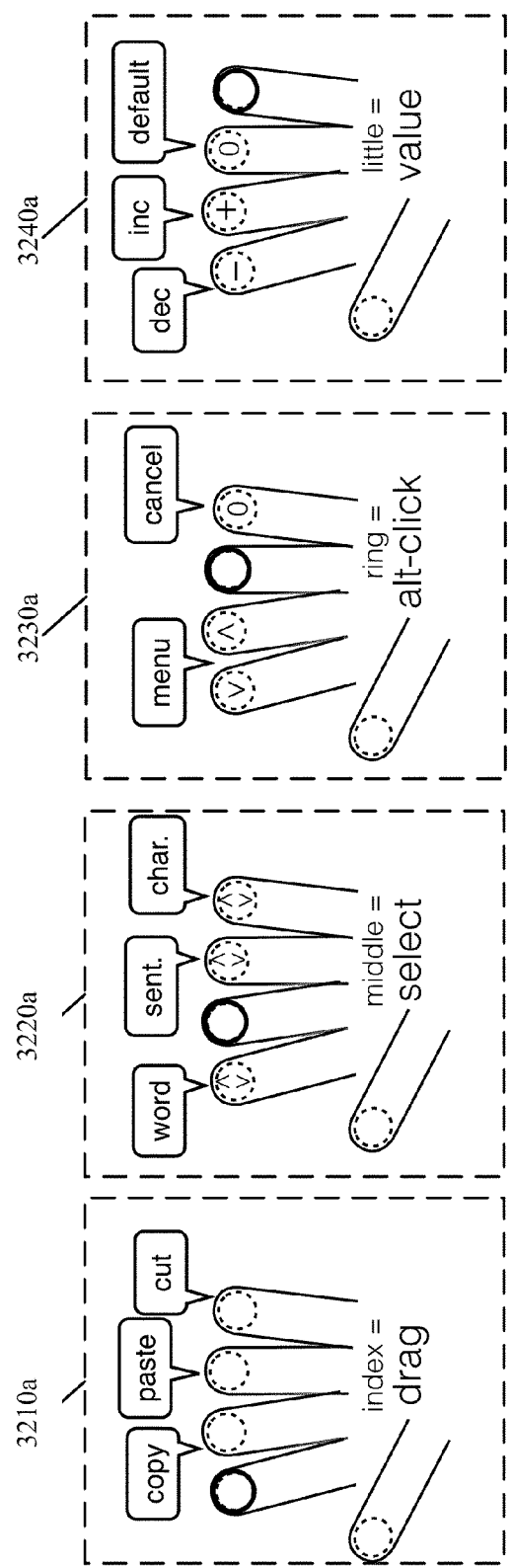
FIG. 32A illustrates various hold action functionality in accordance with some embodiments.

FIG. 32A illustrates various hold action functionality in accordance with some embodiments. This figure illustrates different sets of functions 3210*a*, 3220*a*, 3230*a*, and 3240*a* that become enabled when a different MTI digit indicator is activated to enable hold action functionality. As shown at 3210*a*, when the index finger digit indicator of the MT pointer is activated, a first set of functions associated with a first hold action become enabled such that the touch (i.e., middle finger) or keyboard key(s) (i.e., "D" or "K") that normally activates the middle finger digit indicator can now be used to perform a "copy" function, the touch (i.e., ring finger) or keyboard key(s) (i.e., "S" or "L") that normally activates the ring finger digit indicator can now be used to perform a "paste" function, and the touch (i.e., little finger)

or keyboard key(s) (i.e., "A" or "Semicolon") that normally activates the little finger digit indicator can now be used to perform a "cut" function.

MTI digit indicator 3220a of FIG. 32A illustrates a different set of functions that become invocable when a second hold action is enabled by activating the middle finger digit indicator of the MT pointer. As shown at 3220a, when the middle finger digit indicator of the MT pointer is activated, touch (i.e., index finger) or keyboard key(s) (i.e., "F" or "J") that normally activates the index finger digit indicator can now be used to perform a word selection function whereby directional trackpad slides and/or keyboard keys select text on a word by word basis, the touch (i.e., ring finger) or keyboard key(s) (i.e., "S" or "L") that normally activates the ring finger digit indicator can now be used to perform a sentence selection function whereby directional trackpad slides and/or keyboard keys select text on a sentence by sentence basis, and the touch (i.e., little finger) or keyboard key(s) (i.e., "A" or "Semicolon") that normally activates the little finger digit indicator can now be used to perform a character selection function whereby directional trackpad slides and/or keyboard keys select text on a character by character basis. Using the set of functions, selections can be made in one of two directions. Such directional control is accessible using directional flicks or taps on a trackpad and specified keys on a keyboard. For example, holding down a touch of the middle finger on a trackpad activates the middle finger digit indicator and enables the hold action functionality of 3220a such that upwards flicks of the index finger on the trackpad can be used to select words in a first direction and downwards flicks of the index finger on the trackpad can be used to select words in a second direction opposite to the first direction. Similarly, holding down the "K" keyboard key also activates the middle finger digit indicator and also enables the hold action functionality of 3220a such that taps of the "U" keyboard key (that is above the "J" keyboard key) can be used to select words in a first direction and taps of the "M" keyboard key (that is below the "J" keyboard key) can be used to select words in a second direction opposite to the first direction. In some embodiments, keyboards that have touch-enabled surfaces are able to respond to directional slides and flicks to modify the selection size, without need to depress additional keys.

MT digit indicator 3230a illustrates a third set of functions that become invocable when a third hold action is enabled by activating the ring finger digit indicator of the MT pointer. In this case, when holding the ring finger on an object, a subsequent tap of the index or middle finger causes a menu UI element associated with that object to appear. In some embodiments, this is equivalent to a mouse right click on an object. Further taps of the index and middle fingers (or taps on corresponding keys) changes the selected menu item in a corresponding up and down direction. In alternate embodiments, slides or flicks of the index finger result in a corresponding menu item selection, and include inertial scrolling for menus with many items. In hierarchical menus, slides and flicks left and right also navigate into and out of nested menu items. Keyboards that have touch-enabled surfaces may also navigate menu items by sliding or flicking motions on the surface of the key, without necessarily depressing the key. When the ring finger is released, the output action described by the currently selected menu item is performed and the menu UI element is dismissed. In other embodiments, a flick of the originally held touch is required to execute the action of the menu item, whereas releasing the originally held touch dismisses the menu without performing any action. Similarly, a tap of the little finger cancels menu operation by dismissing the on-screen menu UI element without performing any output action, but it allows the still touching ring finger to move to a different location to disclose another menu UI element.

MTI digit indicator 3240a illustrates a fourth set of functions that become invocable when a fourth hold action is enabled by activating the little finger digit indicator of the MT pointer. Similar to the previous example, the index and middle fingers may be tapped or slid or flicked to change the value of the active or selected UI element, which could be a slider, scroll bar, numeric value, etc. A tap of the ring finger resets the value to a default value, and subsequent taps return the value to previously set values.

It should be noted that the four examples given of MTI hold actions represent only a few examples of the functionality and output actions that are supported by the MTI system. In fact, some embodiments allow the user to create custom MTI digit displays with programmable output action assignments for each gesture received after invocation. Moreover, as noted above, MTI functionality can be adapted to be operable with enhanced keyboards that have more than one touch sensitive key. For instance, when each keyboard key is touch sensitive, flicks and slides can be performed directly over different keys to invoke the various MTI functionality. In some embodiments, slides or flicks issued on each of the home keys "A", "S", "D", and "F" can be used to perform scrolling in different scroll areas. Specifically, flicking upwards on the "A" touch sensitive key performs an upward scroll in a first scroll area and flicking downwards on the "S" touch sensitive key performs a downward scroll in a second scroll area. Scrolling ballistics and inertial scrolling algorithms are used to adjust the rate at which the scrolling occurs based on the velocity with which the slide or flick is issued. Similarly, slides or flicks on other keys can be used to move or reposition the MT pointer. In some such embodiments, the entire keyboard surface is transformed into a large continuous trackpad surface.

It should be noted that the hold actions described above do not necessarily require positioning the MT pointer atop any particular UI element. For example, when invoking the cut/copy/paste output actions described in 3210a, the user may touch and hold their index finger anywhere on the trackpad, touchscreen or other device, and if that finger is not moved beyond a distance and no other fingers begin touching within a particular time period, the MT digit display appears, which alerts the user to the new functionality available by manipulating new touches with the other fingers or thumb. In this case, tapping the middle finger copies the currently selected text, regardless of the location of the fingers. In some embodiments such as MT digit display 3230a, the user may use the ring finger to select or hover over a particular UI element, and then press and hold the ring finger to invoke the described functionality that is specific to the particular UI element over which the pointer or ring finger is located. In other words, the functionality of some MTI hold actions utilize the position of the initial holding touch (touchscreen) or the current pointer position (trackpad), and other MTI hold actions are global in nature and are not location or pointer specific, and may be referred to as omni-touch in nature. Further detail about such location-independent UI is provided in the nonprovisional patent application Ser. No. 13/423,212 with reference to omni-touch.

Figure 32B:
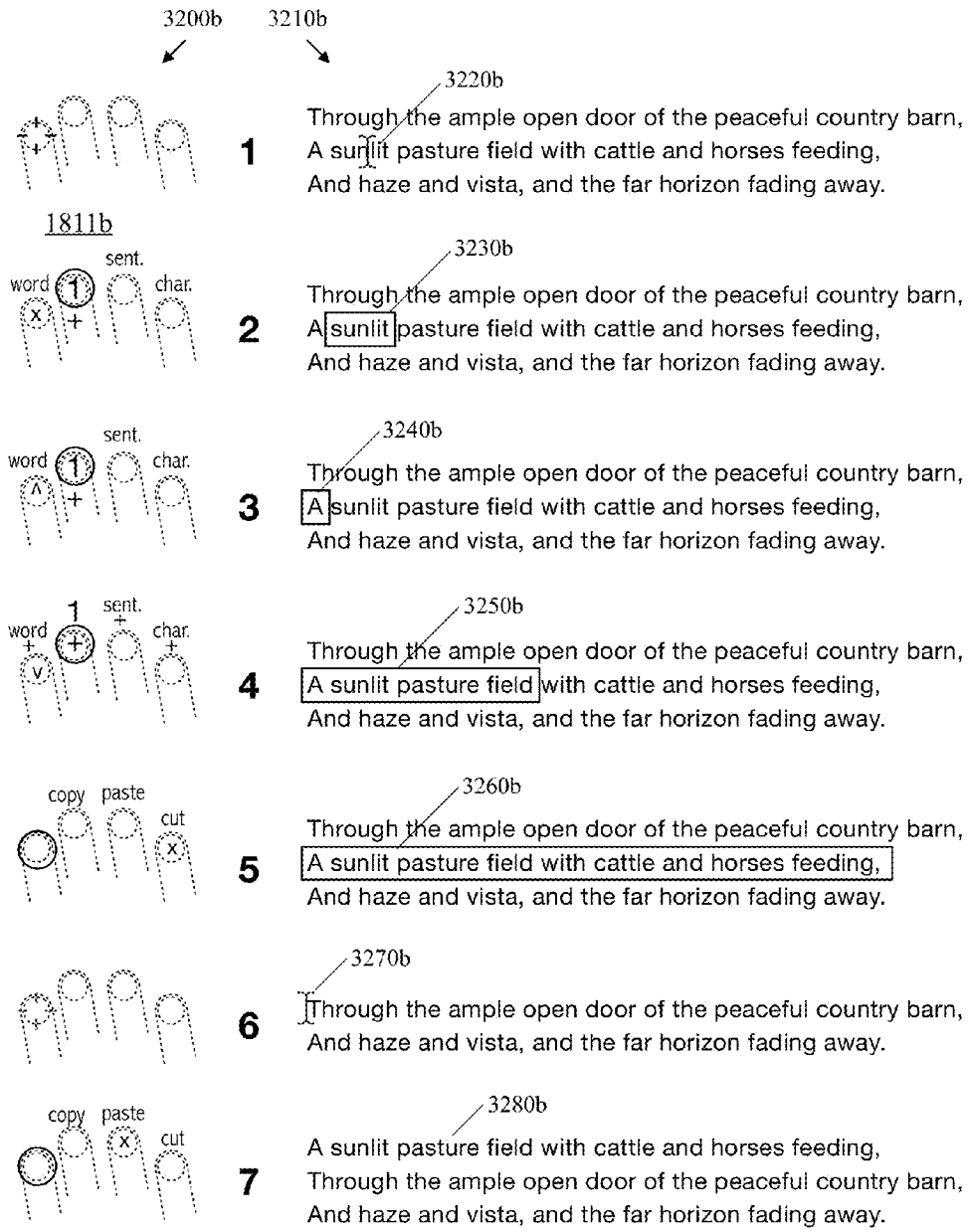
FIG. 32B provides an example of both location specific and omni-touch functionality while performing the common task of selecting some text, and then moving that text to another location within the paragraph.

FIG. 32B provides an example of both location specific and omni-touch functionality while performing the common task of selecting some text, and then moving that text to another location within the paragraph. The left column 3200*b* depicts a simplified view of the MTI digit display of some embodiments, and the right column 3210*b* depicts a text field with a possible cursor position or selection within it. In step 1, the user taps the index finger at the location of the word "sunlit" 3220*b*, which moves the cursor to that location. On a touchscreen, the user would simply tap at that location. Next, the user holds down the middle finger (at any location) to invoke the selection hold action 3220*a*. One invoked, the user taps the index finger to select the current word 3230*b*. The user then moves the index finger up to select the previous word 3240*b* as shown in step 3. Next, the user moves the middle finger in a designated direction, to change the functionality of subsequent hold actions, and the new auxiliary output actions are interactively presented on the MTI digit display. In this case, a downward movement causes subsequent words to be added to the selection rather than selected individually. The user then slides the index finger down to select multiple words 3250*b*, and then flicks downward to further extend the selection 3260*b*. Because slides and flicks of the index finger are tied to inertial algorithms, the user is able to correlate the speed of their slides and flicks with the number of words selected. If too many words are selected, a slide or flick in the opposite (up) direction selects fewer words. With the desired selection evident on screen, the user releases the middle finger, thus exiting the select hold actions 3220*a* mode. Next, in step 5, the user presses and holds the index finger (at any location) to enable the copy/paste hold actions 3210*a*, and taps the little finger, which causes the selected text 3260*b* to be cut, and removed from the screen. When the user lifts the index finger, the hold actions mode 3210*a* is exited and the user may then use the index finger to move the cursor normally (trackpad) or simply tap at the next desired location (touchscreen). In this case, the user taps the index finger just before the word "Through" as indicated by 2320*b* to place the cursor and paste insert location. Finally, the user once again enters the copy/paste hold actions 3210*a* by holding the index finger down (at any location), and then tapping the ring finger to paste the previously cut text into the new location, as can be seen in the resulting text field 3280*b* of step 7.

Figure 32C:
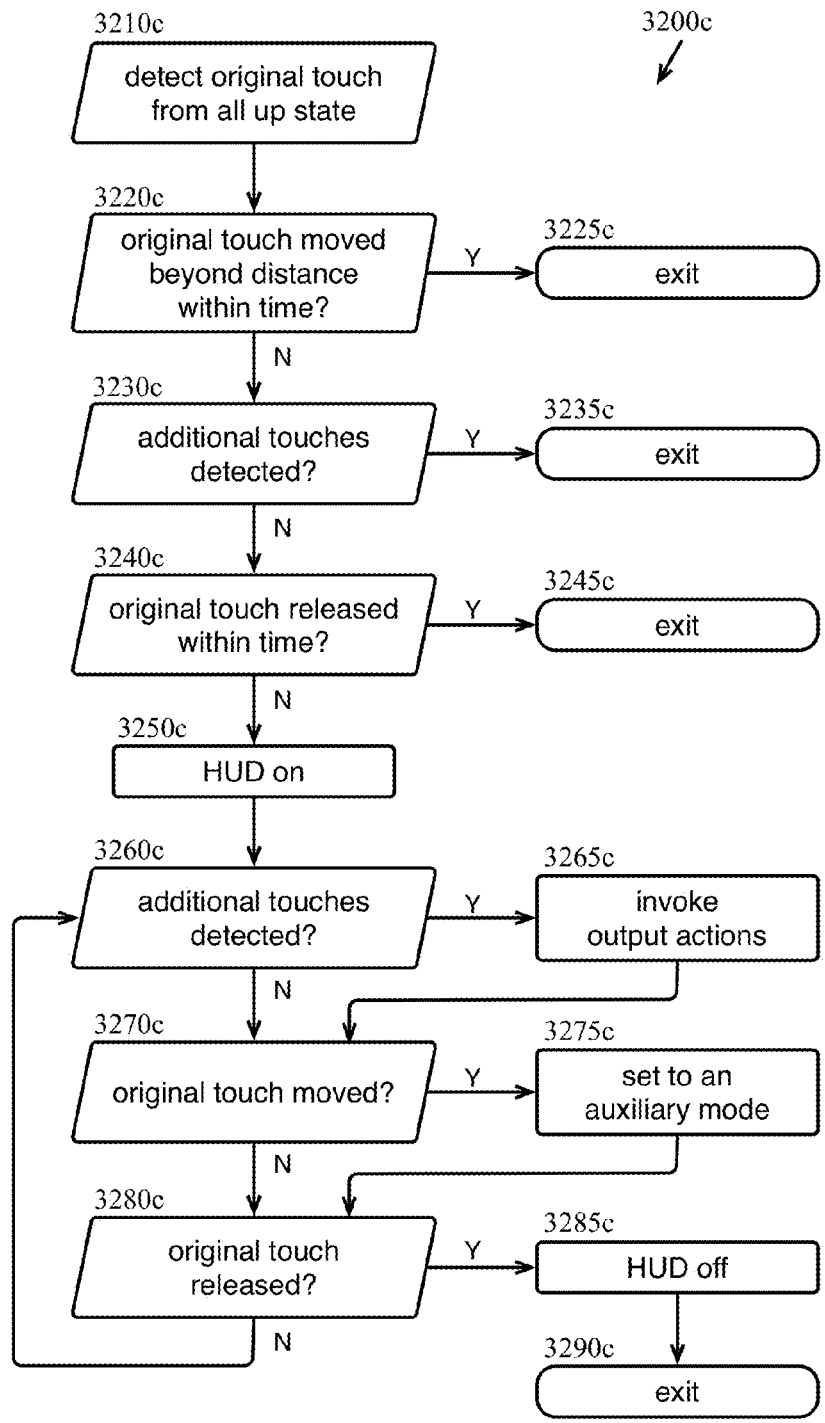
FIG. 32C details the process used to determine various hold action modes and operations.

FIG. 32C details the process 3200*c* used to determine various hold action modes and operations. The process begins when a touch is detected at 3210*c* after a short period of time (e.g., 200 ms) during which no touches were down. In some embodiments a single touch is required to begin the process, and in other embodiments multiple touches, when began essentially simultaneously, are used as the basis of the hold action. This example refers to the single finger base hold action in the singular for clarity, though multiple initial touches are equally applicable. If the original touch is moved beyond a short distance (e.g., 2 mm) within a time period (e.g., 1.5 s) 3220*c*, the process exits 3225*c* without activating any hold action mode. Otherwise, if additional touches are detected 3230*c*, the process also exits 3235*c* without activation. In some embodiments times and distances which determine activation and other aspects of the MTI system are dynamically adjusted per user and context according to usage patterns and detection of unintended actions. If the original touch is released 3240*c* within a time period (e.g., 1.5 s) the process exits 3245*c* without activation. If, however the touch is still being held, the heads-up display 3250*c* of the MTI digit display appears on screen. Next, additional touches 3260*c* are used to invoke corresponding output actions 3265*c*, by monitoring and timing various manipulations of the additional touches to determine taps, holds, slides, flicks, etc. and mapping a tokenized representation of that input to a database which stores the appropriate output action information, which may include system or API calls, scripts, or other means of effectuating some action or change on the device. Furthermore, if the original touch is moved 3270*c* beyond a threshold distance (e.g., 10 mm) within a time period (e.g., 1 s), a flag is set which may modify further output actions 3275*c*. In the example referenced above in FIG. 32B, a downward slide changed individual word selection to contiguous word selection. Subsequent slides of the original touch can revert the output actions to the original form, or may introduce other auxiliary modes to subsequent output actions. In some embodiments, further output actions are invoked directly by manipulations of the original touch and/or modified by the average speed and direction of any original touch movement. When the original touch is released 3280*c*, the HUD is removed from the screen 3285*c* and the process ends 3290*c*. Otherwise, the process continually monitors touch manipulations 3260*c* and 3270*c* until the original touch is finally released 3280*c*.

B. Tap-Hold Functionality

Figure 32D:
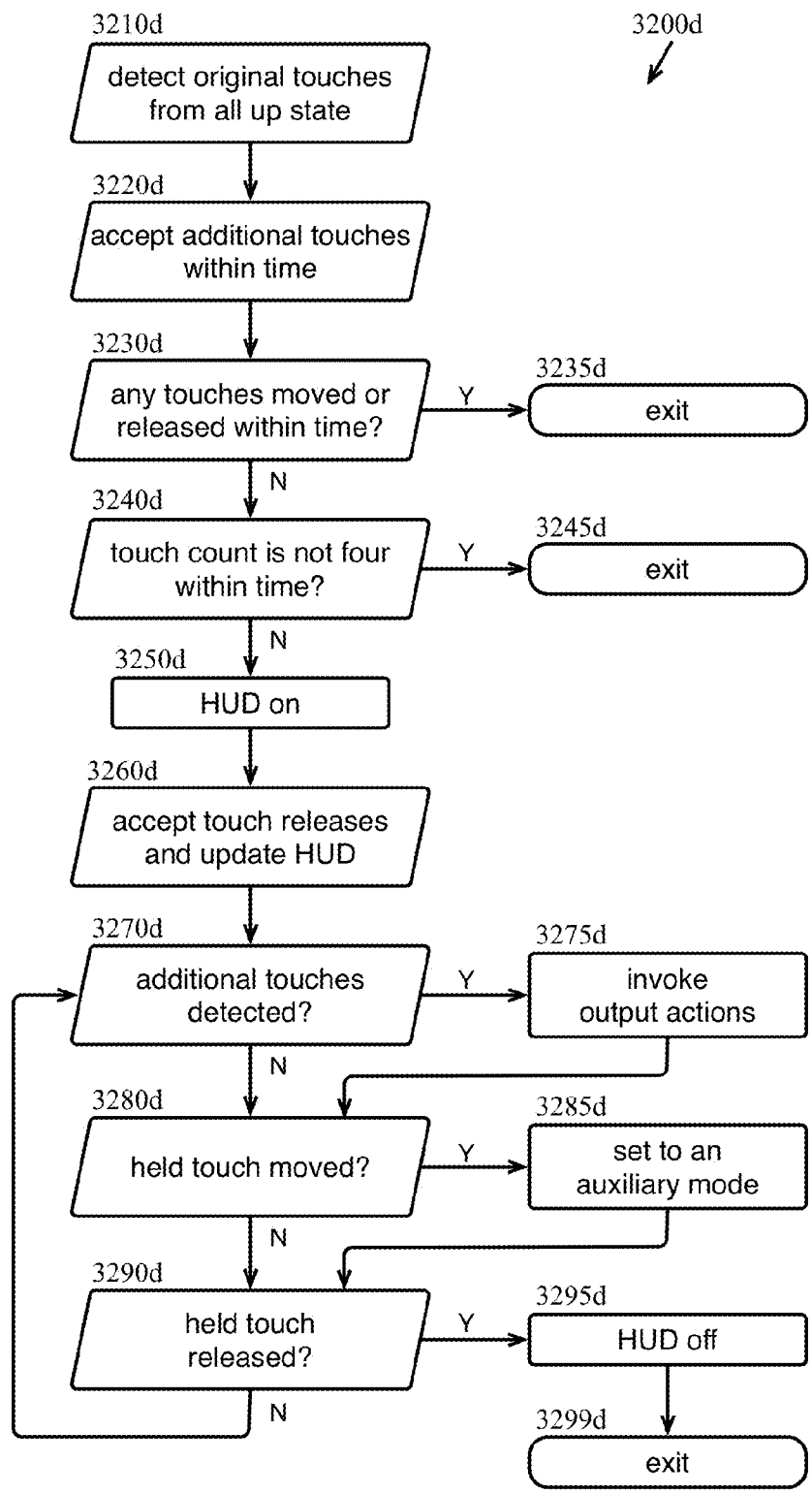
FIG. 32D provides further detail on how these tap-hold actions are invoked and operated.

In some embodiments, the assignment of touches to specific digits (thumb and fingers) may not be reliably accurate due to hardware limitations or other issues. The MTI system accommodates such limitations in embodiments that differ from the above described hold action activation by requiring a four finger touch or tap followed by the holding of a specific digit or digits. FIG. 32D provides further detail on how these tap-hold actions are invoked and operated. The process 3200*d* begins when one or more touches 3210*d* are detected after a short period of time (e.g., 200 ms) during which no touches were down. Additional touches are accepted 3220*d* within an overall period of time (e.g., 0.5 s) to essentially coalesce the touches. If any touches were moved or released within that time 3230*d*, the process ends 3235*d* without activation. Otherwise, if less than four touches were detected 3240*d*, the process ends 3245*d* without activation. Essentially, the process requires four essentially simultaneous non-moving touches in order to continue. In some embodiments where the thumb is detected and tracked, five touches are accepted, but may trigger alternate output actions. When the conditions are met, the heads-up display 3250*d* of the MTI digit display appears on the screen to show available options based on finger combinations. Next, the user releases one, two or three of the touches 3260*d* essentially simultaneously, leaving at least one touch down to determine the tap-hold action basis. The remaining touch or touches are held down until the user chooses to exit the tap-hold action mode. As described above in FIG. 32C, additional touch manipulations 3270*d* invoke corresponding output actions 3275*d*, and manipulations of the held touch or touches 3280*d* may trigger additional output actions and/or set auxiliary modes 3285*d*. When the remaining touches are released 2890*d*, the HUD is removed from the screen 3295*d*, and the process ends 3299*d*.

Figure 32E:
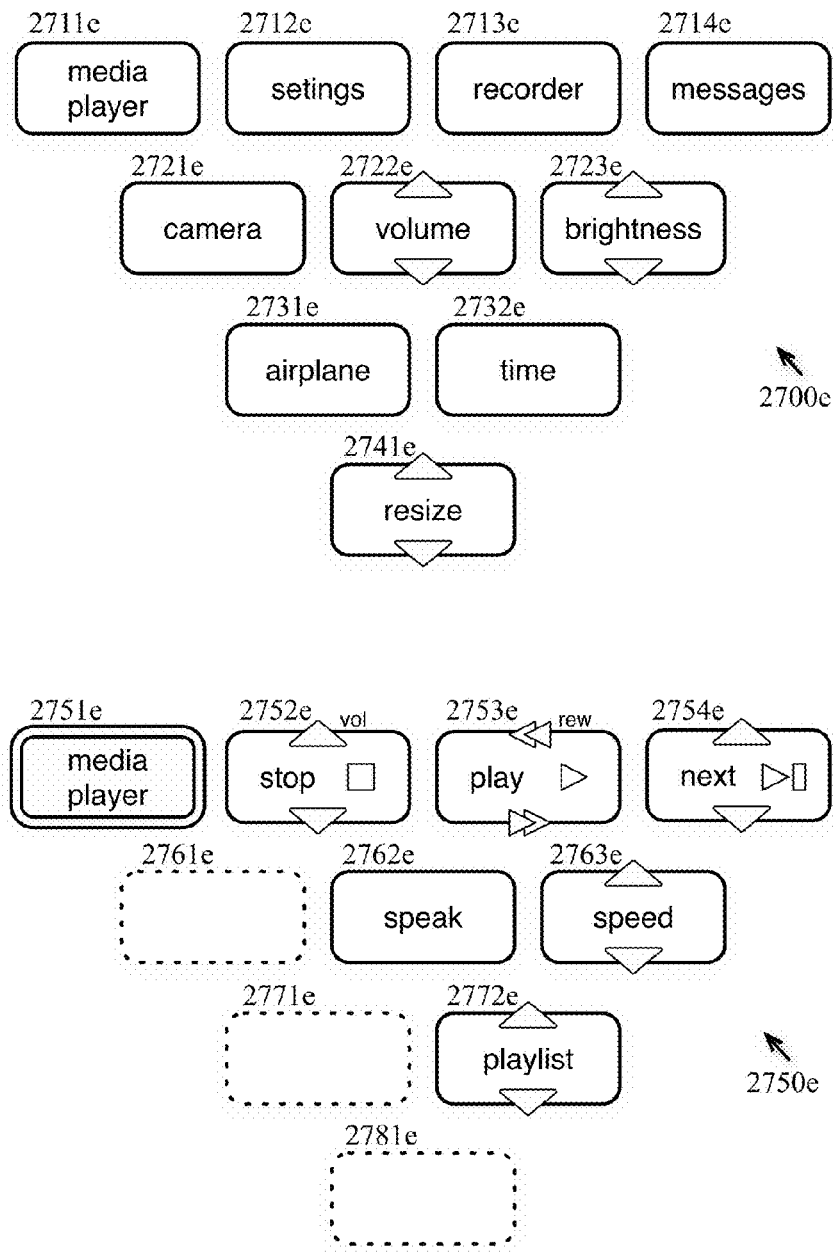
FIG. 32E depicts a simplified HUD of the MTI digit display in accordance with some embodiments.

FIG. 32E depicts a simplified HUD of the MTI digit display 3200*e*. In this embodiment, ten icons (3211*e*-3241*e*) animate from the top of the screen when the HUD first appears 3250*d*. The top row (3211*e*, 3212*e*, 3213*e*, 3214*e*) represents the base tap-hold mode that will result if that single finger is held (and the other touches released). HUD 3200*e* is shown in right hand mode, so the top row icons represent (left to right) the index, middle, ring and little fingers. The remaining icons represent combinations of multiple fingers, which will be further explained later in this section. In some embodiments, HUD 3200*e* appears when the user touches four fingers anywhere on the touch surface. The user can than identify (or remember) that the index finger represents the desired "media player" application 3211e, so the user releases all but the index finger. At this point, the HUD changes 3260d to the media player controls 3250e, so that the user can identify (or remember) the various available options.

In practice, tap-hold invocations may be effectuated very quickly, since there are no perceptible minimum hold times required for activation and invocation of the first output action. For example, 3250e depicts a tap-hold MTI digit display which is accessed when four fingers touch and then all but the index finger are released. Essentially, all digits tap simultaneously, except the index finger remains held down. These touches may occur anywhere on the sensing surface and are thus omni-touch in nature, so the gesture can be performed very rapidly. As long as the initial four touches are articulated in an essentially simultaneous manner, an MTI-enabled OS will not accidentally trigger output actions that are directly above UI elements such as buttons. To further speed practical operation, the user does not need to wait for the initial HUD display 3200e or the subsequent HUD display 3250e to appear if they have already developed muscle memory for the desired functionality.

Continuing with the above example, the icon representing the index finger 3251e is highlighted to show that this touch is held and is the basis for subsequent output actions. For example, if the user next taps the ring finger 3253e, an output action is generated which causes the media player application to play the current track. To switch to the next track the user taps the little finger 3254e. The user may then adjust the volume by sliding the middle finger 3252e up or down. The user may then release the index finger 3251e to leave the track playing and resume with other operations. When the user wants to again control the media player application, another tap-hold gesture leaving the index finger down re-invokes the HUD and allows the user to, for example, fast forward or rewind by sliding or flicking the ring finger 3253e up or down, switch to a different track by sliding or flicking the little finger 3254e up or down, or stopping playback by tapping the middle finger 3252e. In some embodiments, combinations of fingers acting in concert can trigger yet further output actions. The HUD 3250e displays such combinations elsewhere on the HUD as a reminder to the user. For example, if the user taps the middle and ring fingers essentially simultaneously 3262e, the media player announces the title of the current track. If the user essentially simultaneously slides or flicks the ring and little fingers 3263e, the playback speed is altered. If the user essentially slides or flicks the middle, ring and little fingers together 3272e, the media player selects a new playlist. Further details of such a triangle UI are provided in the nonprovisional patent application Ser. No. 13/423,212.

Further operational examples of the tap-hold functionality of the MTI system demonstrate the speed and ease of invoking commonly used output actions. For example, a four finger tap ending with the middle and ring fingers held down controls the system volume 3222e of some embodiments. After this invocation, the user simply slides the middle and ring fingers in essentially up and down directions to control the volume of the device, releasing the touches when the desired volume is attained. Furthermore, a tap of the index finger mutes the system volume, and a tap of the little finger un-mutes. A new user will discover available commands via the HUDs, which can be resized by retaining the initial four finger touch and sliding in essentially up down directions. As the display is resized, more or less information such as icons, abbreviations, full descriptions and other information are presented in the HUD as appropriate. In this manner, the user may discover new functionality easily and in-context, and frequently utilized controls automatically become part of muscle memory so that the HUD can be smaller in size, or simply ignored by the user.

In some embodiments, the MTI system determines the assigned digit based on the locations of previously established four touch patterns, as well as any drift that may have occurred by the remaining finger moving in a particular direction. Details of the implementation of this system are covered in the nonprovisional patent application Ser. No. 13/423,212.

C. Single Pointer Enhancements

Figure 33:
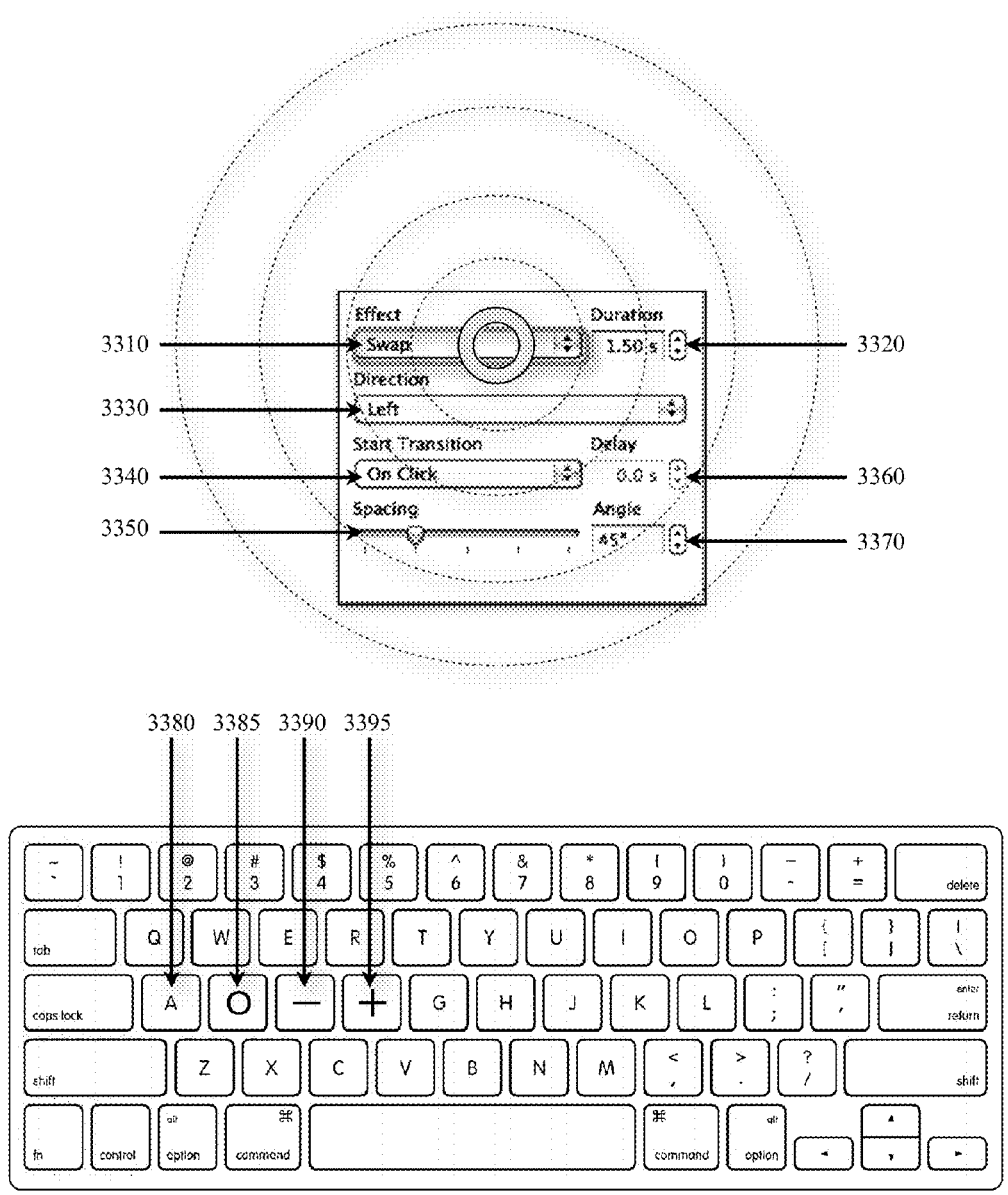
FIG. 33 illustrates single-pointer mode MTI functionality in accordance with some embodiments.

In some MTI embodiments where multiple simultaneous pointers are not desired or applicable, some MTI operations disclosed above may be utilized with a traditional single pointer or an enhanced version of the single pointer paradigm. This section highlights the single-pointer mode MTI functionality in which MTI functionality is adapted for usage with a traditional pointer or an enhanced version of the single pointer. This single-pointer mode may be more appropriate for certain users or certain applications or contexts which do not require or benefit from multiple simultaneous pointers (i.e., digit indicators). Many of the above described embodiments, however, are applicable to this single-pointer mode, which is activated by holding down a key other than the spacebar in some embodiments, and which may be represented on-screen as a single translucent circular icon which animates down from a larger size when activated. The animation, as shown in FIG. 33, serves to draw the user's eye to the location of the pointer, which is especially helpful on larger screens, or if the pointer is over a text field and is a very thin "i-beam" cursor. Furthermore, unlike existing GUI pointer art which utilizes a single x-y coordinate "hotspot" to distinguish UI elements below, the MTI single-pointer mode employs the above described "hotzone" methodology and UI element disambiguation in some embodiments to facilitate easier selection of UI elements. Movement of the MT pointer in single-pointer mode may also employ certain keys or combinations of keys to move the MT pointer, as described above.

In the MTI single-pointer mode of operation, holding down a specified keyboard key beyond a specified threshold enables single-pointer mode MTI functionality and displays the single-pointer style MT pointer with the beginning animation. When the pointing tool is placed over a UI element and the single-pointer mode MTI functionality is enabled (e.g., holding down the "V" key), pressing and holding different keys of the keyboard invoke different functionality. For example, in some embodiments, the "F" keyboard key acts like the left mouse button in that a tap can select the UI element at the location of the single-pointer MT pointer, and double-tapping the "F" key acts just as a double-click. Similarly, when the "F" key is held down, a mouse-down event is sent to the UI element and subsequent pointer movements cause the selected UI element to be dragged to a different on-screen position while the "F" key remains held down. When the "F" key is released, a mouse-up message is sent to the UI element and the dragging operation ends. In a likewise manner, the "D" keyboard key may activate right-click functionality.

In some embodiments, various keyboard keys may be used in conjunction with the single-pointer mode of the MTI to facilitate scrolling within one or more scroll areas of a UI. For example, pressing and holding the "S" keyboard key when the single-pointer mode is active enables scrolling such that subsequent mouse or trackpad slides or flicks perform scrolling of a UI element at the location of the pointer while the "S" key remains held down. In some embodiments, different keyboard keys may be mapped to activate scrolling within different scroll areas of a specific window, application, or UI. For example, enabling MTI functionality and then pressing and holding the "U" key activates scrolling in a first scroll area, whereas enabling MTI functionality and then pressing and holding the "I" key activates scrolling in a second scroll area.

FIG. 33 illustrates single-pointer mode MTI functionality in accordance with some embodiments. In this figure, the MT pointer is enabled in single-pointer mode via spacebar down or other keyboard key down. The MT pointer is then positioned over one of the various UI elements 3310, 3320, 3330, 3340, 3350, 3360, and 3370 using traditional means of pointer movement (e.g., trackpad, mouse, arrow or directional keyboard keys). The UI elements 3310-3370 each display and control a range of specific values. Once positioned over a particular UI element of the set of UI elements 3310-3370, the "A" key 3380 is pressed and held to enter the value adjust mode. In this mode, the remaining home keys are used to quickly adjust the value of whichever UI element the MT pointer is unambiguously positioned over (i.e., highlighted). For example, the "F" keyboard key 3395 can be used to increment the value of the UI element over which the MT pointer is positioned, the "D" keyboard key 3390 can be used to decrement a value of the UI element over which the MT pointer is positioned, and the "S" keyboard key 3385 can be used to set a default value for the UI element over which the pointing tool is positioned. Also, by holding down the "F" or "D" keys in some embodiments, the value is continuously incremented or decremented. Furthermore, the rate of the increment or decrement may vary depending on the type of controller or the range of values for the controller. Also, when the opposing increment key (e.g., "D" when "F" is down, or "F" when "D" is down) is pressed in some embodiments, the rate at which the values change is increased to allow the user to reach distant values more quickly.

These single-pointer mode MTI functionalities are not intended to be limiting in scope. Accordingly, other alternative sets of MTI functionality may be provided in different embodiments. Moreover, these alternative sets of MTI functionality may be adapted to work with the core MTI functionality by mapping the alternative MTI functionality to different keyboard keys than the home keys of the keyboard and by further adapting the alternative MTI functionality to operate in conjunction with the MT pointer.

The MTI and its various permutations described in sections I and II above are applicable to any computing system or electronic device that utilizes a pointing tool or GUI interface. As such, the MTI is operable on desktop computing systems, laptops, netbooks, and other portable devices which contain a processor. Moreover, the MTI can be operated using any of a plurality of input devices separately or in combination with one another. As some examples, the MTI can be operated with just a traditional keyboard, with an enhanced keyboard with at least one touch sensitive key, a traditional keyboard and trackpad combination, a traditional keyboard and mouse combination, a traditional keyboard with a touchscreen, a trackpad, a touchscreen, or an input device associated with operation of a media center or "ten foot" interface. Furthermore, a device such as a tablet, smart phone, media player, or other computing device may serve as an input device to a different device upon which the MTI is functioning.

III. Synchronized Multiple Device UIs

Human physiology inescapably maintains that the eyes are some distance from the hands, and therefore a single physical device that tries to accommodate both hands and eyes will ultimately fail ergonomically. The user may accommodate the device for a short period of time by either bending the neck down to look toward the hands on a horizontal plane, or raising the hands up to meet the gaze of the eyes on a vertical plane. While this accommodation by the user may be convenient for short-term portable use, longer term use at some point will leave the user with chronic physical ailments.

It is therefore an objective of the present invention to provide the user with visual aids and other tools which enable the brain to make a strong correspondence between hand/finger motions and resulting computer operations, in order to minimize or eliminate the need for the user to constantly shift visual and manual focus. It is further an objective of the present invention to define an apparatus, method, system, and computer software product that permits and encourages the device user to retain visual focus on the display device(s) on a vertical plane and manual touch on the input device(s) on a horizontal plane. To achieve the objectives, some embodiments provide a multi-device UI that comprises at least two UIs, wherein a first horizontal UI is touch enabled and the first horizontal UI displays at least a subset of the second vertical UI. The horizontal UI may be presented using a touchscreen tablet, touchscreen smartphone, or other touch sensitive display on an essentially horizontal plane that is synchronously coupled with the vertical UI that may be presented using a monitor or display device that may be placed farther from the user on an essentially vertical plane. In some embodiments, the one or more UIs are synchronously coupled using a communication protocol such as Universal Serial Bus (USB), WiFi, Bluetooth, or any other suitable protocol. Synchronously coupling the horizontal UI to the vertical UI allows touch inputs issued using the horizontal UI to control and produce change on the vertical UI. Moreover, when the horizontal UI is embodied in a tablet, smartphone, or other touch sensitive portable device, the data from both UIs can be stored to the memory of the tablet, smartphone, or other touch sensitive portable device. In this manner, the data can be carried with the user using a portable storage medium.

Figure 34A:
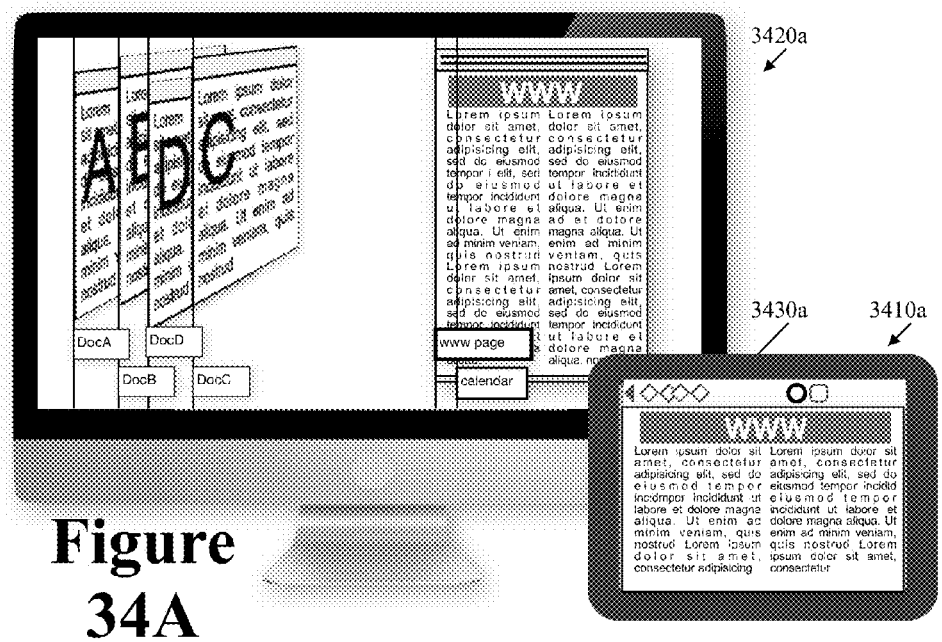
FIG. 34A presents a usage example of the synchronized UIs in accordance with some embodiments.

FIG. 34A presents a usage example of the synchronized multi-device UIs in accordance with some embodiments. The figure includes a first display device 3410a on an essentially horizontal plane displaying a first UI and a second display device 3420a on an essentially vertical plane displaying a second UI. The horizontal display device 3410a is touch sensitive such that user touches can be used to provide inputs to the second UI 3420a. As shown, the horizontal UI 3410a displays a subset of the vertical UI 3420a. Specifically, the vertical UI 3420a includes multiple windows with a particular window that is frontmost, and the horizontal UI 3410a displays only the frontmost window of the vertical UI 3420a. However, by synchronously coupling the UIs, touch inputs performed on the horizontal UI 3410a are usable to control operations on the vertical UI 3420a. In this figure, the horizontal UI 3410a provides window switching functionality whereby a touch or flick in one direction switches the frontmost window of both UIs in a first direction and a touch or flick in the opposite direction switches the frontmost window of both UIs in a second direction that is opposite to the first direction. Additionally, UI elements 3430a appearing in top row of the horizontal UI 3410a represent each of the windows in the vertical UI 3420*a*, and touching any of the UI elements 3430*a* causes the corresponding window in the vertical UI 3420*a* to become frontmost. Should a different window become frontmost, the display of the horizontal UI 3410*a* changes in accordance.

Figure 34B:
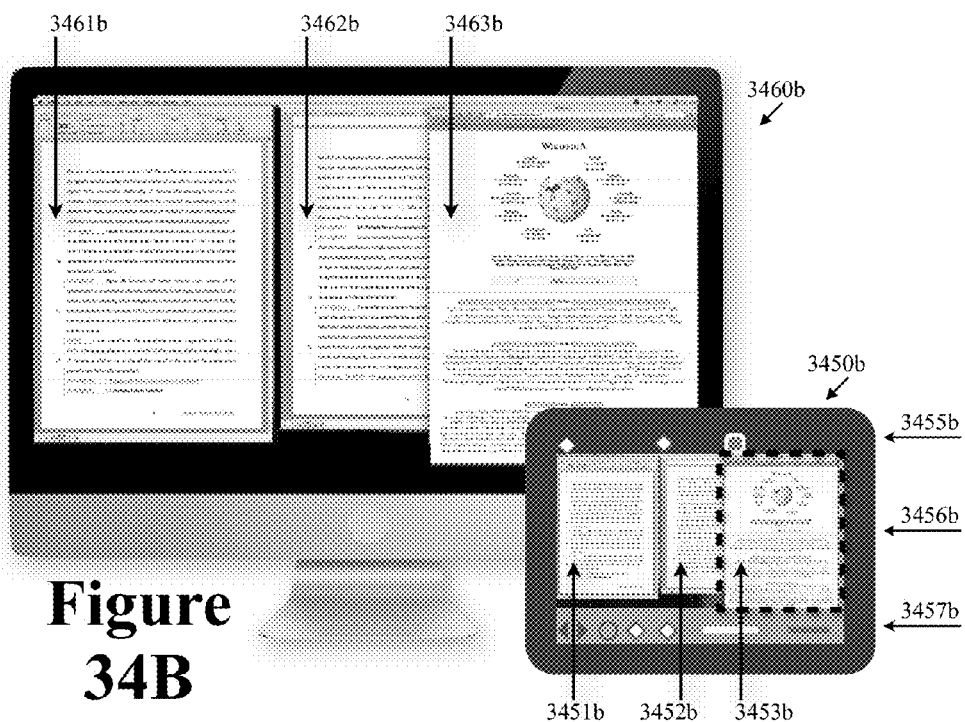
FIG. 34B presents an alternative synchronized multi-device embodiment wherein the horizontal device is used to control various operations on the vertical device.

FIG. 34B presents an alternative synchronized multi-device embodiment wherein the horizontal device 3450*b* is used to control various operations on the vertical device 3460*b*. The horizontal device 3450*b* has a center area 3456*b* which shows three miniature windows 3451*b*, 3452*b* and 3453*b*, that correspond with actual windows 3461*b*, 3462*b* and 3463*b* on the vertical device 3460*b*. The miniature version of the frontmost window 3453*b* may be highlighted in a variety of ways, in this case by a dotted rectangle. The miniature windows 3456*b* on the horizontal device are smaller versions of the actual windows, and not meant to be read by the user. Instead, the user may perform a variety of useful operations by manipulating the miniature windows on the horizontal device 3450*b* and immediately see the result reflected on the vertical device 3460*b*. For example, the user may tap a window's icon (in the row above 3455*b*) to bring the actual window frontmost, the user may slide a miniature window's icon to move the position of the actual window, the user may use a pinch gesture in a miniature window to zoom the contents of the actual window, the user may drag a border of a miniature window to resize the actual window, the user may slide or flick within a miniature window to scroll the contents of the actual window, etc. In the example illustrated in FIG. 34B, the user is working with two word processing documents 3461*b* and 3462*b*, and the user is also referencing a web browser 3463*b*. The user may bring the middle window frontmost by tapping on the corresponding middle application document icon displayed at the top row 3455*b* of the horizontal device 3450*b*. This allows the user to view and compare the two documents side by side. The user may then scroll the documents independently or together by sliding or flicking atop either or both of the miniature windows 3451*b* and 3452*b*. Other operations and contextual options are available in the lower row 3457*b* of the horizontal device 3450*b*.

Figure 34C:
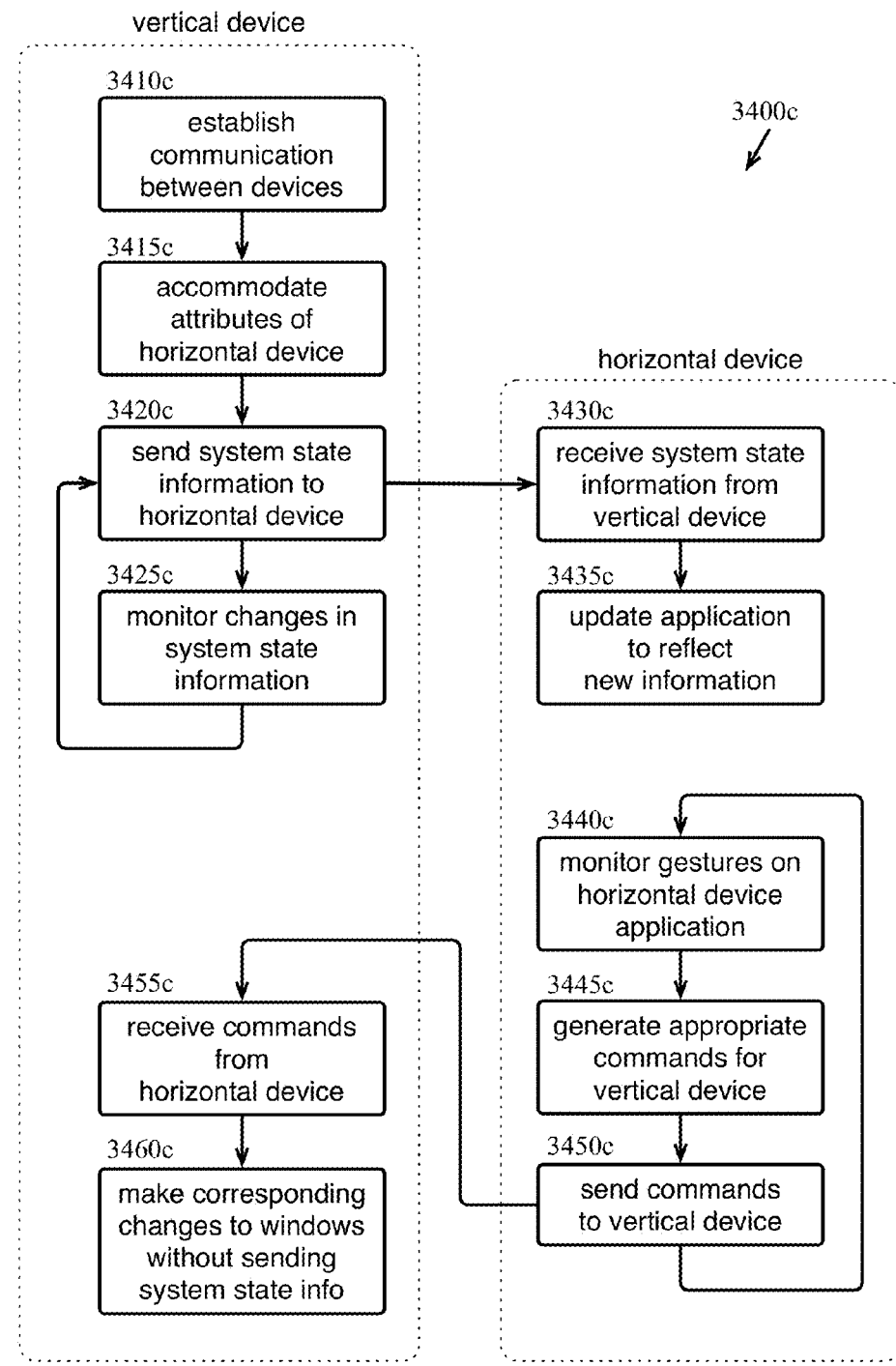
FIG. 34C shows the process used by some embodiments to implement the synchronized multi-device functionality of FIG. 34B.

FIG. 34C shows the process used by some embodiments to implement the synchronized multi-device functionality of FIG. 34B. The OS of the vertical device is made aware of the presence of the horizontal device when a communication protocol (e.g., USB, WiFi, Bluetooth, etc.) establishes (at 3410*c*) the connection between devices. Various attributes of the horizontal device are then communicated (at 3415*c*) to the vertical device, such as screen size and other capabilities. System state information is sent (at 3420*c*) to the horizontal device, then received (at 3430*c*) by the horizontal device. Such system state information may include a list of windows and their positions, sizes and ordering, a miniaturized graphic for each of the windows, frontmost application, focus of frontmost application, selection, etc. Some embodiments accommodate a range of protocols for packaging such system data. For instance, raw pixel data may be sent, but more efficient protocols which have a shared understanding of the underlying object primitives or high level commands may be utilized for greater efficiency, flexibility, and control possibilities. The horizontal device processes the received information from the vertical device and updates the application (e.g., window contents, window positions, etc.) to reflect the new system state information. The vertical device constantly monitors (at 3425*c*) such system state information and sends (at 3420*c*) it to the horizontal device. The horizontal device monitors (at 3440*c*) user touch articulations to determine user intent. The horizontal device then generates (at 3445*c*) corresponding commands in a protocol which can be understood by the vertical device. The generated commands are sent (at 3450*c*) to the vertical device via the appropriate protocol, and received (at 3455*c*) by the horizontal device. The vertical device makes (at 3460*c*) the corresponding changes to the appropriate objects. In some embodiments, the newly received commands carry out the intended functionality, but do not send the corresponding system state information back to the horizontal device in order to preserve bandwidth. In other embodiments, the system state information updates are sent to the horizontal device to confirm that the commands were properly interpreted.

Figure 35A:
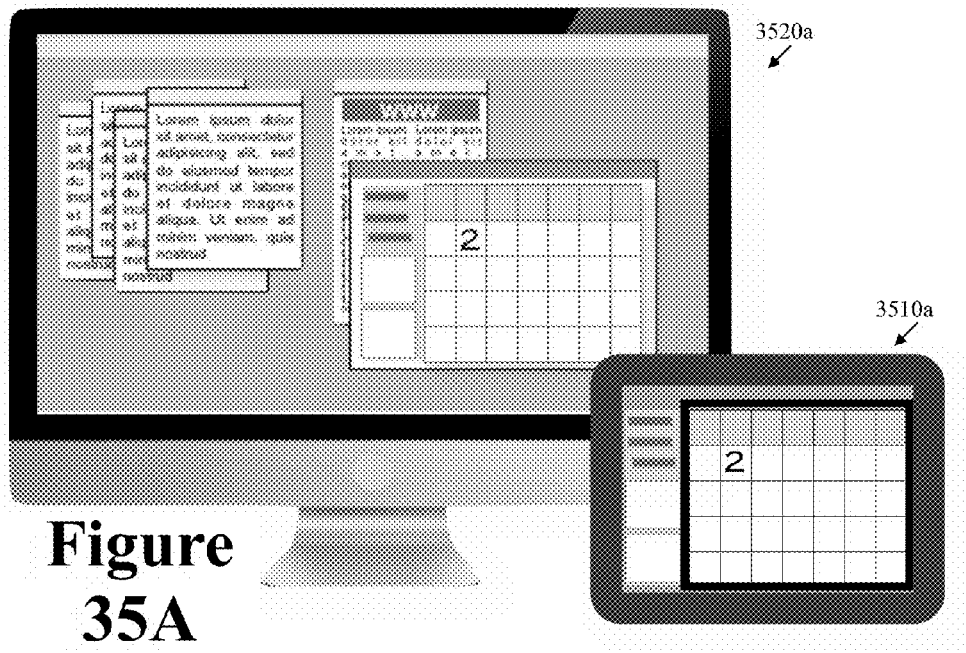
FIG. 35A illustrates an alternate usage example of the synchronized UIs in accordance with some embodiments.

FIG. 35A illustrates an alternate usage example of the synchronized multi-device UIs in accordance with some embodiments. In this figure, the horizontal UI 3510*a* provides a first view of a frontmost application and the vertical UI 3520*a* provides a second view of the frontmost application where the first view includes a subset of information from the horizontal view that is more focused or zoomed-in. The user may utilize the controls on the left side of the horizontal device 3510*a* to switch to a different view (e.g., week view) in order to zoom to a different view which utilizes slides to change the timing of upcoming events. The first view (e.g., month view) on the vertical device 3520*a* does not necessarily change with the horizontal device 3510*a*, as the user may prefer to grasp the overall context on the vertical device 3520*a* (which has a larger display), and edit the details (e.g., week or day view) on the horizontal device 3510*a*. If the data exists (in this case calendar data) on both devices, the data is updated in both data stores as changes are made, along with any cloud-based storage update. If the horizontal device 3510*a* is disconnected from the vertical device 3520*a*, upon re-connection any edits are updated on the vertical device 3520*a*.

Figure 35B:
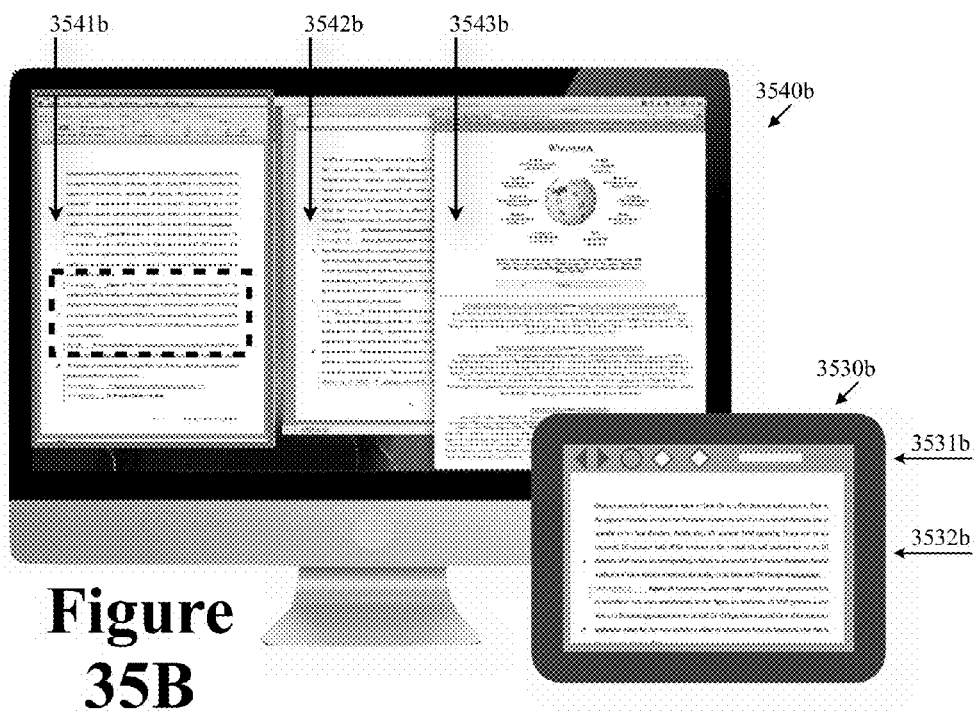
FIG. 35B presents an alternative synchronized multi-device embodiment that correlates with the embodiment presented in FIG. 34B above.

FIG. 35B presents an alternative synchronized multi-device embodiment that correlates with the embodiment presented in FIG. 34B above. In the previous example, if the user double taps an application icon on the horizontal device 3450*b*, a detail view is presented on the horizontal device 3450*b*. The user can easily switch back and forth between the window view as shown in FIG. 34B, and a focus view shown in FIG. 35B, which is the opposite in that it displays an easily editable view of the focus of the frontmost application of the vertical device 3540*b*. The vertical device 3540*b* displays the same three windows presented in 3460*b*, and also includes a view port rectangle shown as a dotted line in the frontmost word processing document 3541*b*. The text within the view port is reflected in the focus view area 3532*b* of the horizontal device 3530*b*. When the user changes the text on the vertical device 3540*b*, the text is updated on the horizontal device 3530*b*, and likewise when the user edits the text on the horizontal device 3530*b* it appears in context on the vertical device 3540*b*. This provides multiple views into the same data (the word processing document), and allows the UI of either device to be utilized to its best advantage. For example, when selecting and moving paragraphs within a document, the larger size and point and click interface of the vertical device 3540*b* may be more advantageous, and when composing text, the small portable device 3530*b* may be preferable. When the connection between devices becomes available (such as WiFi proximity), the device with the latest version is used, and then edited synchronously until such time when the connection is not available. The focus mode of the multi-device synchronized UI is applicable in many situations and workflows where there is a need to work on a detailed portion of a larger work, while simultaneously allowing a larger overall view of the work to be understood in context. For example, a music scoring application would display the score which shows all the instruments in context on the vertical device, and the horizontal device displays only the specific instrument that is being edited in a large, easy to edit format. Furthermore, such edits can be made using a more intuitive touchscreen UI where gestures may be preferred over the single point and click UI of most traditional vertical devices. When the vertical device is MTI-enabled, the horizontal device can also be used to perform such gesture like commands on the vertical device as well. The area of focus displayed on the horizontal device is a continuously scrolling view in some embodiments, which interactively updates the viewport and pagination of the view presented on the vertical device. The focus itself can be changed on either the horizontal or the vertical device. For example, when the user clicks on the middle window 3542$b$ to bring that word processing document frontmost on the vertical device 3540$b$, the focus view of the horizontal device 3530$b$ is changed to reflect the location of the cursor or selection or previous viewport area of that document. Some embodiments of the synchronized multi-device UI support transfer of other types of data to facilitate extended features such as text-to-speech. When the user performs a particular gesture on the horizontal device 3530$b$, the selected text is sent to the vertical device 3540$b$ along with a command to speak the selected text. This allows the vertical device 3540$b$ (which is usually connected to a power source and has better audio capabilities) to render and playback the selected text, while preserving CPU cycles and thus battery life on the horizontal device 3530$b$. Similarly, if a video editing application is being used in a synchronized multi-device embodiment, the controls (such as jog, shuttle, effect settings, etc.) may be invoked by the user with convenient gestures, at hand level, on the horizontal device 3530$b$, and the CPU intensive rendering and display of the resulting operations is handled by the vertical device 3540$b$. In such a setting, the user may choose to import a lower resolution or compressed version of a project to the horizontal device 3530$b$ for viewing when the vertical device 3540$b$ not connected.

Figure 36A:
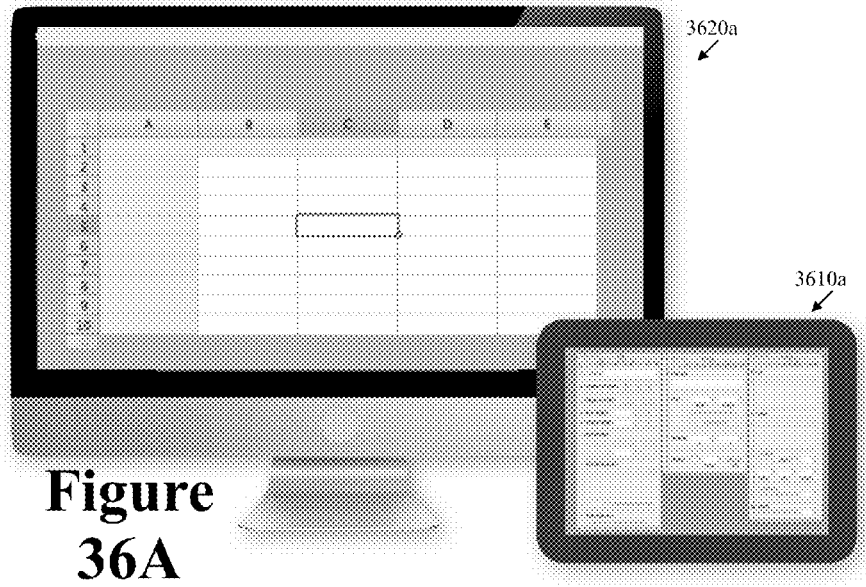
FIG. 36A illustrates still another alternate usage example of the synchronized UIs in accordance with some embodiments.

FIG. 36A illustrates still another alternate usage example of a synchronized multi-device UIs in accordance with some embodiments. In this figure, the horizontal device 3610$a$ displays tools for interacting with a workspace that is presented using the vertical device 3620$a$. By providing the tools on the horizontal device 3610$a$, the tools are accessible by touch even though the user may retain most visual focus on the vertical device 3620$a$ where the tools are used to interact with the workspace.

In some embodiments, the communication protocol coupling the two devices allows the UI of the touch enabled device to extend the UI of the primary display. Accordingly, various UI elements or windows can be dragged from one UI to the other and the communication protocol keeps the two UIs synchronized.

Figure 36B:
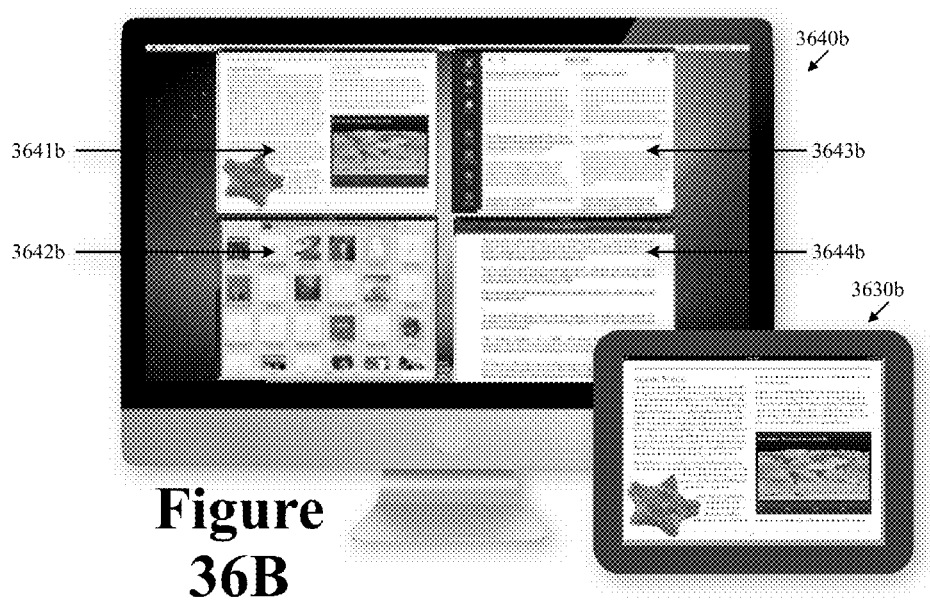
FIG. 36B presents an alternative synchronized multi-device embodiment wherein the screen graphics of the horizontal device are sent to the vertical device so that they can be used for reference.

FIG. 36B presents an alternative synchronized multi-device embodiment wherein the screen graphics of the horizontal device 3630$b$ are sent to the vertical device 3640$b$ so that they can be used for reference. Because many touchscreen devices have small screens, one of the limitations of their use is the difficulty of referring to work or information contained within another application. To resolve this issue, some embodiments send a representation of the bit map image of the horizontal device 3630$b$ to the vertical device 3640$b$, where previous bit map representations can also be seen for reference. As illustrated in 3641$b$, the frontmost application appears in the upper left corner, the previous application 3643$b$ appears in the upper right corner, the application previous to that 3642$b$ appears in the lower left corner, and the application previous to that 3644$b$ is represented in the lower right corner. As the user changes applications on the horizontal device 3630$b$, the representations on the vertical device 3640$b$ shift to show the current application as well as the previous three applications. In some embodiments, the current application on the horizontal device 3630$b$ is not shown on the vertical device 3640$b$ so that live updates of the currently running application do not need to occur on the vertical device 3640$b$, and instead the previous four applications are represented. Some embodiments support a varying number of screen representations, as well as zoom functionality. Other embodiments enable the interactions on the vertical device 3640$b$ to send messages to the horizontal device 3630$b$ to, for example, switch to the selected application. It should be noted that in some embodiments the horizontal device 3630$b$ drives the video to a vertical device, so that a non-computer device such as a TV monitor can be used as the vertical device via protocols such as WiFi or even a hard-wired video connection.

IV. Precision Pointer Interface

A common issue confronting users of trackpad, touchscreen, or other touch sensing input devices is the inability to perform precise selections and movements, because the human finger is a fairly thick pointing device that does not come to a single point. Touchscreens further exacerbate the issue because the touch that the user utilizes to make the selection or movement obscures the on-screen area at which a precise selection or movement is needed. Accordingly, it is an objective of the present invention to define an apparatus, method, system, and computer software product that overcomes limitations and enhances the use of the human finger as a UI pointing device on touchscreen and trackpad devices. Specifically, some embodiments provide a precision pointing function that seamlessly operates with traditional trackpad and/or touchscreen functionality.

In some embodiments, the precision pointer includes a configurable magnified region to better represent underlying on-screen content. The level of magnification adjusts the speed of movement over the underlying content and with the magnified view of the underlying content, the user is able to more precisely position the pointer. For a touchscreen, the magnified region is presented at the edge of the user's touch such that the user's touch does not obscure the underlying content.

In some embodiments, the user performs a two touch gesture to enable the precision pointer functionality. One touch of the two touch gesture may include a touch of the thumb. The inclusion of the thumb allows for easier detection of the gesture, because the thumb produces a recognizable touch pattern that is distinguishable from the touches of the index, middle, ring, and little fingers. Moreover, the inclusion of the thumb allows for greater dexterity when performing contraction and expansion gestures to adjust the amount of magnification. The figures below illustrate operation of the precision pointer based on touches that are applied to a trackpad and not a touchscreen so as to clearly differentiate the touch actions from the results they produce. However, the precision pointer is implemented such that the same touch actions can also be applied to a touchscreen device in order to produce the same results and the same resulting functionality.

Figure 37:
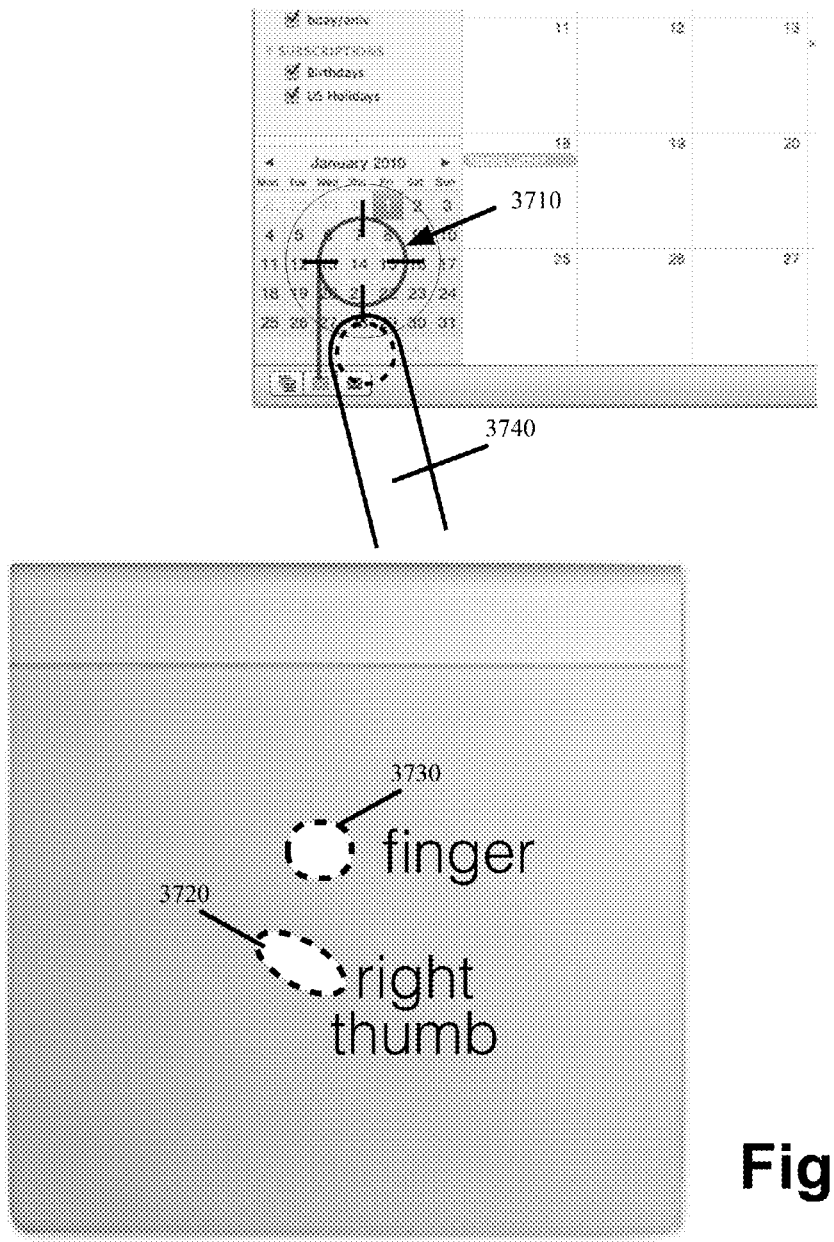
FIG. 37 illustrates the precision pointer in accordance with some embodiments.

FIG. 37 illustrates the precision pointer in accordance with some embodiments. As shown, the precision pointer 3710 is enabled with a two touch gesture on the trackpad where the gesture includes a touch of the thumb 3720 and one other finger 3730, usually the index finger, in an essentially vertical orientation. In some touchscreen embodiments, when an above-described two touch gesture is located near the top or bottom of the touchscreen, the precision pointer is presented to the side of the touches, rather than above where there may not be sufficient screen space to display the precision pointer. The left/right designation may change depending on whether the left or right thumb was used, and/or if the touches are close to the left or right side of the touchscreen.

Once enabled, the precision pointer 3710 is displayed on-screen in place of a traditional GUI pointer. The user moves the precision pointer 3710 on-screen by moving the two touches 3720 and 3730 in an essentially parallel manner, or by removing one of the two touches and then moving the remaining touch. When both fingers are lifted, the precision pointer remains on-screen for some time period to allow for a tap gesture by a finger. If no tap is registered within a specified time duration, the precision pointer fades from the screen, without any functionality invoked, and normal operation resumes. In some embodiments, a tap of the thumb after all touches are released causes another action, or immediately dismisses the precision pointer. Likewise if a finger tap occurs in a substantially new x-y coordinate, then no action is taken and the precision pointer is dismissed immediately, with an animation or other feedback in some embodiments. If a slide touch by either the originating thumb or finger occurs after all touches are released in a substantially new x-y location, the precision pointer jumps to that location and tracks the slide movements in some embodiments.

The precision pointer 3710 is represented by at least one circular region through which the underlying on-screen content is visible. The representation of the precision pointer 3710 as a circular region is not intended to be limiting and can therefore be substituted with other shapes or representations whereby similar functionality may be accessible. In some embodiments, a digit indicator 3740 is also shown in addition to the precision pointer, and in some embodiments, animation is employed on invocation to draw the eye to the screen area of the precision pointer. In some embodiments, other feedback mechanisms such as sound and tactile response are employed to confirm to the user the invocation and other modes of the precision pointer interface.

The level of magnification for the content visible through the circular region of the precision pointer 3710 is user specifiable by expansion and contraction gestures of the two touches 3720 and 3730. When one touch is used to move the precision pointer 3720, a second touch can be reintroduced at any time to perform the magnification adjustment where the two touches used to perform the magnification need not include a touch of the thumb. To increase the level of magnification, the user performs an expansion gesture to increase the distance between the two touches. To decrease the level of magnification, the user performs a contraction gestures to decrease the distance between the two touches. The amount of magnification is determined based on the distance with which the two touches are expanded or contracted.

Figure 38:
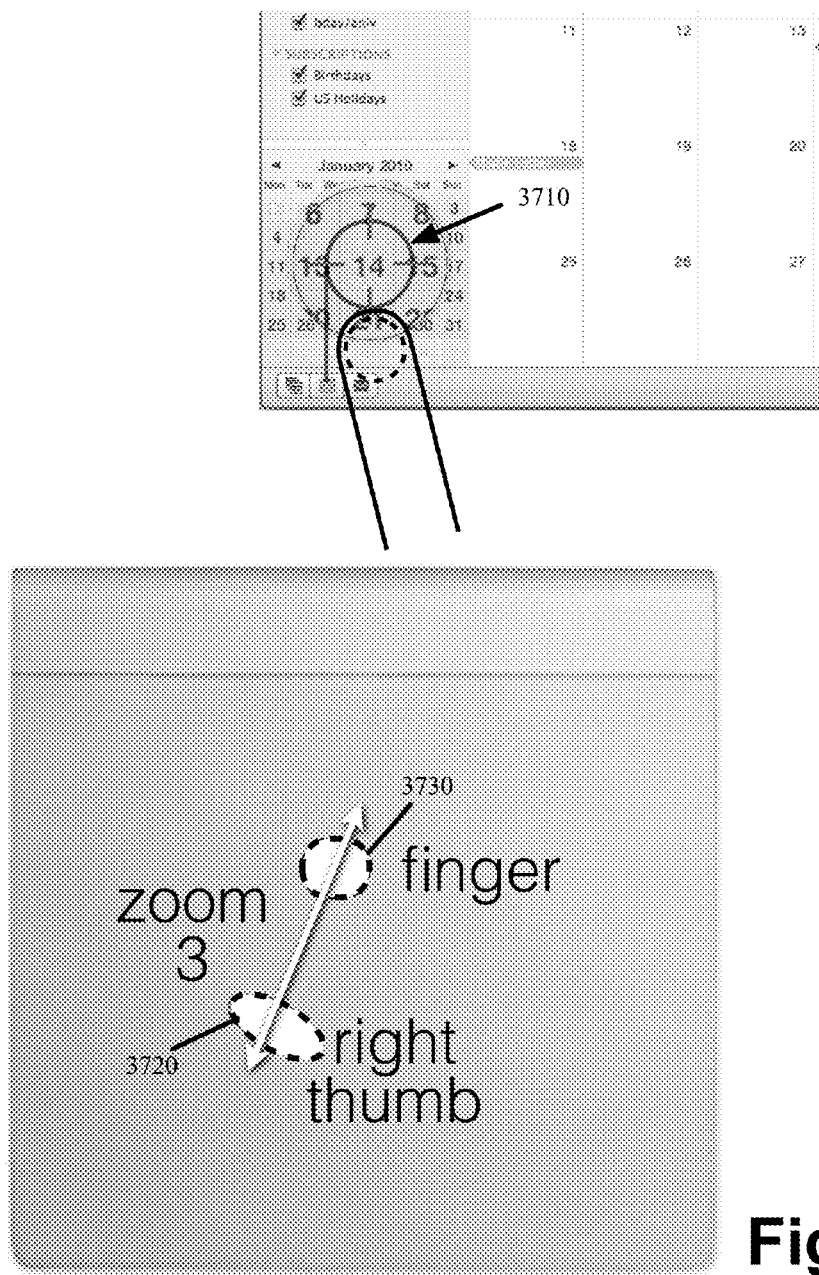
FIG. 38 illustrates increasing the magnification of the precision pointer using an expansion gesture in accordance with some embodiments.

FIG. 38 illustrates an increasing of the magnification level of the precision pointer 3710 in response to an expansion gesture in accordance with some embodiments. As shown on the trackpad, the two touches 3720 and 3730 are moved away from one another so as to increase the distance between the two touches 3720 and 3730. In so doing, the content displayed through the precision pointer 3710 is magnified to provide a larger view of the underlying content. The zoomed in view allows a user to more precisely target underlying content with the precision pointer 3710 than with traditional pointing tools. In some embodiments, when underlying content becomes accessible (e.g., selectable or invocable), a cross-hair or other visual identifier is presented with the precision pointer 3710 to notify the user. Moreover, the snapping functionality of the MTI can be used in conjunction with the precision pointer 3710 such that a UI element is automatically centered within the precision pointer 3710 when that UI element partially intersects with a boundary of the precision pointer 3710. With use of the precision pointer, trackpads and touchscreens can be adapted for use with software applications that require precise operations, such as graphical editing and media editing software as some examples. When a precision pointer embodiment is integrated into the OS of the device, it is operable across all applications, without the need for individual software application modifications.

Figure 39:
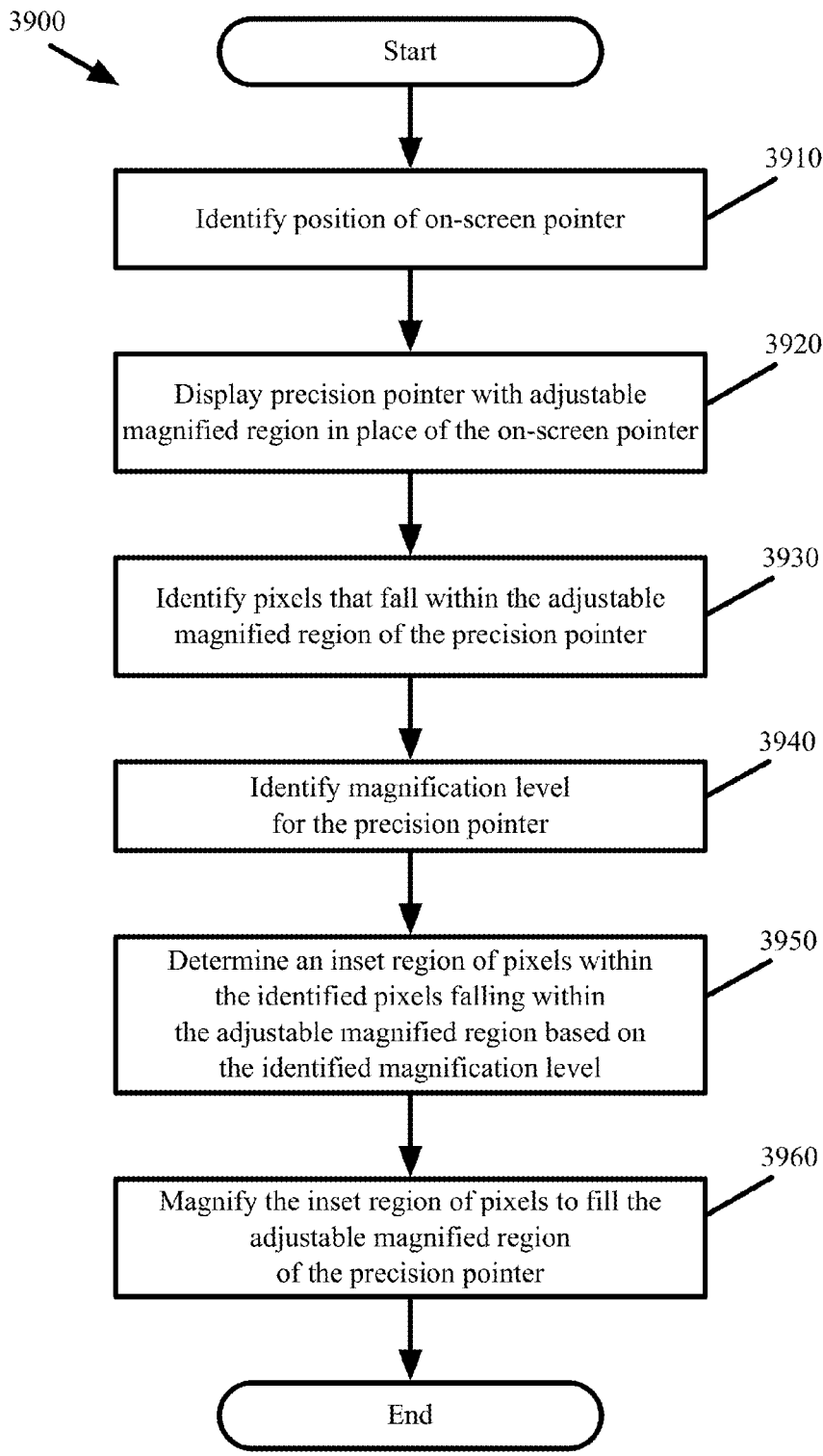
FIG. 39 presents a process for implementing the precision pointer in accordance with some embodiments.

FIG. 39 presents a process 3900 for implementing the precision pointer in accordance with some embodiments. The process 3900 is performed when the precision pointer is enabled. As noted above, the precision pointer is enabled using a two touch gesture or other touch gesture.

Once the precision pointer is enabled, the process 3900 begins by identifying (at 3910) the current position of the on-screen pointer. Often, the on-screen pointer is represented as an arrow or I-beam with the current position of the arrow pointing to one pixel or a set of pixels at the tip of the arrow and with the current position of the I-beam identifying one pixel or a set of pixels at the vertical edge of the I-beam. In place of the on-screen pointer, the process displays (at 3920) the precision pointer. As shown in FIGS. 37 and 38, the precision pointer is displayed with an adjustable magnified region and may optionally display a digit indicator adjacent to the adjustable magnified region. When displaying the precision pointer, the process temporarily alters the representation of the on-screen pointer from the GUI/OS default representation (e.g., pointer or I-beam) to that of the precision pointer. In some embodiments, the process issues one or more GUI/OS system calls or API calls to change the representation of the on-screen pointer to that of the precision pointer.

Next, the process identifies (at 3930) the pixels that fall within the adjustable magnified region of the precision pointer. In some embodiments, the pixels include those that are some radius away from the position of the on-screen pointer or are some other distance from the position of the on-screen pointer. The process identifies (at 3940) a magnification level for the precision pointer. The magnification level is a setting that determines how much magnification to apply to the underlying region of the GUI that falls within the adjustable magnified region of the precision pointer. In some embodiments, the precision pointer is always enabled with a default magnification level. In some other embodiments, the precision pointer is enabled with the magnification level that was used when the precision pointer was last enabled.

To actually magnify the underlying region of the GUI, the process determines (at 3950) an inset region of pixels within the identified pixels falling within the adjustable magnified region of the precision pointer based on the identified magnification level. The inset region is identified because some pixels falling along the outer region of the adjustable magnified region of the precision pointer will become obscured when magnifying those pixels that are in the inset region and that are closer to the center of the precision pointer. For example, when there are 200 pixels falling within the diameter of the adjustable magnified region of the precision pointer and the magnification level is 2× (i.e., double), the inset region is determined to include the innermost 100 pixel diameter of the 200 pixel diameter image. The process then uses well-established graphical resizing algorithms to enlarge the innermost 100 pixel diameter image to produce a 200 pixel diameter image that consumes the entire adjustable magnified region of the precision pointer thereby providing a two fold increase in size for GUI content represented by the innermost 100 pixel diameter image while obscuring the outermost 100 pixel diameter image. Accordingly, the process magnifies (at 3960) the inset region of pixels to fill the adjustable magnified region of the precision pointer.

The process 3900 may continue as long as the precision pointer functionality is enabled. The process 3900 may continue to allow for adjustments to the magnification level for the GUI content displayed in the adjustable magnified region of the precision based on expansion and contraction gestures or other user input. For instance, when the magnification level is increased with an expansion gesture, the inset region of pixels is redefined to include a smaller set of innermost pixels within the adjustable magnified region of the precision pointer. Those innermost pixels are then scaled up to produce an even greater magnified representation for a more constrained region of the underlying GUI content that otherwise falls within the adjustable magnified region of the precision pointer. Similarly, when the magnification level is decreased with a contraction gesture, the inset region of pixels is redefined to include a larger set of innermost pixels that are then scaled to display a greater amount of the underlying GUI content within the adjustable magnified region of the precision pointer.

It should be apparent to one of ordinary skill in the art that at any magnification level of the precision pointer, the underlying GUI content that is accessible or that can be invoked by the precision pointer does not change. This is because the precision pointer points to the same UI element or underlying GUI content irrespective of the magnification level, the magnification level merely assists the user in more precisely visualizing and isolating a desired UI element or underlying GUI content. In some embodiments, other digits are used after enabling the precision pointer to access further functionality. In accordance with the above usage of the MT pointer, different digits and touch gestures can be used to perform hold, copy, and paste functionality as some examples and which are detailed above.

V. Computer System

Each of the MTI, multi-UI, and precision pointer are implemented as one or more software applications or processes that execute on one or more physical computing devices. These applications may be specified as a set of instructions recorded to a non-transitory computer readable storage medium (also referred to as computer readable medium) thereby providing an article of manufacture. When these instructions are executed by one or more computational element(s) (such as processors or other computational elements like ASICs and FPGAs), they cause the computational element(s) to perform the actions indicated in the instructions. Computer and computer system are meant in their broadest sense, and may include any electronic device with a processor including cellular telephones, smartphones, portable digital assistants, tablet devices, laptops, and desktops. Examples of computer readable media include, but are not limited to, CD-ROMs, flash drives, RAM chips, hard drives, EPROMs, etc.

The MTI transforms general purpose computing resources of the computing devices on which it executes to provide a particular machine with which UI elements can be interacted with using the MT pointer and associated functionality. The multi-UI transforms general purpose computing resources of the computing devices on which it executes to provide a particular machine whereby the user's focus and operational focus need not be on the same UI. The precision pointer transforms general purpose computing resources of the computing devices on which it executes to provide a particular machine with which UI elements can be precisely interacted with using an imprecise touch. Stated differently, the computing devices on which any of the MTI, multi-UI, and precision pointer executes comprise general purpose processors, random access memory, non-volatile storage, and network resources that are transformed by any of the MTI, multi-UI, and precision pointer into one or more specific purpose machines that perform associated function.

Figure 40:
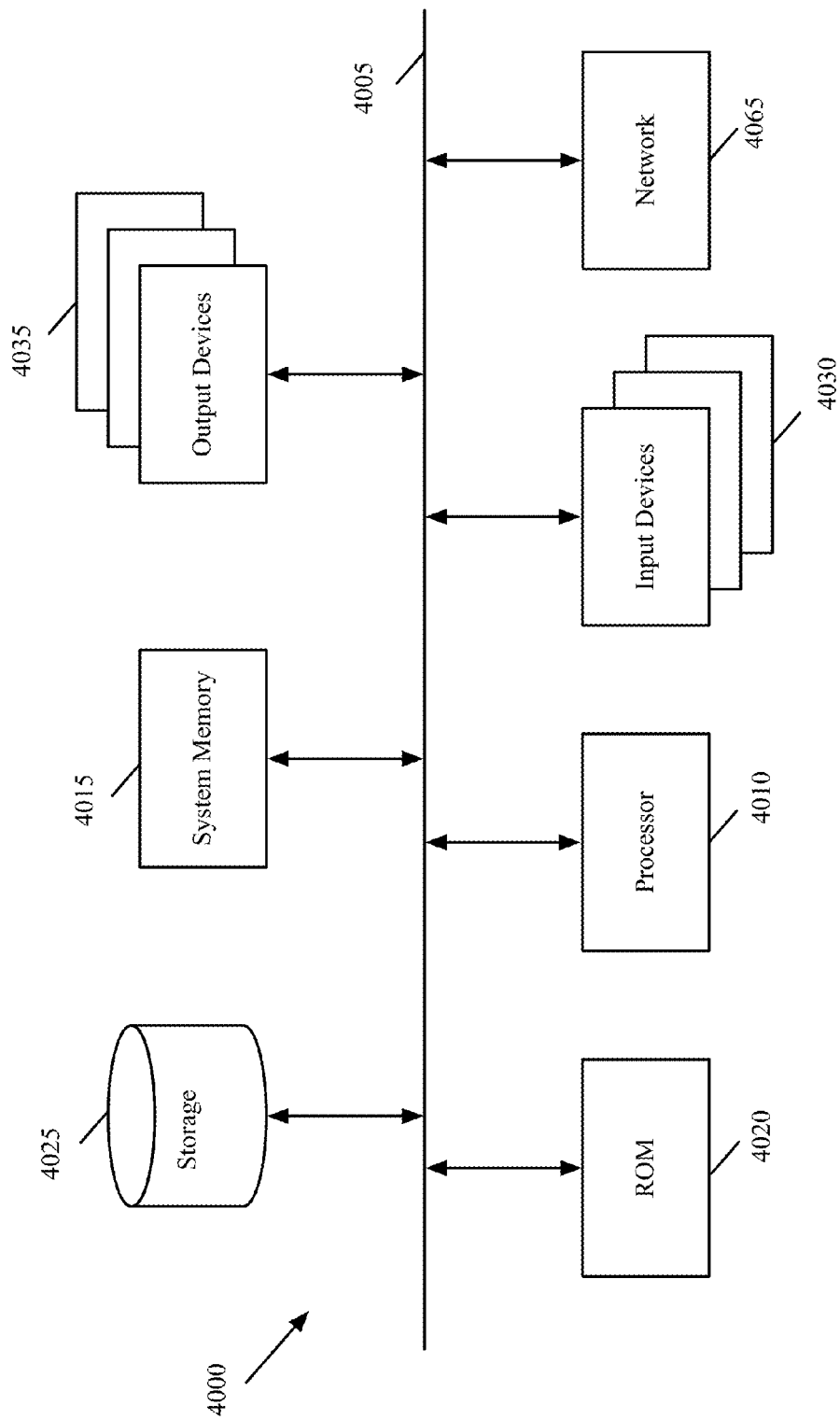
FIG. 40 illustrates a computer system with which some embodiments are implemented.

FIG. 40 illustrates a computer system with which some embodiments are implemented. Such a computer system includes various types of computer readable mediums and interfaces for various other types of computer readable mediums that implement the various processes, modules, and engines described above for each of the MTI, multi-UI, and precision pointer. Computer system 4000 includes a bus 4005, a processor 4010, a system memory 4015, a read-only memory 4020, a permanent storage device 4025, input devices 4030, and output devices 4035.

The bus 4005 collectively represents all system, peripheral, and chipset buses that communicatively connect the numerous internal devices of the computer system 4000. For instance, the bus 4005 communicatively connects the processor 4010 with the read-only memory 4020, the system memory 4015, and the permanent storage device 4025. From these various memory units, the processor 4010 retrieves instructions to execute and data to process in order to execute the processes of the invention. The processor 4010 is a processing device such as a central processing unit, integrated circuit, graphical processing unit, etc.

The read-only-memory (ROM) 4020 stores static data and instructions that are needed by the processor 4010 and other modules of the computer system. The permanent storage device 4025, on the other hand, is a read-and-write memory device. This device is a non-volatile memory unit that stores instructions and data even when the computer system 4000 is off. Some embodiments of the invention use a mass-storage device (such as a magnetic or optical disk and its corresponding disk drive) as the permanent storage device 4025.

Other embodiments use a removable storage device (such as a flash drive) as the permanent storage device Like the permanent storage device 4025, the system memory 4015 is a read-and-write memory device. However, unlike the storage device 4025, the system memory is a volatile read-and-write memory, such as random access memory (RAM). The system memory stores some of the instructions and data that the processor needs at runtime. In some embodiments, the processes are stored in the system memory 4015, the permanent storage device 4025, and/or the read-only memory 4020.

The bus 4005 also connects to the input and output devices 4030 and 4035. The input devices enable the user to communicate information and select commands to the computer system. The input devices 4030 include any of a capacitive touchscreen, resistive touchscreen, any other touchscreen technology, a trackpad that is part of the computing system 4000 or attached as a peripheral, a set of touch sensitive buttons or touch sensitive keys that are used to provide inputs to the computing system 4000, or any other touch sensing hardware that detects multiple touches and that is coupled to the computing system 4000 or is attached as a peripheral. The input device 4030 also include alphanumeric keypads (including physical keyboards and touchscreen keyboards), pointing devices (also called "cursor control devices"). The input devices 4030 also include audio input devices (e.g., microphones, MIDI musical instruments, etc.). The output devices 4035 display images generated by the computer system. The output devices include printers and display devices, such as cathode ray tubes (CRT) or liquid crystal displays (LCD).

Finally, as shown in FIG. 40, bus 4005 also couples computer 4000 to a network 4065 through a network adapter (not shown). In this manner, the computer can be a part of a network of computers (such as a local area network ("LAN"), a wide area network ("WAN"), or an Intranet, or a network of networks, such as the internet. For example, the computer 4000 may be coupled to a web server (network 4065) so that a web browser executing on the computer 4000 can interact with the web server as a user interacts with a GUI that operates in the web browser.

As mentioned above, the computer system 4000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention.

I claim:

1. A graphical pointer for simulating a screen-mapped direct-touch user interface (UI) on a device without a touch enabled display, the graphical pointer comprising:
    a graphical element displayed onscreen with at least a first indicator, a second indicator, and a third indicator,
        the first indicator, in response to a first input, performing any of a selection or invocation of a first UI element over which the first indicator is positioned,
        the second indicator, in response to a second input, performing any of a selection or invocation of a second UI element that is adjacent to the first UI element in the UI without repositioning the pointer or the first indicator away from the first UI element,
        the third indicator, in response to a third input, performing any of a selection or invocation of a third UI element that is adjacent to the second UI element in the UI without repositioning the pointer or the first indicator away from the first UI element, and
    the graphical pointer collectively moving the first indicator, the second indicator, and the third indicator onscreen in unison in response to a fourth input tied to moving the graphical pointer as a whole,
    wherein the first, second, third, and fourth inputs are provided by an input device that is not a touch enabled display.

2. The graphical pointer of claim 1, wherein each of the first, second, and third indicators comprises a transparent area with the first indicator transparent area displaying the first indicator without obscuring a portion of the UI underneath the first indicator, the second indicator transparent area displaying the second indicator without obscuring a portion of the UI underneath the second indicator, and the third indicator transparent area displaying the third indicator without obscuring a portion of the UI underneath the third indicator.

3. The graphical pointer of claim 1, wherein the graphical pointer provides for the selection or the invocation of the first, second, and third UI elements using any of the first, second, and third inputs without repositioning the graphical pointer or any of the first, second, and third indicators.

4. The graphical pointer of claim 1, wherein control of the first indicator is mapped to and activated by a first keyboard key, control of the second indicator is mapped to and activated by a second keyboard key that is adjacent to the first keyboard key, and control of the third indicator is mapped to and activated by a third keyboard key that is adjacent to the second keyboard key.

5. The graphical pointer of claim 1, wherein control of the first indicator is mapped to a touch of a first user finger on a touch sensitive input device comprising a trackpad or a touchpad, control of the second indicator is mapped to a touch of a different second user finger on the touch sensitive input device, wherein the second user finger that is adjacent to the first user finger, and control of the third indicator is mapped to a touch of a different third user finger on the touch sensitive input device, wherein the third user finger that is adjacent to the second user finger.

6. The graphical pointer of claim 5, wherein the touch of the first user finger is a touch of the user index finger, the touch of the second user finger is a touch of the user middle finger, and the touch of the third user finger is a touch of the user ring finger.

7. The graphical pointer of claim 1, wherein the second indicator, in response to the second input, performs a secondary action associated with the first UI element instead of performing any of the selection or invocation of the second UI element when the first indicator selects and holds the first UI element for a specified duration in response to the first input.

8. The graphical pointer of claim 1, wherein a size of the graphical pointer is adjustable in response to fifth input, and wherein the fifth input simultaneously increases a size of each of the first, second, and third indicators.

9. The graphical pointer of claim 1, wherein the graphical pointer maintains a single x-axis coordinate and single y-axis coordinate and a position of each of the first, second, and third indicators is determined based on a different offset from the graphical pointer x-axis and y-axis coordinates.

10. The graphical pointer of claim 9, wherein collectively moving the graphical pointer comprises adjusting the pointer x-axis and y-axis coordinates without adjusting the first, second, and third indicator offsets.

11. A method for accessing multiple user interface (UI) elements of a graphical user interface (GUI) from a single on-screen position, the method comprising:
    displaying a graphical pointer onscreen with at least first, second, and third indicators;
    moving the graphical pointer within the GUI in response to user directional input;
    determining the graphical pointer y-axis coordinate position in said GUI after said moving;

obtaining x-axis and y-axis coordinate positions of a first UI element, a second UI element, and a third UI element displayed in the GUI about the graphical pointer y-axis coordinate position, wherein the first UI element has the smallest x-axis coordinate position of the first, second, and third UI elements, and the third UI element has the largest x-axis coordinate position of the first, second, and third UI elements;

repositioning the graphical pointer first indicator to the x-axis and y-axis coordinate positions of the first UI element, the graphical pointer second indicator to the x-axis and y-axis coordinate positions of the second UI element, and the graphical pointer third indicator to the x-axis and y-axis coordinate positions of the third UI element without further user directional input; and performing at least one of a selection or invocation of the first UI element in response to activation of the first indicator, selection or invocation of the second UI element in response to activation of the second indicator, and selection or invocation of the third UI element in response to activation of the third indicator.

12. The method of claim 11 further comprising repositioning the graphical pointer to a second y-axis coordinate position in response to additional user directional input.

13. The method of claim 12 further comprising obtaining x-axis and y-axis coordinate positions of a fourth UI element and a fifth UI element displayed in the GUI about the second y-axis coordinate position of the graphical pointer.

14. The method of claim 13 further comprising repositioning the first indicator to the x-axis and y-axis coordinate positions of the fourth UI element and the second indicator to the x-axis and y-axis coordinate positions of the fifth UI element without further user directional input.

15. The method of claim 11, wherein activation of the first indicator comprises detecting at least a press of a first keyboard key, activation of the second indicator comprises detecting at least a press of a different second keyboard key, and activation of the third indicator comprises detecting at least a press of a different third keyboard key.

16. A precision pointer for magnifying presentation of underlying graphical user interface (GUI) content, the precision pointer comprising:

a transparent bounded region moving across the GUI in response to a first input tied to moving the precision pointer, wherein the transparent bounded region presents a portion of the GUI falling within the transparent bounded region with a user configurable amount of magnification, wherein the user configurable amount of magnification within the transparent bounded region increases in response to a second input and decreases in response to a third input; and an indicator appearing within the transparent bounded region in response to a GUI element entering a sub-region within the transparent bounded region in which the GUI element is selectable or invocable, and disappearing in response to the GUI element exiting said sub-region, the indicator identifying the GUI element that is currently selectable or invocable by the precision pointer.

17. The precision pointer of claim 16, wherein the second input comprises an expansion gesture and the third input comprises a contraction gesture.

18. The precision pointer of claim 17, wherein the expansion gesture comprises user input in which a distance separating two user touches increases, and wherein the contraction gesture comprises user input in which a distance separating two user touches decreases.

19. The precision pointer of claim 16, wherein the transparent bounded region comprises a region in which underlying content of the GUI is magnified relative to content of the GUI that is outside said region.

20. The precision pointer of claim 16, wherein the indicator has a first appearance when a GUI element is selectable by the precision pointer and a second appearance when no GUI element is selectable by the precision pointer.

* * * * *